(12) United States Patent
Hoffer et al.

(10) Patent No.: US 12,082,644 B2
(45) Date of Patent: Sep. 10, 2024

(54) PARTICULATE FOAM WITH PARTIAL RESTRICTION

(71) Applicant: NIKE, Inc., Beaverton, OR (US)

(72) Inventors: Kevin W. Hoffer, Portland, OR (US);
Scott C. Holt, Portland, OR (US);
Jeffrey L. Johnson, Taichung (CN);
Cassidy R. Levy, West Linn, OR (US);
Nicholas R. Long, Portland, OR (US);
Matthew C. Palmer, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/720,449

(22) Filed: Apr. 14, 2022

(65) Prior Publication Data

US 2022/0240621 A1   Aug. 4, 2022

Related U.S. Application Data

(63) Continuation of application No. 16/327,344, filed as application No. PCT/US2016/053265 on Sep. 23, 2016, now Pat. No. 11,304,475.

(Continued)

(51) Int. Cl.
*A43B 13/12* (2006.01)
*A43B 1/00* (2006.01)
(Continued)

(52) U.S. Cl.
CPC .......... *A43B 13/141* (2013.01); *A43B 1/0072* (2013.01); *A43B 5/00* (2013.01);
(Continued)

(58) Field of Classification Search
CPC ... A43B 13/125; A43B 13/127; A43B 13/181; A43B 13/187; A43B 13/188
(Continued)

(56) References Cited

U.S. PATENT DOCUMENTS 2,930,149 A   3/1960   Hack
3,087,262 A   4/1963   Russell
(Continued)

FOREIGN PATENT DOCUMENTS

CH   283034 A   5/1952
CN   1053884 A   8/1991
(Continued)

OTHER PUBLICATIONS

European Patent Office as the International Searching Authority, International Search Report and Written Opinion for PCT Application No. PCT/US2016/053256, mailed Jan. 12, 2017.
(Continued)

*Primary Examiner* — Sharon M Prange
(74) *Attorney, Agent, or Firm* — Honigman LLP; Matthew H. Szalach; Jonathan P. O'Brien

(57) ABSTRACT

An article of footwear includes an upper, an outsole, and a midsole disposed between the upper and the outsole. The outsole is attached to the upper and has a ground-engaging surface. The midsole has a series of walls that define a series of channels extending substantially perpendicular to a longitudinal axis of the midsole and along an entire length of the midsole. The series of channels are isolated from one another and each channel receives a quantity of particulate matter therein.

20 Claims, 23 Drawing Sheets

Related U.S. Application Data

(60) Provisional application No. 62/222,842, filed on Sep. 24, 2015, provisional application No. 62/222,882, filed on Sep. 24, 2015, provisional application No. 62/222,851, filed on Sep. 24, 2015, provisional application No. 62/222,816, filed on Sep. 24, 2015, provisional application No. 62/222,873, filed on Sep. 24, 2015, provisional application No. 62/222,832, filed on Sep. 24, 2015.

(51) Int. Cl.
| | |
|---|---|
| *A43B 5/00* | (2022.01) |
| *A43B 7/1405* | (2022.01) |
| *A43B 7/32* | (2006.01) |
| *A43B 13/04* | (2006.01) |
| *A43B 13/14* | (2006.01) |
| *A43B 13/16* | (2006.01) |
| *A43B 13/18* | (2006.01) |
| *A43B 13/20* | (2006.01) |
| *B32B 5/16* | (2006.01) |
| *B32B 5/18* | (2006.01) |
| *B32B 25/04* | (2006.01) |
| *B32B 25/14* | (2006.01) |

(52) U.S. Cl.
CPC ............ *A43B 7/141* (2013.01); *A43B 7/32* (2013.01); *A43B 13/04* (2013.01); *A43B 13/122* (2013.01); *A43B 13/125* (2013.01); *A43B 13/127* (2013.01); *A43B 13/16* (2013.01); *A43B 13/181* (2013.01); *A43B 13/186* (2013.01); *A43B 13/187* (2013.01); *A43B 13/188* (2013.01); *A43B 13/189* (2013.01); *A43B 13/20* (2013.01); *A43B 13/206* (2013.01); *B32B 5/16* (2013.01); *B32B 5/18* (2013.01); *B32B 25/047* (2013.01); *B32B 25/14* (2013.01); *B32B 2264/02* (2013.01); *B32B 2437/02* (2013.01)

(58) Field of Classification Search
USPC .......................................................... 36/30 A
See application file for complete search history.

(56) References Cited

U.S. PATENT DOCUMENTS

| | | | |
|---|---|---|---|
| 3,469,576 A | 9/1969 | Smith et al. | |
| 3,552,044 A | 1/1971 | Wiele | |
| 3,608,215 A | 9/1971 | Fukuoka | |
| 3,724,106 A | 4/1973 | Magidson | |
| 3,765,422 A | 10/1973 | Smith | |
| 3,906,570 A | 9/1975 | Revill | |
| 3,971,839 A * | 7/1976 | Taylor | B29C 67/00 264/126 |
| 4,170,078 A | 10/1979 | Moss | |
| 4,307,200 A | 12/1981 | Lichter et al. | |
| 4,343,047 A | 8/1982 | Lazowski et al. | |
| 4,345,387 A | 8/1982 | Daswick | |
| 4,524,529 A * | 6/1985 | Schaefer | A43B 13/38 36/98 |
| 4,658,515 A * | 4/1987 | Oatman | A43B 17/14 36/31 |
| 4,686,781 A | 8/1987 | Bury | |
| 4,724,627 A | 2/1988 | Sisco | |
| 4,823,799 A | 4/1989 | Robbins | |
| 4,905,320 A * | 3/1990 | Squyers, Jr. | A41D 13/065 2/2.5 |
| 4,970,807 A | 11/1990 | Anderie et al. | |
| 5,005,575 A | 4/1991 | Geri | |
| 5,150,490 A | 9/1992 | Busch et al. | |
| 5,231,776 A | 8/1993 | Wagner | |
| 5,363,570 A | 11/1994 | Allen et al. | |
| 5,378,223 A | 1/1995 | Grim et al. | |
| 5,383,290 A | 1/1995 | Grim | |
| 5,392,534 A | 2/1995 | Grim | |
| 5,517,770 A | 5/1996 | Martin et al. | |
| 5,617,650 A | 4/1997 | Grim | |
| 5,665,285 A | 9/1997 | Hattori et al. | |
| 5,718,064 A | 2/1998 | Pyle | |
| 5,753,357 A | 5/1998 | Filipitsch et al. | |
| 5,758,435 A | 6/1998 | Miyata | |
| 5,890,248 A | 4/1999 | Gee | |
| 5,920,915 A | 7/1999 | Bainbridge et al. | |
| 5,987,781 A | 11/1999 | Pavesi et al. | |
| 6,020,055 A | 2/2000 | Pearce | |
| 6,032,300 A | 3/2000 | Bainbridge et al. | |
| 6,061,928 A | 5/2000 | Nichols | |
| 6,098,209 A | 8/2000 | Bainbridge et al. | |
| 6,158,149 A | 12/2000 | Rudy | |
| 6,266,896 B1 | 7/2001 | Liu | |
| D460,852 S | 7/2002 | Daudier | |
| 6,453,477 B1 | 9/2002 | Bainbridge et al. | |
| 6,502,331 B2 | 1/2003 | Hines | |
| 6,532,689 B1 | 3/2003 | Jones, Jr. | |
| 6,635,203 B2 | 10/2003 | Monaci | |
| 6,759,443 B2 | 7/2004 | Brant et al. | |
| 6,782,640 B2 | 8/2004 | Westin | |
| 6,848,200 B1 | 2/2005 | Westin | |
| 6,878,753 B1 | 4/2005 | Takemura et al. | |
| 7,037,571 B2 | 5/2006 | Fish et al. | |
| 7,069,672 B2 | 7/2006 | Hahn | |
| 7,152,342 B2 | 12/2006 | Sommer | |
| 7,484,318 B2 | 2/2009 | Finkelstein | |
| 7,555,851 B2 | 7/2009 | Hazenberg et al. | |
| 7,594,344 B2 | 9/2009 | Mizrahi | |
| 7,805,859 B2 | 10/2010 | Finkelstein | |
| 7,823,238 B2 | 11/2010 | Din Mahamed | |
| 7,904,971 B2 | 3/2011 | Doria et al. | |
| 8,091,254 B2 | 1/2012 | Wang | |
| 8,178,022 B2 | 5/2012 | Schindler et al. | |
| 8,272,149 B2 | 9/2012 | Cooper et al. | |
| 8,671,591 B2 | 3/2014 | Brown | |
| 8,713,817 B2 | 5/2014 | Litchfield et al. | |
| 9,610,746 B2 * | 4/2017 | Wardlaw | A43D 29/00 |
| 9,737,111 B2 | 8/2017 | Lustik | |
| 2001/0000835 A1 | 5/2001 | Hines | |
| 2001/0042321 A1 | 11/2001 | Tawney et al. | |
| 2003/0046831 A1 | 3/2003 | Westin | |
| 2003/0217484 A1 | 11/2003 | Christensen et al. | |
| 2005/0022424 A1 | 2/2005 | Held | |
| 2005/0086728 A1 | 4/2005 | Tobergte | |
| 2005/0150132 A1 | 7/2005 | Iannacone | |
| 2006/0010717 A1 * | 1/2006 | Finkelstein | A43B 13/187 36/43 |
| 2006/0026863 A1 | 2/2006 | Liu | |
| 2006/0130363 A1 | 6/2006 | Hottinger | |
| 2006/0206977 A1 | 9/2006 | Hammons et al. | |
| 2007/0051018 A1 | 3/2007 | Issler | |
| 2007/0169379 A1 | 7/2007 | Hazenberg et al. | |
| 2008/0066341 A1 | 3/2008 | Hottinger | |
| 2008/0148599 A1 * | 6/2008 | Collins | A43B 17/02 36/43 |
| 2008/0230956 A1 | 9/2008 | Allmendinger et al. | |
| 2009/0094855 A1 | 4/2009 | Finkelstein | |
| 2009/0313853 A1 | 12/2009 | Tadin | |
| 2010/0011618 A1 | 1/2010 | Bitton | |
| 2010/0047550 A1 | 2/2010 | Prissok et al. | |
| 2010/0154252 A1 | 6/2010 | Avent et al. | |
| 2010/0222442 A1 | 9/2010 | Prissok et al. | |
| 2010/0251565 A1 | 10/2010 | Litchfield et al. | |
| 2011/0016747 A1 | 1/2011 | Bitton | |
| 2011/0215497 A1 | 9/2011 | McEvoy et al. | |
| 2012/0036698 A1 | 2/2012 | Guertin | |
| 2012/0073163 A1 | 3/2012 | Tse | |
| 2012/0204451 A1 * | 8/2012 | De Roode | A43B 17/026 36/43 |
| 2012/0210602 A1 | 8/2012 | Brown | |
| 2013/0008050 A1 | 1/2013 | Marc | |
| 2013/0145653 A1 | 6/2013 | Bradford | |
| 2013/0247422 A1 | 9/2013 | Holt et al. | |

(56) References Cited

U.S. PATENT DOCUMENTS

| | | | |
|---|---|---|---|
| 2014/0007456 A1 | 1/2014 | Tadin | |
| 2014/0151918 A1 | 6/2014 | Hartmann | |
| 2014/0223776 A1 | 8/2014 | Wardlaw et al. | |
| 2014/0223777 A1 | 8/2014 | Whiteman et al. | |
| 2014/0283413 A1 | 9/2014 | Christensen et al. | |
| 2015/0196085 A1 | 7/2015 | Westmoreland et al. | |
| 2015/0223564 A1* | 8/2015 | Peyton | A43B 13/184 36/28 |
| 2015/0257481 A1 | 9/2015 | Campos, II et al. | |
| 2015/0264999 A1 | 9/2015 | Marshall et al. | |
| 2016/0010717 A1 | 1/2016 | Tosovsky | |
| 2016/0073732 A1 | 3/2016 | Ernst et al. | |
| 2016/0157554 A1 | 6/2016 | Adams | |
| 2016/0278481 A1 | 9/2016 | Le et al. | |
| 2017/0055636 A1 | 3/2017 | Campos, II et al. | |
| 2018/0077997 A1* | 3/2018 | Hoffer | A43B 1/0072 |
| 2018/0132564 A1 | 5/2018 | Bruce et al. | |
| 2018/0228248 A1 | 8/2018 | Hazenberg et al. | |
| 2018/0352900 A1 | 12/2018 | Hartmann et al. | |
| 2019/0269200 A1* | 9/2019 | Tseng | A43B 13/187 |
| 2019/0343225 A1 | 11/2019 | Reddy et al. | |
| 2019/0380424 A1 | 12/2019 | Tamm et al. | |
| 2020/0245726 A1* | 8/2020 | Hartmann | A43D 25/06 |

FOREIGN PATENT DOCUMENTS

| | | | | |
|---|---|---|---|---|
| CN | 1211901 A | 3/1999 | | |
| CN | 2620493 Y | 6/2004 | | |
| CN | 1638663 A | 7/2005 | | |
| CN | 2888936 Y | 4/2007 | | |
| CN | 202051034 U | 11/2011 | | |
| CN | 202145956 U | 2/2012 | | |
| CN | 102481031 A | 5/2012 | | |
| CN | 103141993 A | 6/2013 | | |
| CN | 103720129 A | 4/2014 | | |
| CN | 103747700 A | 4/2014 | | |
| CN | 104010541 A | 8/2014 | | |
| CN | 104203029 A | 12/2014 | | |
| CN | 104363783 A | 2/2015 | | |
| CN | 104490008 A | 4/2015 | | |
| CN | 109952042 A | 6/2019 | | |
| DE | 2907506 A1 | 9/1980 | | |
| DE | 3406504 A1 | 8/1985 | | |
| DE | 3627538 A1 | 2/1988 | | |
| DE | 3723549 A1 | 2/1988 | | |
| DE | 3406504 C2 | 1/1990 | | |
| DE | 3839747 A1 | 5/1990 | | |
| DE | 3905989 C2 | 1/1991 | | |
| DE | 4202159 A1 | 7/1993 | | |
| DE | 4401282 A1 | 12/1994 | | |
| DE | 4446252 A1 | 6/1995 | | |
| DE | 19708622 A1 | 9/1997 | | |
| DE | 19938609 A1 | 3/2001 | | |
| DE | 10138426 C1 | 12/2002 | | |
| DE | 102009009589 A1 | 9/2010 | | |
| DE | 102010046278 A1 | 2/2011 | | |
| DE | 202016104626 U1 | 10/2016 | | |
| EP | 0007948 A1 | 2/1980 | | |
| EP | 0130816 A2 * | 6/1984 | | A43B 13/16 |
| EP | 316289 A2 | 5/1989 | | |
| EP | 0359699 A1 | 3/1990 | | |
| EP | 0383685 A1 | 8/1990 | | |
| EP | 529941 A1 | 3/1993 | | |
| EP | 2609824 A1 | 7/2013 | | |
| EP | 2649896 B1 | 10/2016 | | |
| EP | 3386334 A1 | 10/2018 | | |
| FR | 996111 A | 12/1951 | | |
| FR | 1018215 A | 12/1952 | | |
| FR | 2642941 A1 | 8/1990 | | |
| FR | 2824884 A1 | 11/2002 | | |
| GB | 1301147 A | 12/1972 | | |
| GB | 2066049 A | 7/1981 | | |
| GB | 2462100 A | 1/2010 | | |
| JP | S56-080702 U | 6/1981 | | |
| JP | H02-121601 A | 5/1990 | | |
| JP | H02252401 A | 10/1990 | | |
| JP | H05-37104 U | 5/1993 | | |
| JP | H0723804 A | 1/1995 | | |
| JP | H0739404 A | 2/1995 | | |
| JP | 3042853 U | 11/1997 | | |
| JP | H11-32806 A | 2/1999 | | |
| JP | 2000316606 A | 11/2000 | | |
| JP | 2002306280 A | 10/2002 | | |
| JP | 2008533327 A | 8/2008 | | |
| JP | 2009056007 A | 3/2009 | | |
| JP | 2014033742 A | 2/2014 | | |
| JP | 2015513354 A | 5/2015 | | |
| JP | 2016182332 A | 10/2016 | | |
| KR | 19990069793 A | 9/1999 | | |
| KR | 100230096 B1 | 11/1999 | | |
| KR | 200374026 Y1 | 1/2005 | | |
| KR | 20100086227 A | 7/2010 | | |
| KR | 20120033710 A | 4/2012 | | |
| TW | 385636 U | 3/2000 | | |
| WO | WO-1997035496 A1 | 10/1997 | | |
| WO | WO-9947014 A1 | 9/1999 | | |
| WO | WO-2006049401 A1 | 5/2006 | | |
| WO | WO-2008012809 A2 | 1/2008 | | |
| WO | WO-2012177957 A2 | 12/2012 | | |
| WO | WO-2013013784 A1 | 1/2013 | | |
| WO | WO-2014126799 A1 | 8/2014 | | |
| WO | WO-2015065578 A1 | 5/2015 | | |
| WO | WO-2018169535 A1 | 9/2018 | | |
| WO | WO-2018175734 A1 | 9/2018 | | |
| WO | WO-2020125963 A1 | 6/2020 | | |

OTHER PUBLICATIONS

European Patent Office as the International Searching Authority, International Search Report and Written Opinion for PCT Application No. PCT/US2016/053240, mailed Jan. 3, 2017.

European Patent Office as the International Searching Authority, International Search Report and Written Opinion for PCT Application No. PCT/US2016/053260, mailed Dec. 15, 2016.

European Patent Office as the International Searching Authority, International Search Report and Written Opinion for PCT Application No. PCT/US2016/053232, mailed Jan. 10, 2017.

European Patent Office as the International Searching Authority, International Search Report and Written Opinion for PCT Application No. PCT/US2016/053246, mailed Jan. 10, 2017.

European Patent Office as the International Searching Authority, International Search Report and Written Opinion for PCT Application No. PCT/US2016/053265, mailed Dec. 20, 2016.

United States Patent and Trademark Office, Office Action for U.S. Appl. No. 15/816,270, mailed Apr. 17, 2018.

United States Patent and Trademark Office, Office Action for U.S. Appl. No. 15/816,200, mailed Apr. 18, 2018.

Korean Intellectual Property Office, Office Action for Application No. 10-2018-7011476, mailed May 29, 2019.

Korean Intellectual Property Office, Office Action for Application No. 10-2018-7011477, mailed May 29, 2019.

Korean Intellectual Property Office, Office Action for Application No. 10-2018-7011479, mailed Jun. 4, 2019.

Korean Intellectual Property Office, Office Action for Application No. 10-2018-7011480, mailed Jun. 10, 2019.

Korean Intellectual Property Office, Office Action for Application No. 10-2018-7011478, mailed Jun. 4, 2019.

Japan Patent Office, Notice of Reasons for Rejection for JP Application No. 2018-515812 mailed Jul. 29, 2019.

Japan Patent Office, Notice of Reasons for Rejection for JP Application No. 2018-515822 mailed Jul. 22, 2019.

Japan Patent Office, Notice of Reasons for Rejection for JP Application No. 2018-515842 mailed Aug. 5, 2019.

Japan Patent Office, Notice of Reasons for Rejection for JP Application No. 2018-515825 mailed Jul. 22, 2019.

Japan Patent Office, Notice of Reasons for Rejection for JP Application No. 2018-515843 mailed Aug. 5, 2019.

Japan Patent Office, Notice of Reasons for Rejection for JP Application No. 2018-515828 mailed Jul. 22, 2019.

(56) References Cited

OTHER PUBLICATIONS

Taiwan Intellectual Property Office, Search Report for TW Application No. 105130844 mailed Aug. 28, 2019.
European Patent Office (ISA), International Search Report and Written Opinion for PCT Application No. PCT/US2017/022651, mailed Oct. 25, 2017.
European Patent Office (ISA), International Search Report and Written Opinion for PCT Application No. PCT/US2017/022647, mailed Nov. 2, 2017.
European Patent Office (ISA), International Preliminary Report on Patentability for International Application No. PCT/US2017/022651, mailed Sep. 26, 2019.
European Patent Office (ISA), International Preliminary Report on Patentability for International Application No. PCT/US2017/022647, mailed Sep. 26, 2019.
United States Patent and Trademark Office, Office Action for U.S. Appl. No. 15/574,700, mailed Oct. 22, 2019.
Korean Intellectual Property Office, Office Action for KR Application No. 10-2018-7011479, mailed Dec. 26, 2019.
Korean Intellectual Property Office, Office Action for KR Application No. 10-2018-7011480, mailed Jan. 21, 2020.
European Patent Office, Extended European Search Report for EP Application No. 19196682.9, mailed Jan. 2, 2020.
China National Intellectual Property Office, Office Action for CN Application No. 201680062271.7, mailed Feb. 3, 2020.
Korean Intellectual Property Office, Office Action for KR Application No. 10-2019-7036063, mailed Feb. 7, 2020.
China National Intellectual Property Office, Office Action for CN Application No. 201680066156.7, mailed Jan. 22, 2020.
China National Intellectual Property Office, Office Action and Search Report for CN Application No. 201680062323.0, mailed Mar. 4, 2020.
China National Intellectual Property Office, Office Action and Search Report for CN Application No. 201680062231.2, mailed Mar. 24, 2020.
China National Intellectual Property Office, Office Action for CN Application No. 201680066534.1, mailed Mar. 26, 2020.
China National Intellectual Property Office, Office Action and Search Report for CN Application No. 201680062300.X, mailed Mar. 12, 2020.
European Patent Office, Communication pursuant to Article 94(3) EPC for EP Application No. 16777864.6, mailed Apr. 7, 2020.
European Patent Office, Communication pursuant to Article 94(3) EPC for EP Application No. 16777865.3, mailed Apr. 20, 2020.
Korean Intellectual Property Office, Office Action for KR Application No. 10-2020-7003423, mailed Apr. 21, 2020.
European Patent Office, Communication pursuant to Article 94(3) EPC for EP Application No. 16777863.8, mailed Apr. 15, 2020.
Japan Patent Office, Decision of Rejection for JP Application No. 2018-515812, mailed Apr. 6, 2020.
European Patent Office, Extended European Search Report for EP Application No. 19212921.1, mailed Mar. 31, 2020.
European Patent Office (ISA), International Search Report and Written Opinion for PCT Application No. PCT/US2020/042784, mailed Sep. 17, 2020.
Ge, Chengbiao et al., Steam-chest molding of expanded thermoplastic polyurethane bead foams and their mechanical properties, Chemical Engineering Science 174 (2017) pp. 337-346.
Japan Patent Office, Notification of Reasons for Refusal for JP Application No. 2019-550843, mailed Nov. 24, 2020.
European Patent Office, Communication pursuant to Article 94(3) EPC for EP Application No. 16777864.6, mailed Dec. 16, 2020.
European Patent Office, Communication pursuant to Article 94(3) EPC for EP Application No. 16777863.8, mailed Dec. 22, 2020.
KS65 Luxury Light Fescue—Field Green <http://www.kodiaksports.com/Artificial-Turf/Fake-Grass/Artificial-Grass-ST65_LFS_Field, Oct. 12, 2013, (Oct. 12, 2013), Retrieved from internet: URL:https://web.archive.org/web/*/http://www.kodiaksports.com/core/media/media.nl/id.28351/c.1268496/.f?h=1c04c87e9fd3f9d67f24 [retrieved on Dec. 15, 2016].
European Patent Office as the International Searching Authority, International Search Report and Written Opinion for PCT Application No. PCT/US2020/042735, mailed Sep. 16, 2020.
European Patent Office as the International Searching Authority, International Search Report and Written Opinion for PCT Application No. PCT/US2020/042784, mailed Sep. 17, 2020.
European Patent Office as the International Searching Authority, International Search Report and Written Opinion for PCT Application No. PCT/US2020/042807, mailed Sep. 16, 2020.
Taiwan Office Action for Application 109111247 dated Apr. 30, 2021.
Japan Patent Office, Notice of Reasons for Rejection for JP Application No. 2020-017002 mailed May 31, 2021.
Japan Patent Office, Notice of Reasons for Rejection for JP Application No. 2019-550853 mailed May 25, 2021.
Japanese Office Action for Application No. 2020-017000 dated May 31, 2021.
China National Intellectual Property Administration, Second Office Action for application No. 201780088457.4 dated Jul. 19, 2021.
Taiwan Intellectual Property Office, Office Action dated Sep. 3, 2021 for application No. 109125077.
Taiwan Intellectual Property Office, Office Action dated Jun. 3, 2021 for application No. 109125078.
Taiwan Intellectual Property Office, Office Action dated Jun. 3, 2021 for application No. 109125079.
China National Intellectual Property Administration, Decision of Rejection Office Action dated Jun. 29, 2021 for application No. 201680062323.0.
European Patent Office, Extended European Search Report for EP Application No. 22161547.9 mailed Jun. 3, 2022.
United States Patent and Trademark Office, Non-Final Office Action for U.S. Appl. No. 16/493,952 mailed Jul. 22, 2022.
USPTO, Non-Final Office Action for U.S. Appl. No. 16/493,994. mailed Oct. 6, 2022.

\* cited by examiner

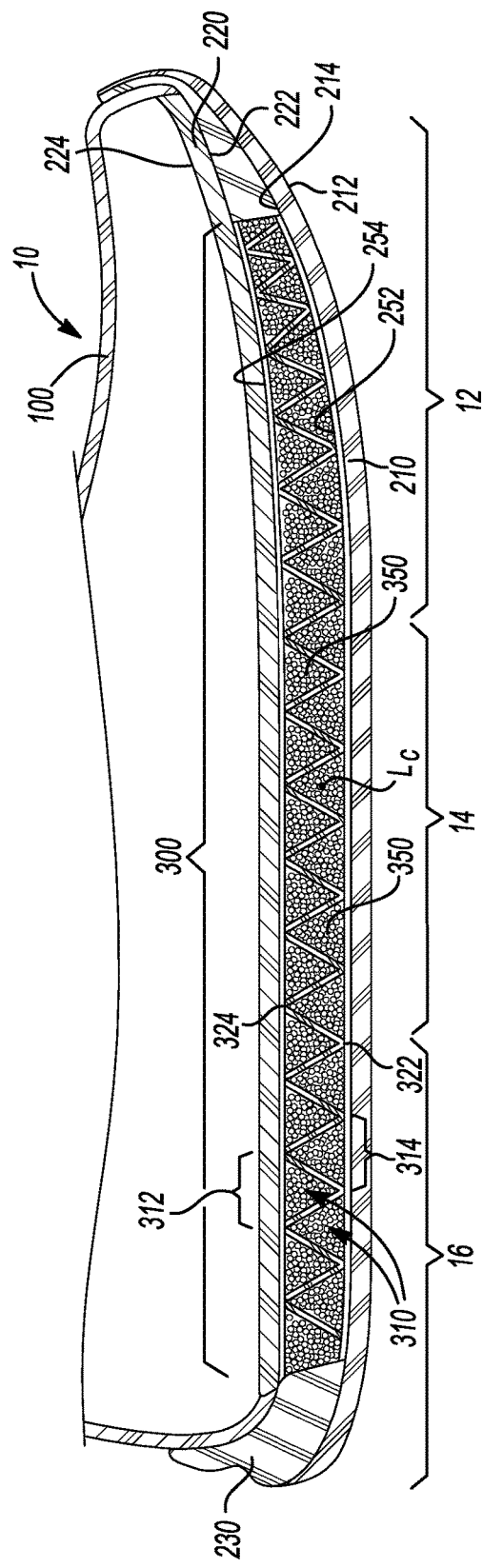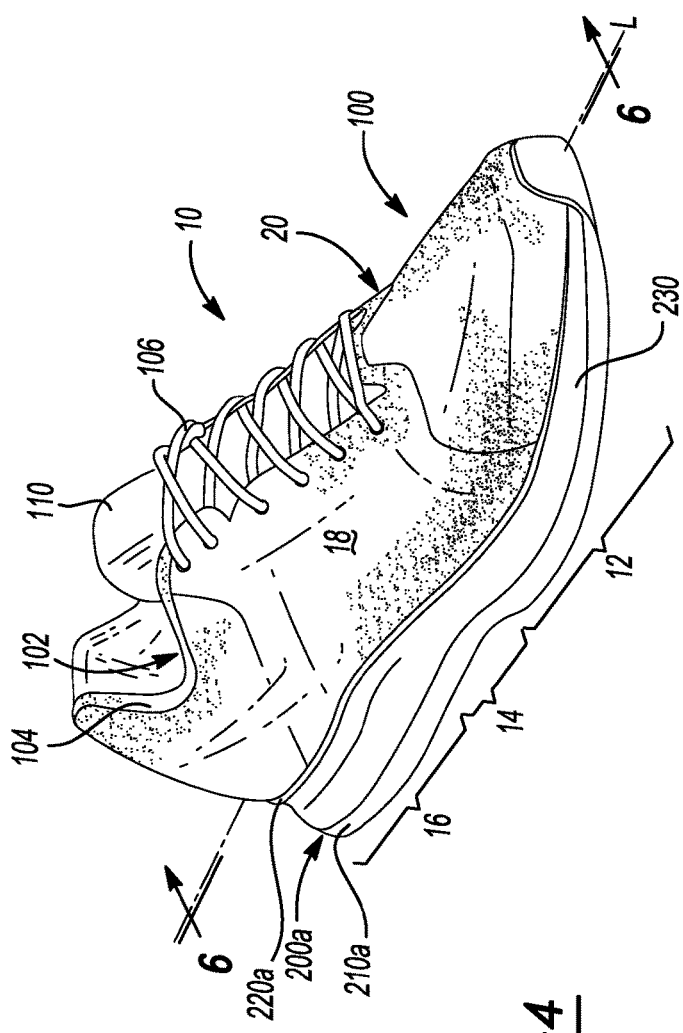

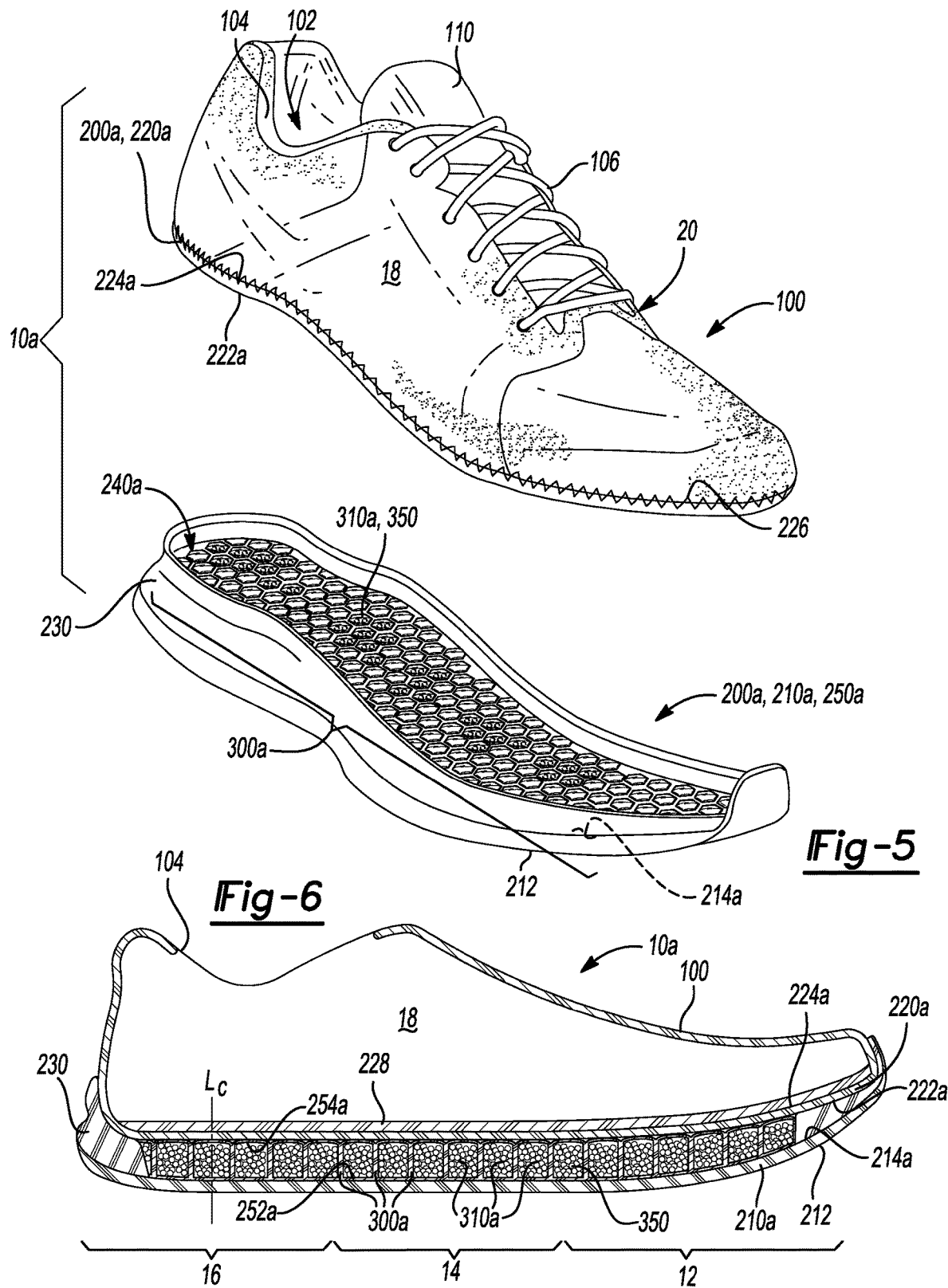

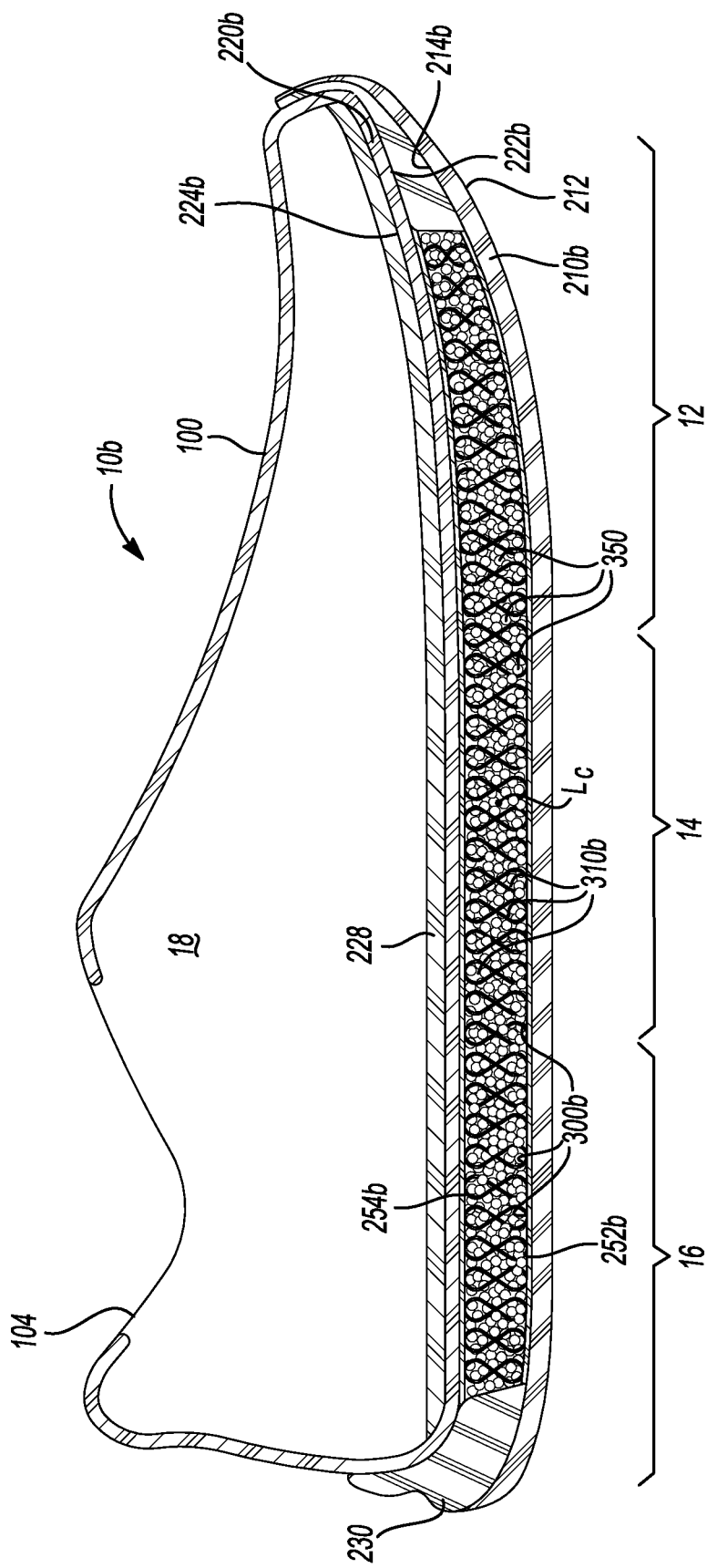

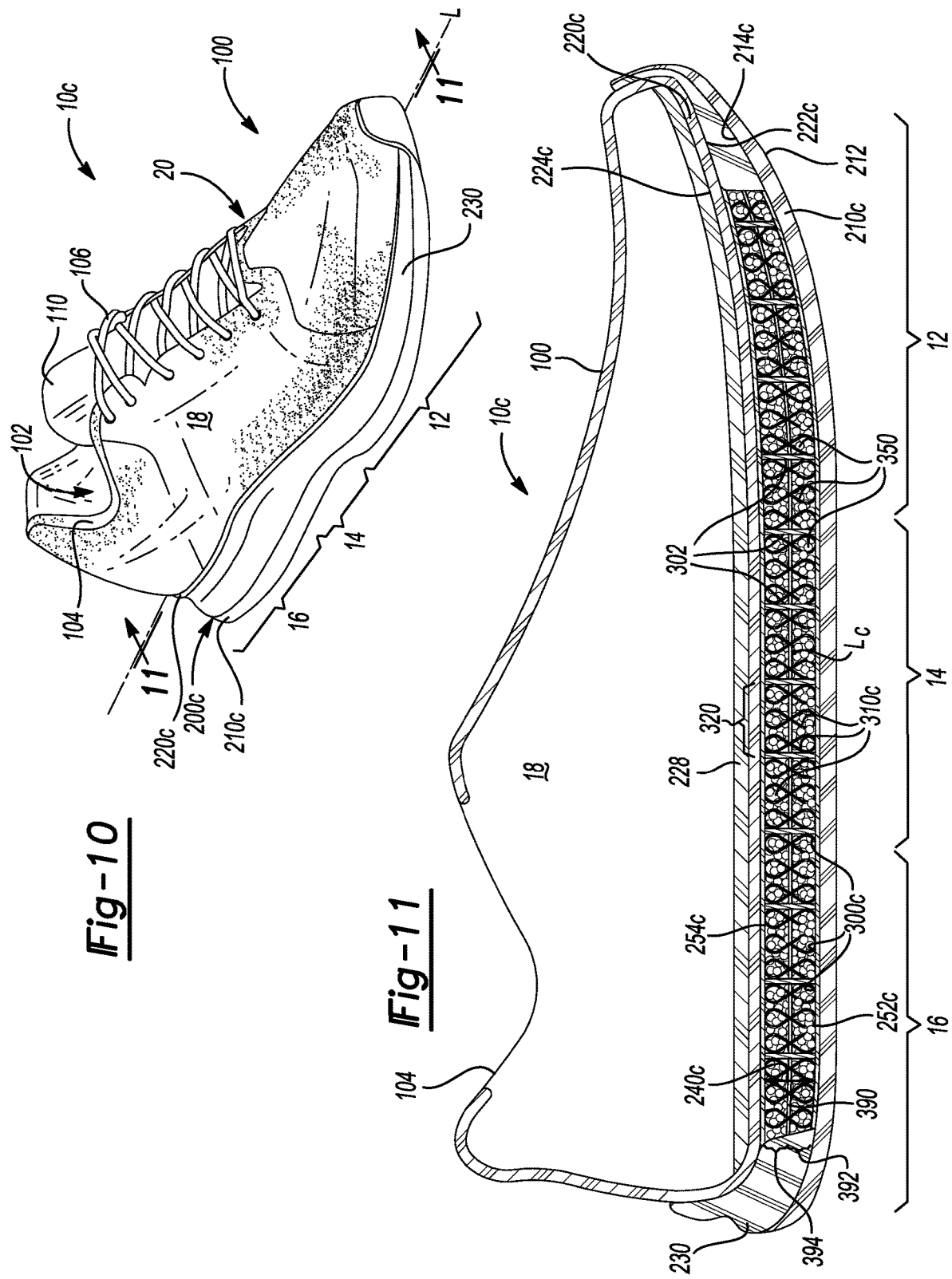

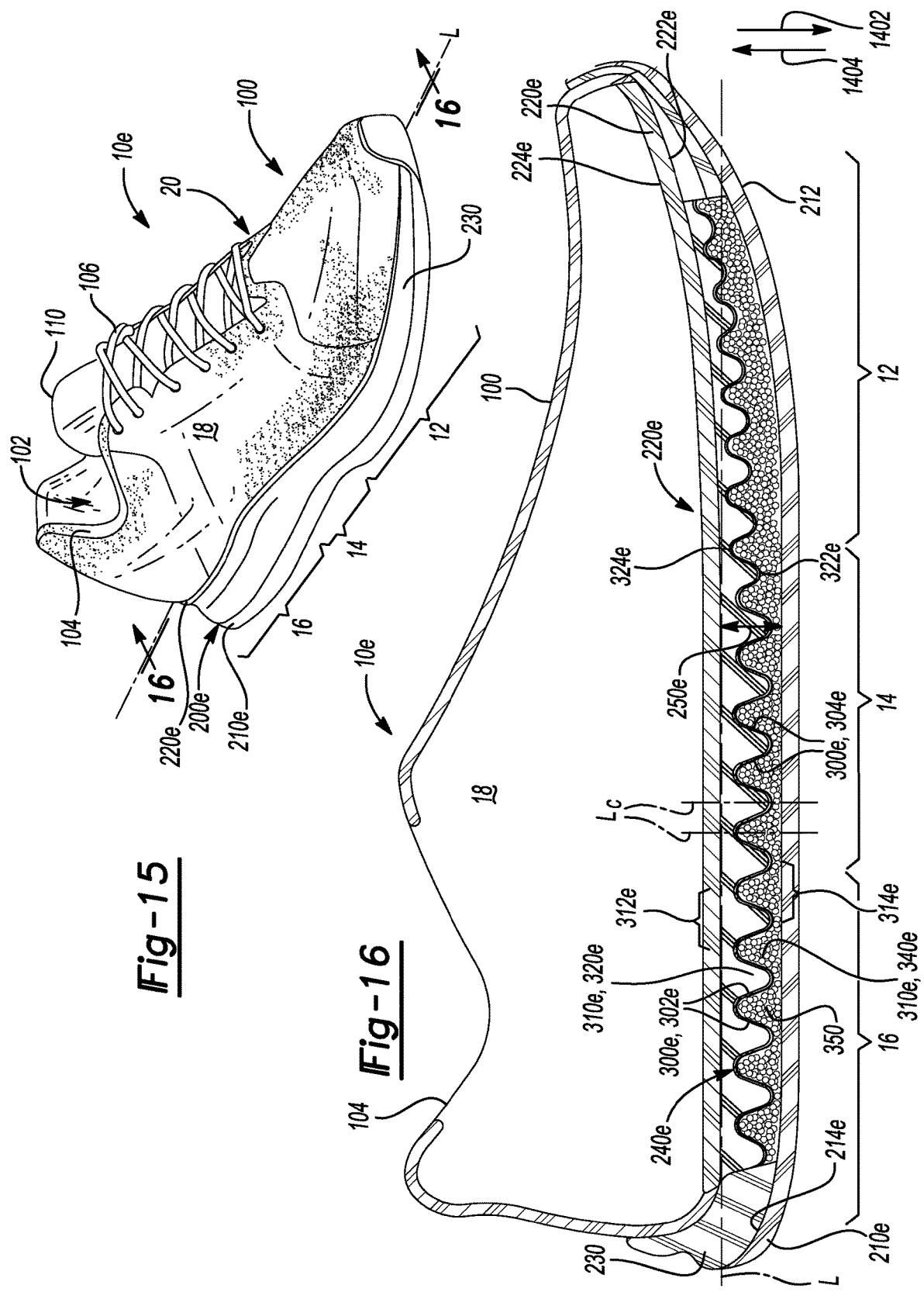

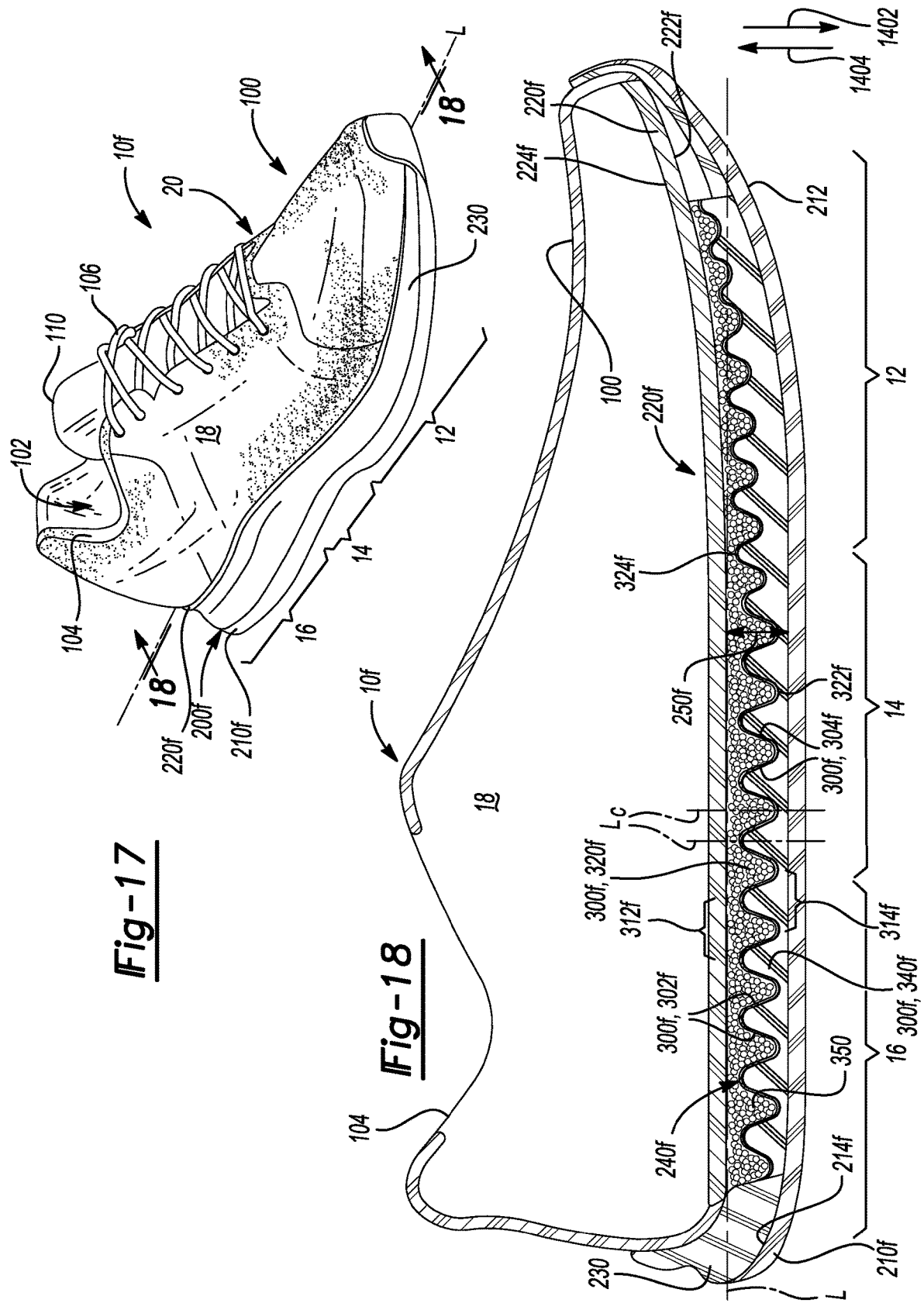

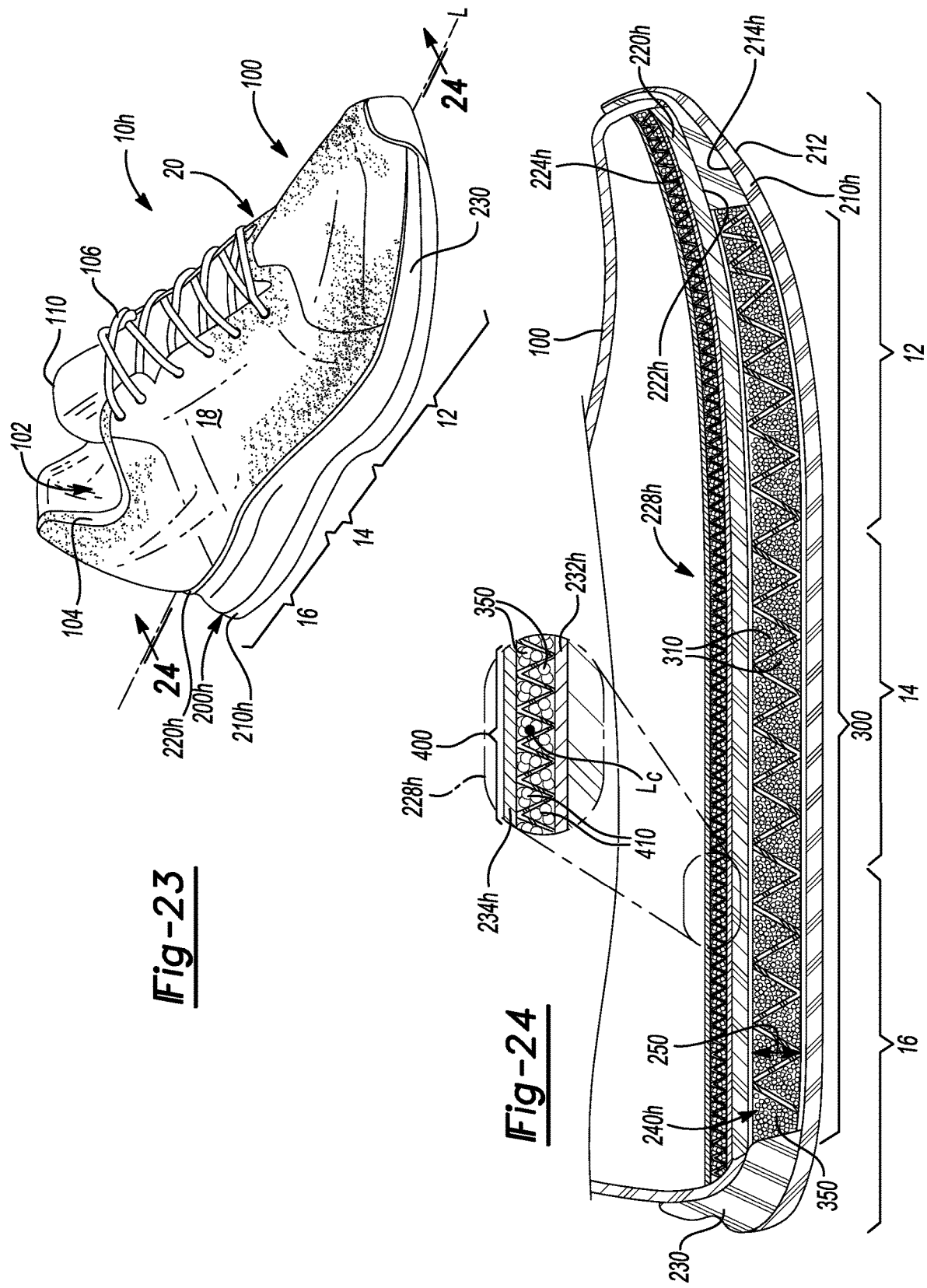

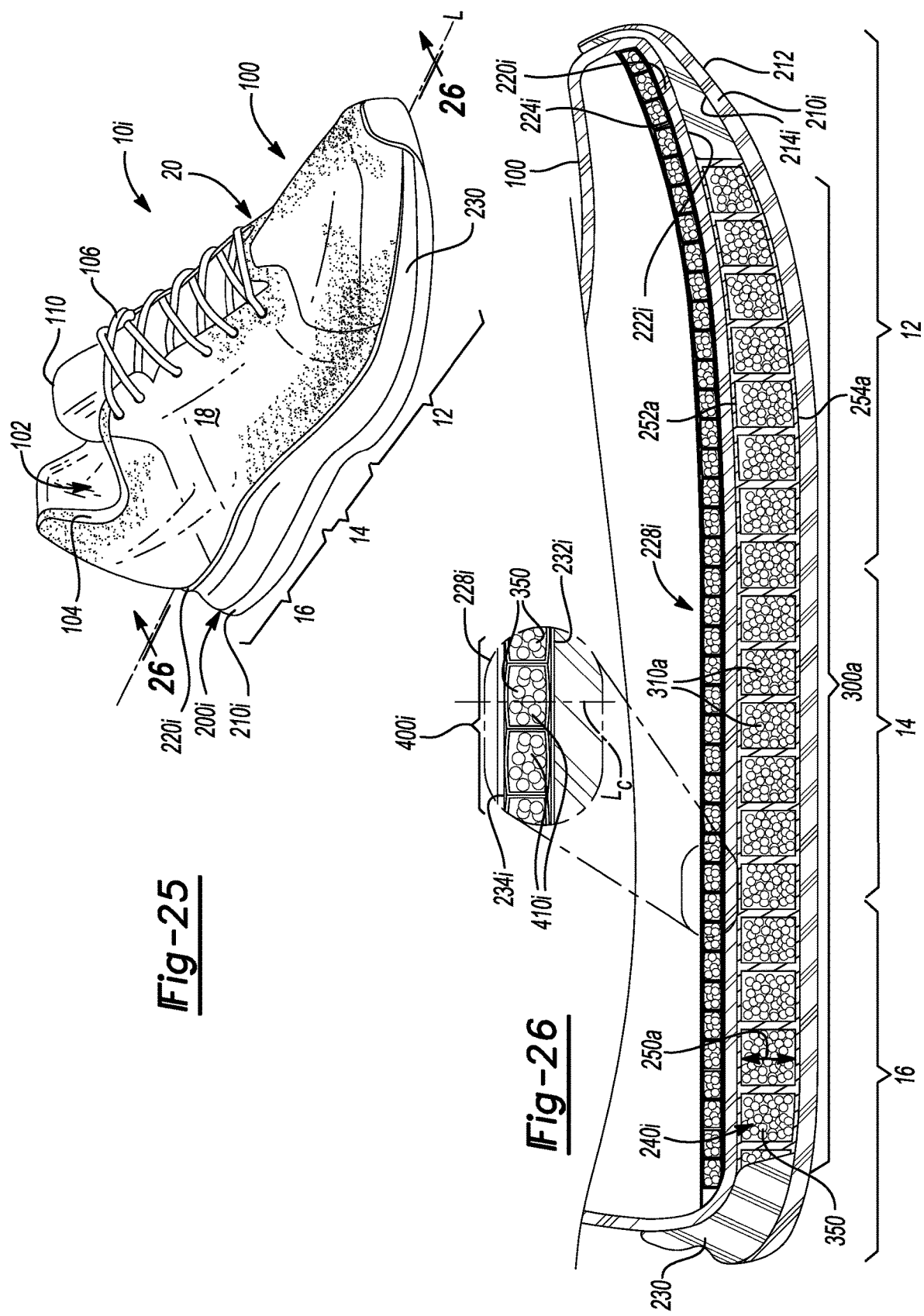

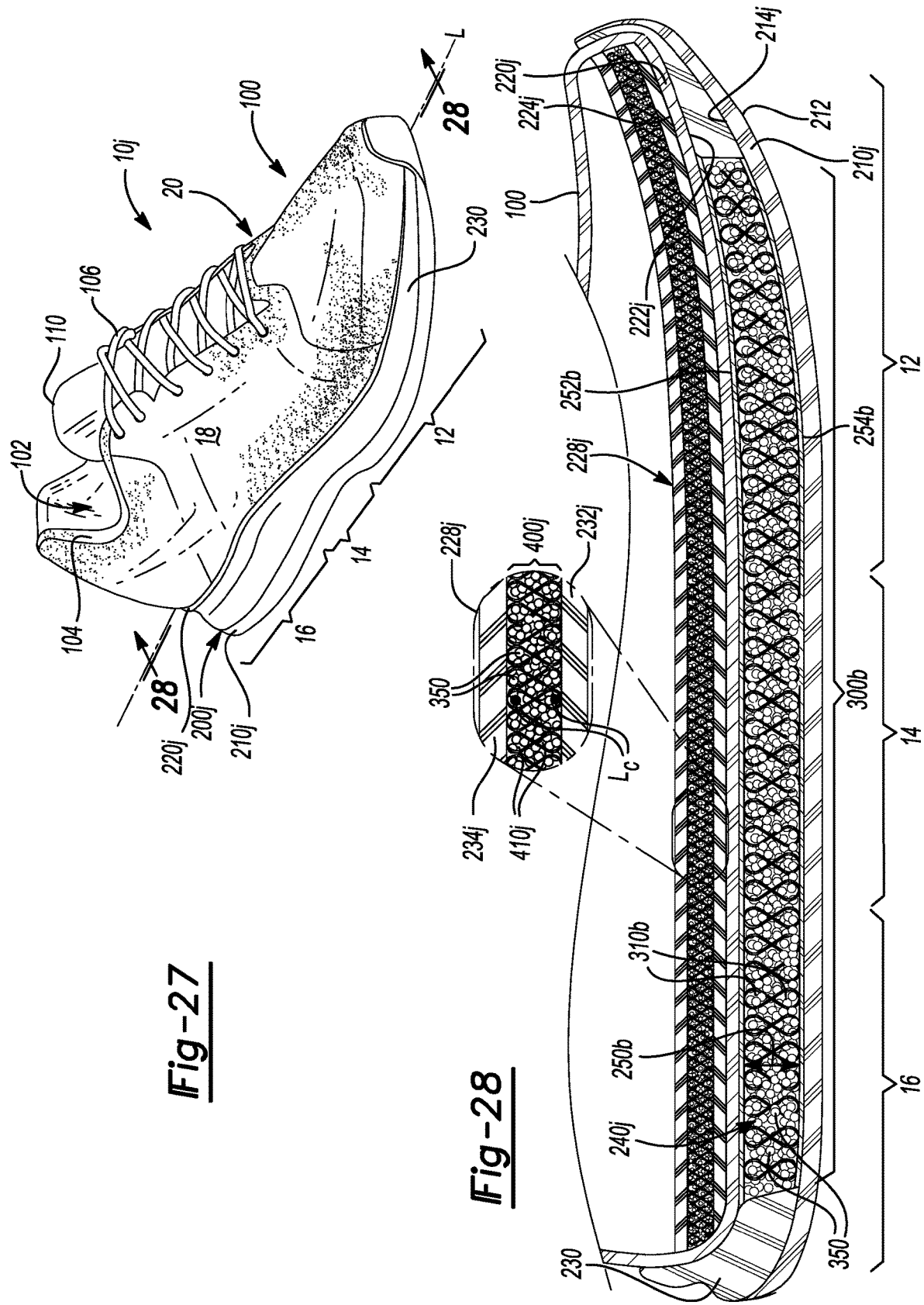

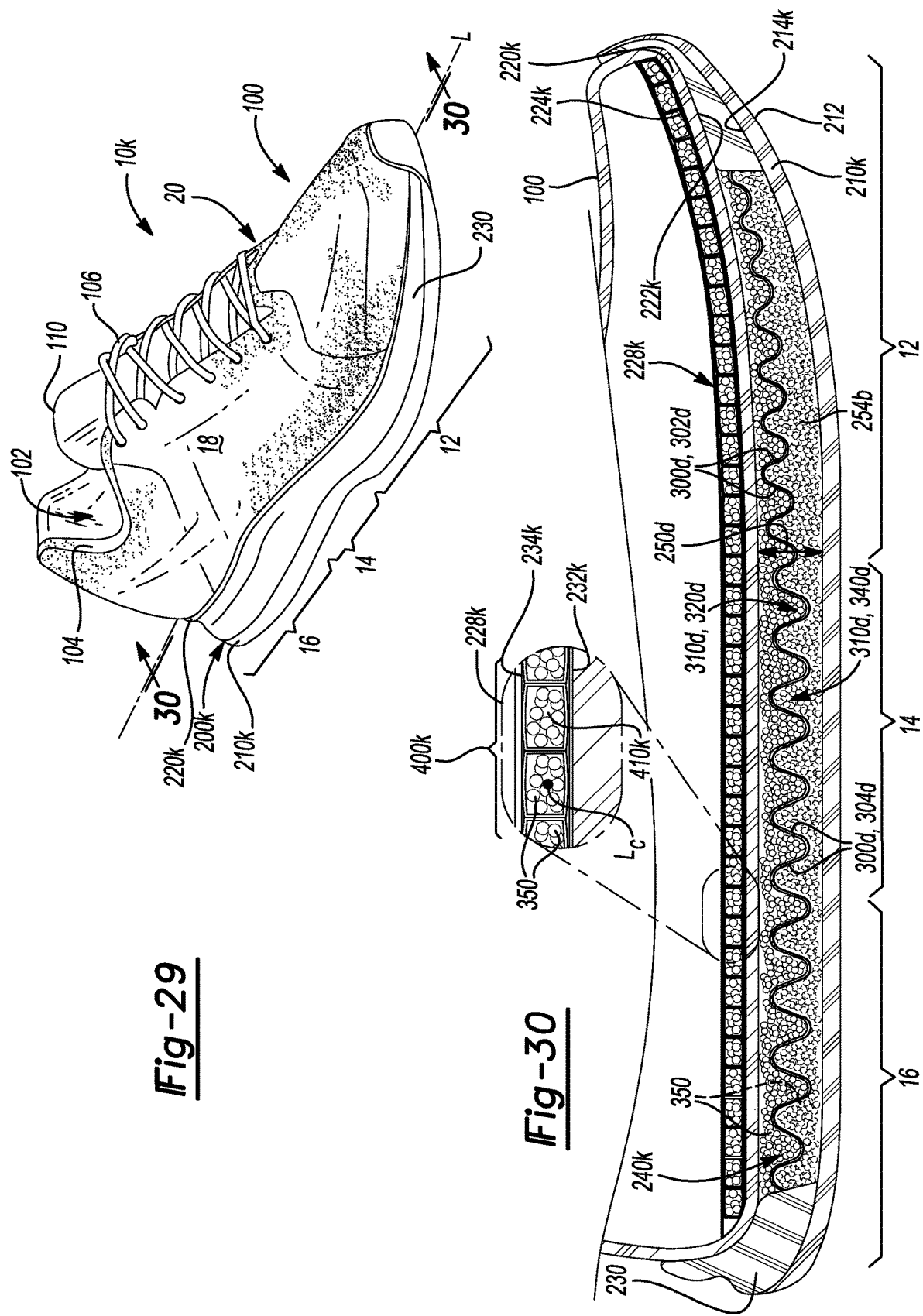

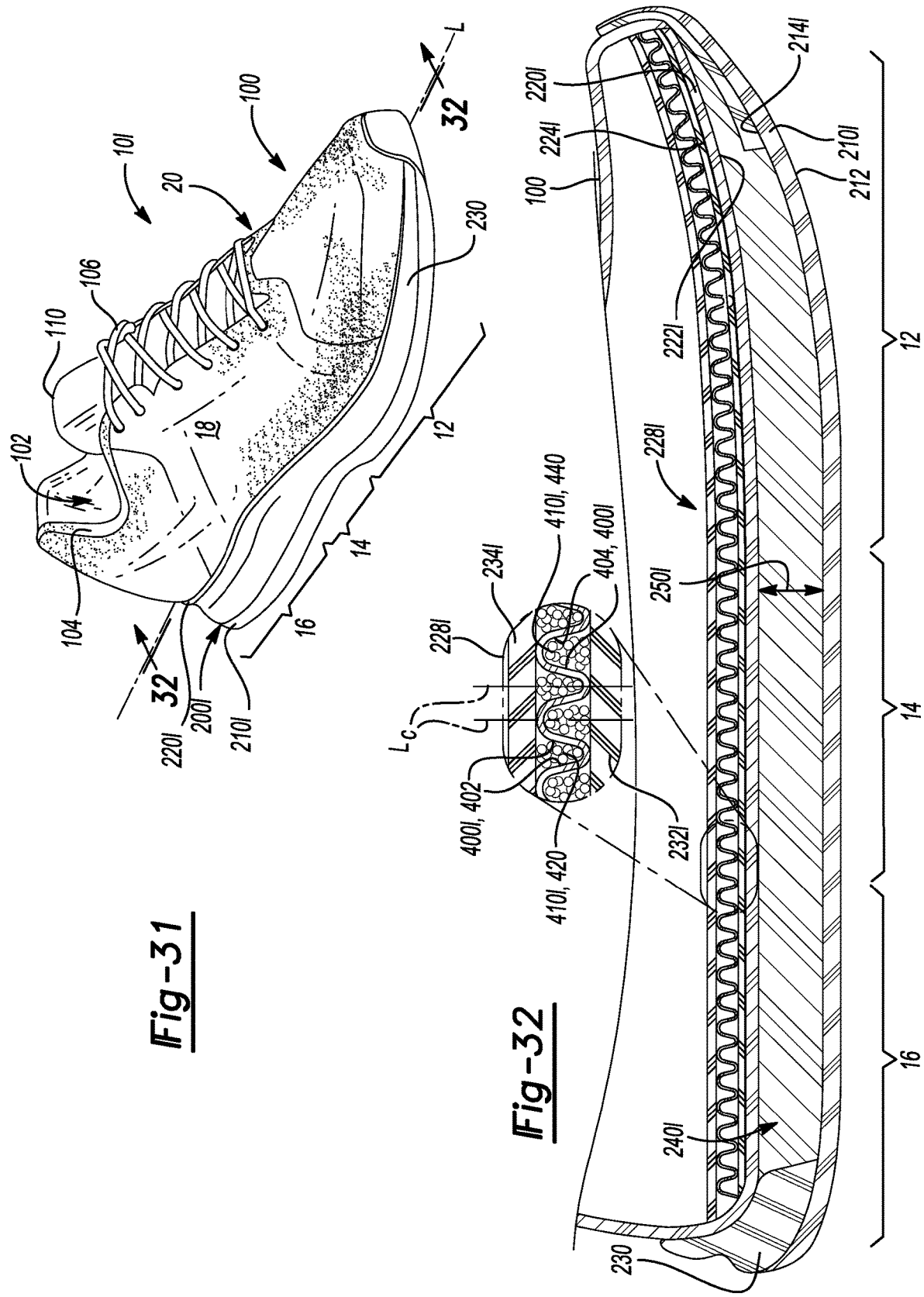

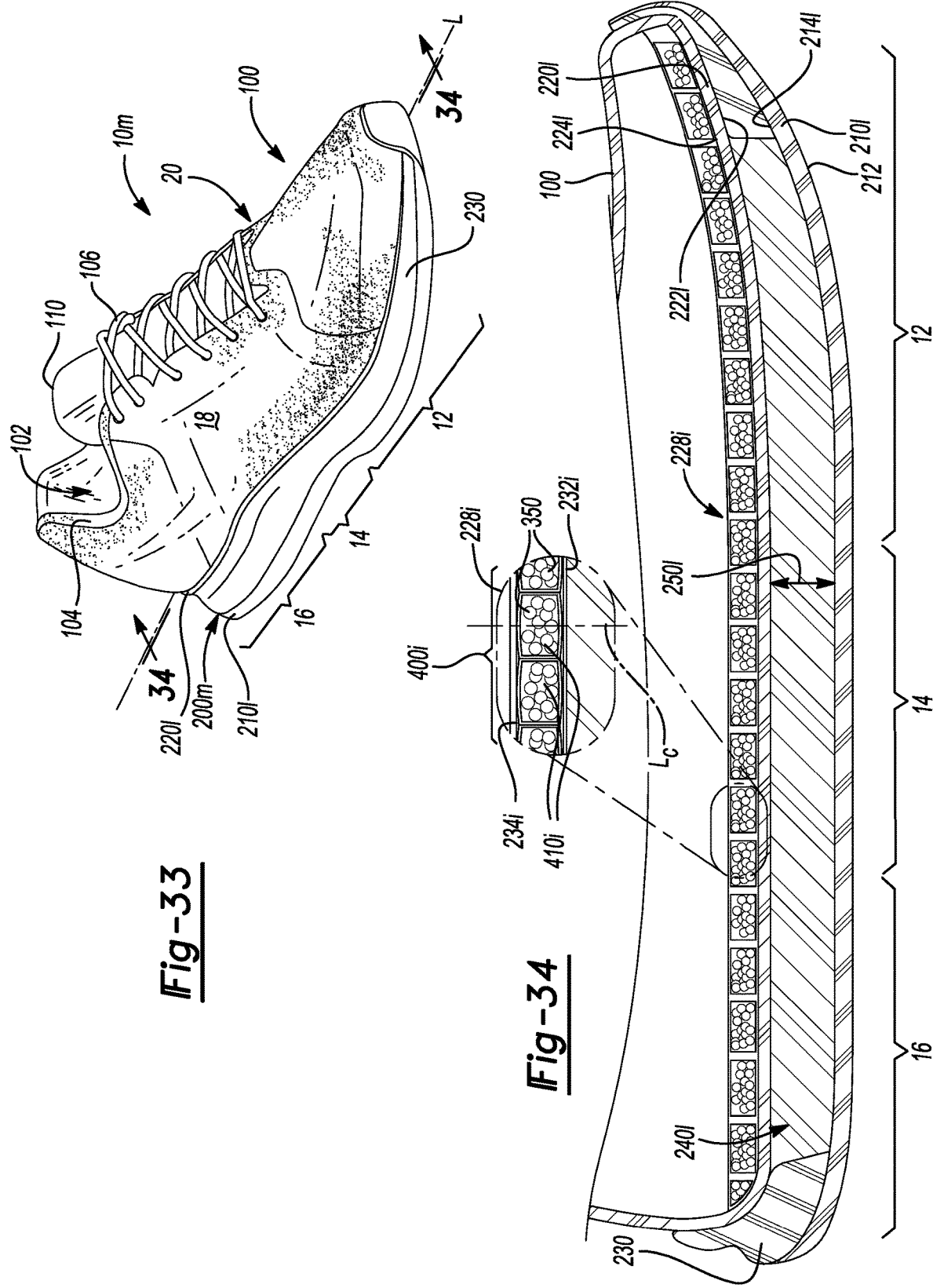

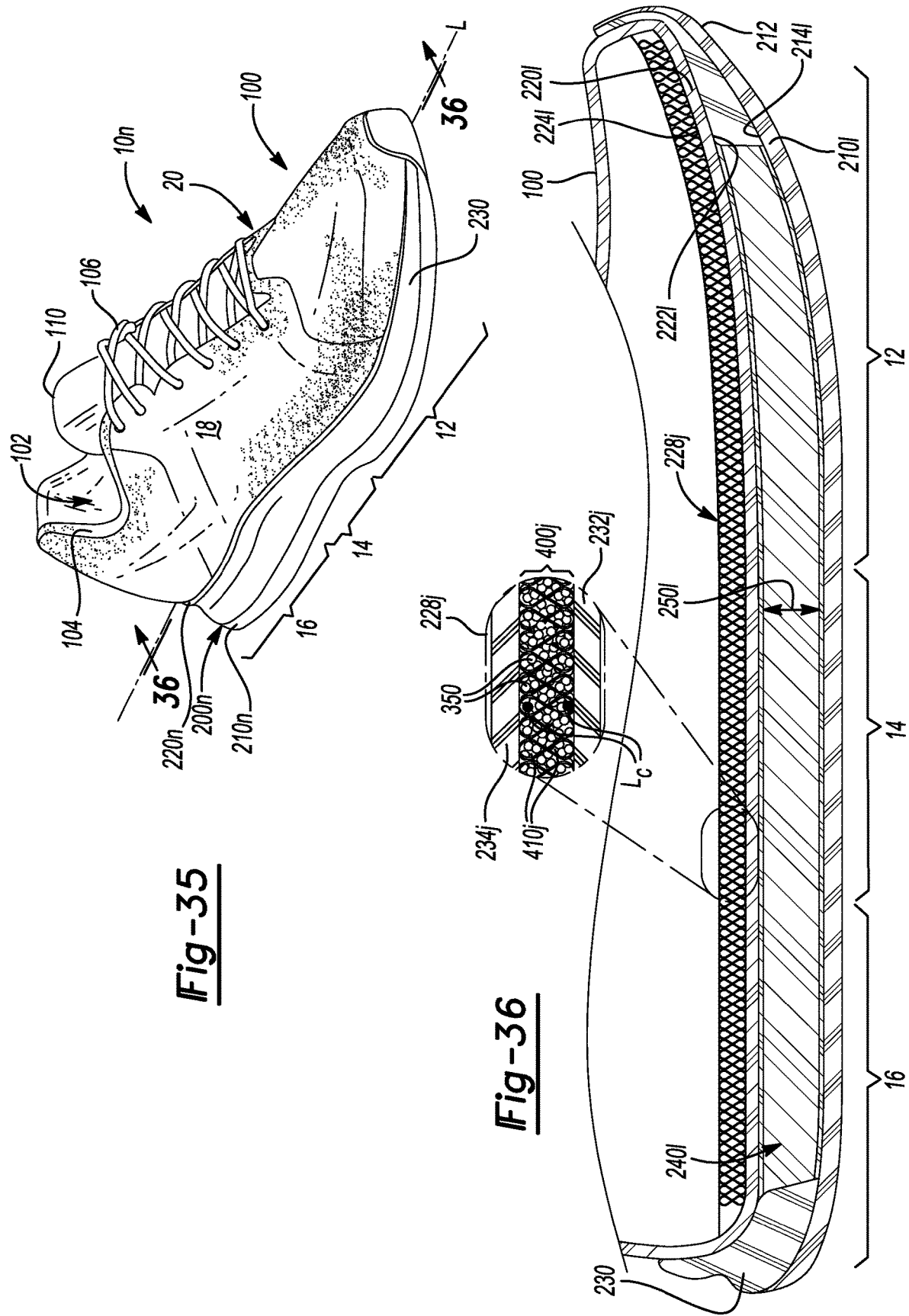

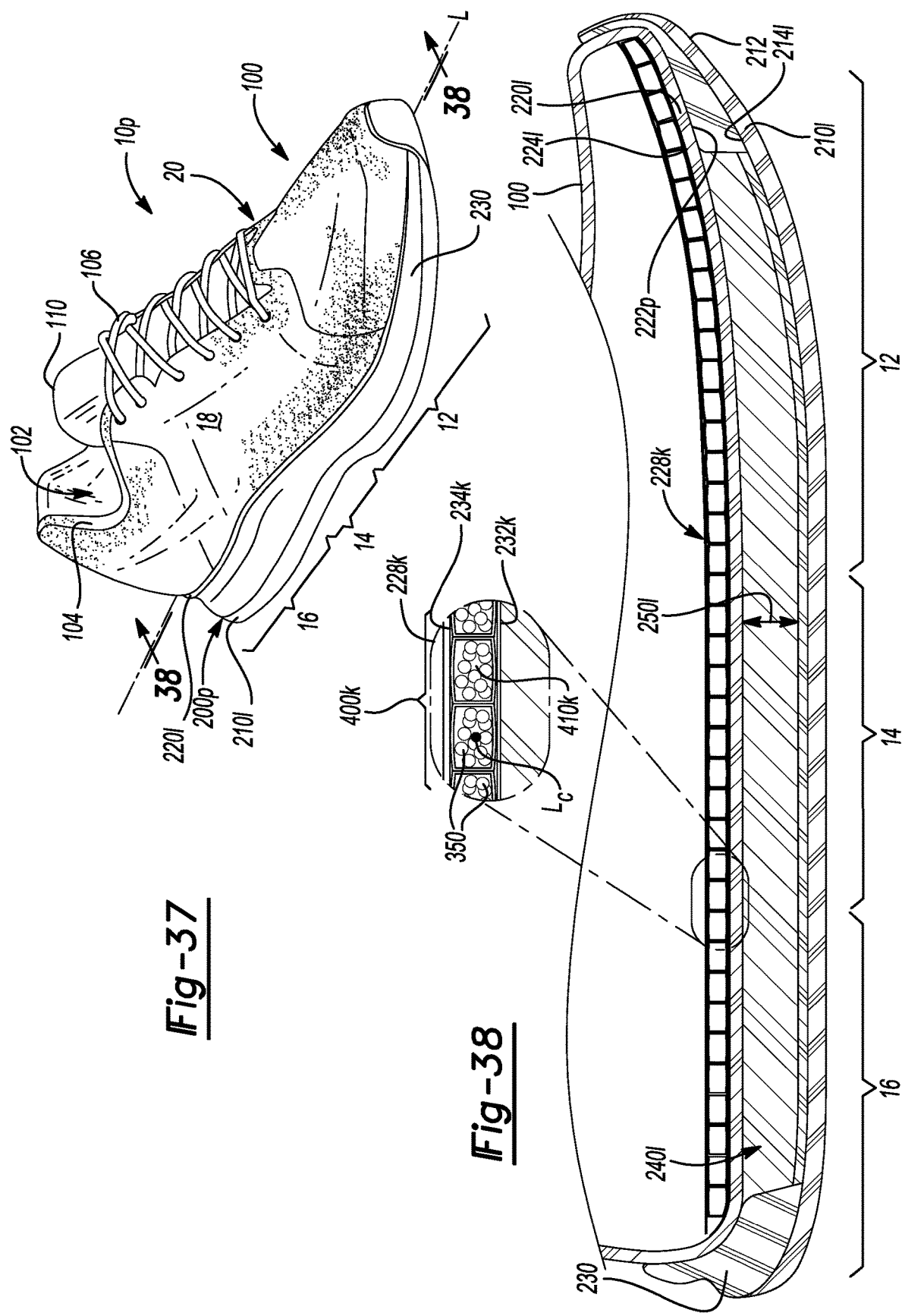

PARTICULATE FOAM WITH PARTIAL RESTRICTION

CROSS REFERENCE TO RELATED APPLICATIONS

This application is a continuation of U.S. patent application Ser. No. 16/327,344, filed Feb. 22, 2019, which is a 371 National Stage entry based on International Application No. PCT/US2016/053265, filed Sep. 23, 2016, which claims priority to U.S. Provisional Application Ser. No. 62/222,882, filed Sep. 24, 2015, and to U.S. Provisional Application Ser. No. 62/222,873, filed Sep. 24, 2015, and to U.S. Provisional Application Ser. No. 62/222,851, filed Sep. 24, 2015, and to U.S. Provisional Application Ser. No. 62/222,842, filed Sep. 24, 2015, and to U.S. Provisional Application Ser. No. 62/222,832, filed Sep. 24, 2015, and to U.S. Provisional Application Ser. No. 62/222,816, filed Sep. 24, 2015, the disclosures of which are hereby incorporated by reference in their entirety.

FIELD

The present disclosure relates to articles of footwear having particulate foam incorporated with elements that restrict migration of the particulate foam within the article of footwear.

BACKGROUND

This section provides background information related to the present disclosure which is not necessarily prior art.

Articles of footwear conventionally include an upper and a sole structure. The upper may be formed from any suitable material(s) to receive, secure and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side which may be contoured to conform to a profile of the bottom surface of the foot. Sole structures may also include a comfort-enhancing insole or a sockliner located within a void proximate to the bottom portion of the upper.

Midsoles using polymer foam materials are generally configured as a single slab that compresses resiliently under applied loads, such as during walking or running movements. Generally, single-slab polymer foams are designed with an emphasis on balancing cushioning characteristics that relate to softness and responsiveness as the slab compresses under gradient loads. Polymer foams providing cushioning that is too soft will decrease the compressibility and the ability of the midsole to attenuate ground-reaction forces after repeated compressions. Conversely, polymer foams that are too hard and, thus, very responsive, sacrifice softness, thereby resulting in a loss in comfort. While different regions of a slab of polymer foam may vary in density, hardness, energy return, and material selection to balance the softness and responsiveness of the slab as a whole, creating a single slab of polymer foam that loads in a gradient manner from soft to responsive is difficult to achieve.

DRAWINGS

The drawings described herein are for illustrative purposes only of selected configurations and are not intended to limit the scope of the present disclosure.

FIG. 3 is a cross-sectional view taken along line 3-3 of FIG. 1 showing a midsole having a series of walls that define a series of channels each configured to receive a quantity of particulate matter;

FIG. 4 is a top perspective view of an article of footwear in accordance with principles of the present disclosure;

FIG. 5 is an exploded view of the article of footwear of FIG. 4 showing a midsole having a series of walls that define a series of channels each configured to receive a quantity of particulate matter;

FIG. 6 is a cross-sectional view taken along line 6-6 of FIG. 4 showing a midsole having a series of walls that define a series of channels each configured to receive a quantity of particulate matter;

FIG. 9 is a cross-sectional view taken along line 9-9 of FIG. 7 showing a midsole having a series of walls that define a series of channels and a quantity of particulate matter residing within the series of channels and between bottom and top surfaces of the midsole;

FIG. 10 is a top perspective view of an article of footwear in accordance with principles of the present disclosure;

FIG. 11 is a cross-sectional view taken along line 11-11 of FIG. 10 showing a midsole having a first series of walls that define a first series of channels and a second series of walls that define a second series of channels;

FIG. 15 is a top perspective view of an article of footwear in accordance with principles of the present disclosure;

FIG. 16 is a cross-sectional view taken along line 16-16 of FIG. 15 showing particulate matter residing within each one of a lower series of channels of a midsole that extend from an inner surface of an outsole;

FIG. 17 is a top perspective view of an article of footwear in accordance with principles of the present disclosure;

FIG. 18 is a cross-sectional view taken along line 18-18 of FIG. 17 showing particulate matter residing within each one of an upper series of channels of a midsole that extend from a bottom surface of a footbed;

FIG. 23 is a top perspective view of an article of footwear in accordance with principles of the present disclosure;

FIG. 24 is a cross-sectional view taken along line 24-24 of FIG. 23 showing a sole structure having an insole and a midsole each including a series of walls defining a series of channels that receive a quantity of particulate matter;

FIG. 25 is a top perspective view of an article of footwear in accordance with principles of the present disclosure;

FIG. 26 is a cross-sectional view taken along line 26-26 of FIG. 25 showing a sole structure having an insole and a midsole each including a series of walls defining a series of channels that receive a quantity of particulate matter;

FIG. 27 is a top perspective view of an article of footwear in accordance with principles of the present disclosure;

FIG. 28 is a cross-sectional view taken along line 28-28 of FIG. 27 showing a sole structure having an insole and a midsole each including a series of walls defining a series of channels that receive a quantity of particulate matter;

FIG. 29 is a top perspective view of an article of footwear in accordance with principles of the present disclosure;

FIG. 30 is a cross-sectional view taken along line 30-30 of FIG. 29 showing a sole structure having an insole and a midsole each including a series of walls defining a series of channels that receive a quantity of particulate matter;

FIG. 31 is a top perspective view of an article of footwear in accordance with principles of the present disclosure;

FIG. 32 is a cross-sectional view taken along line 32-32 of FIG. 31 showing a sole structure having an insole including a series of walls defining a series of channels that receive a quantity of particulate matter and a midsole including a slab of polymer foam;

FIG. 33 is a top perspective view of an article of footwear in accordance with principles of the present disclosure;

FIG. 34 is a cross-sectional view taken along line 34-34 of FIG. 33 showing a sole structure having an insole including a series of walls defining a series of channels that receive a quantity of particulate matter and a midsole including a slab of polymer foam;

FIG. 35 is a top perspective view of an article of footwear in accordance with principles of the present disclosure;

FIG. 36 is a cross-sectional view taken along line 36-36 of FIG. 35 showing a sole structure having an insole including a series of walls defining a series of channels that receive a quantity of particulate matter and a midsole including a slab of polymer foam;

FIG. 37 is a top perspective view of an article of footwear in accordance with principles of the present disclosure;

FIG. 38 is a cross-sectional view taken along line 38-38 of FIG. 37 showing a sole structure having an insole including a series of walls defining a series of channels that receive a quantity of particulate matter and a midsole including a slab of polymer foam;

Corresponding reference numerals indicate corresponding parts throughout the drawings.

DETAILED DESCRIPTION

Figure 1:
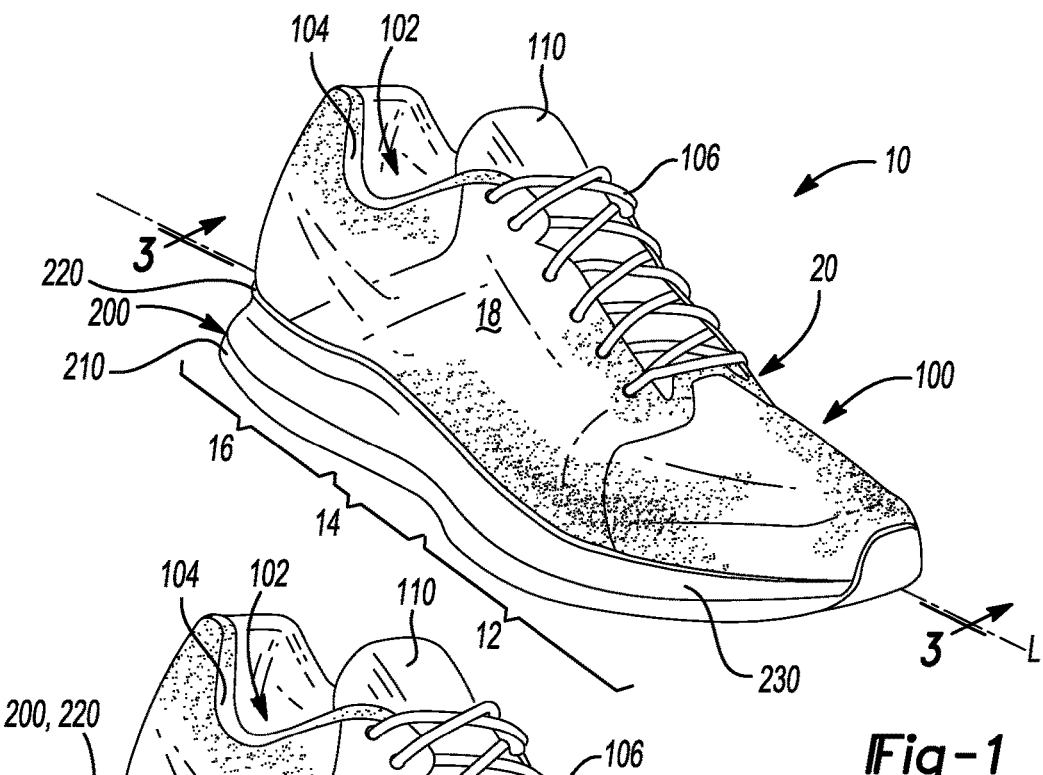
FIG. 1 is a top perspective view of an article of footwear in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on,"

"directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides an article of footwear having an upper, an outsole, and a midsole. The outsole is attached to the upper and includes a ground-engaging surface. The midsole is disposed between the upper and the outsole and includes a series of walls that define a series of channels extending substantially perpendicular to a longitudinal axis of the midsole and along an entire length of the midsole. The series of channels are isolated from one another and each receives a quantity of particulate matter therein.

Implementations of the disclosure may include one or more of the following optional features. In some implementations, the particulate matter is permitted to move along a longitudinal axis of each channel in a direction substantially perpendicular to the longitudinal axis of the midsole. Additionally or alternatively, the particulate matter may be restricted from moving between channels in a direction substantially parallel to the longitudinal axis of the midsole by the walls. In some scenarios, the channels may include a substantially circular cross-section, while in other scenarios, the channels may include a substantially triangular cross-section. In some examples, the channels overlap one another.

In some examples, the particulate matter includes foam beads. The foam beads may include a substantially spherical shape. The foam beads may include approximately the same size and shape or the foam beads may include at least one of a different size and shape.

Another aspect of the disclosure provides an article of footwear having an upper, an outsole attached to the upper and including a ground-engaging surface, and a midsole disposed between the upper and the outsole. The midsole includes a series of walls that define a series of channels extending substantially perpendicular to a longitudinal axis of the midsole. The series of channels overlap one another in a direction substantially parallel to the longitudinal axis and each channel receives a quantity of particulate matter therein.

This aspect may include one or more of the following optional features. Optionally, the particulate matter is permitted to move along a longitudinal axis of each channel in a direction substantially perpendicular to the longitudinal axis of the midsole. Additionally or alternatively, the walls may restrict the particulate matter from moving between channels in a direction substantially parallel to the longitudinal axis of the midsole. In some examples, the channels include a substantially triangular cross-section. Optionally, at least one of the series of channels overlaps a pair of the series of channels.

In some examples, the particulate matter includes foam beads. The foam beads may include a substantially spherical shape. The foam beads may include approximately the same size and shape or the foam beads may include at least one of a different size and shape.

In yet another aspect of the disclosure, an article of footwear includes an upper, an outsole, a footbed disposed between the upper and the outsole, and a midsole disposed between the upper and the outsole. The outsole is attached to the upper and includes a ground-engaging surface and an inner surface disposed on opposite sides of the outsole. The footbed includes a top surface that opposes the upper and a bottom surface that opposes the inner surface of the outsole. The midsole includes fibers that extend between the inner surface of the outsole and the bottom surface of the footbed. The fibers cooperate to define a first series of channels that extend along and substantially perpendicular to the longitudinal axis. A quantity of particulate matter is received within the first series of channels.

This aspect may include one or more of the following optional features. In some examples, the quantity of particulate matter moves between adjacent ones of the first series of channels in a direction substantially parallel to the longitudinal axis through voids located between adjacent ones of the fibers. In some implementations, the particulate matter is permitted to move along a longitudinal axis of each of the first series of channels in a direction substantially perpendicular to the longitudinal axis of the midsole. The fibers may restrict the particulate matter from freely moving between adjacent channels in a direction substantially parallel to the longitudinal axis of the midsole. In examples, the channels include a substantially rectangular cross-section, while in other examples, the channels include a substantially triangular cross-section. Additionally or alternatively, the channels may overlap one another. In some implementations, the article of footwear further includes a wall disposed between the series of channels that extends substantially perpendicular to the longitudinal axis of the midsole. In these implementations, the wall prevents the particulate matter from passing therethrough.

In some examples, the particulate matter includes foam beads. The foam beads may include a substantially spherical shape. The foam beads may include approximately the same size and shape or the foam beads may include at least one of a different size and shape.

Another aspect of the disclosure provides a method for making an article of footwear. The method includes providing a cavity between a footbed and an outsole and providing the cavity with a first series of walls that define a first series of channels within the cavity. The first series of channels extend substantially perpendicular to a longitudinal axis of the outsole and overlap one another in a direction substantially parallel to the longitudinal axis. The method also includes providing the first series of channels with a quantity of particulate matter.

This aspect may include one or more of the following optional features. Optionally, the first series of walls define the first series of channels by providing the first series of channels with a substantially circular cross-section. Optionally, the first series of walls define the first series of channels by providing the first series of channels with a substantially triangular cross-section. In some examples, the first series of walls define the first series of channels by overlapping the first series of channels in a direction substantially parallel to the longitudinal axis.

In some examples, the first series of channels provides the quantity of particulate matter by providing a quantity of foam beads. The foam beads may have a substantially spherical shape in some scenarios. In some scenarios, the quantity of foam beads may have at least one of a different size and shape.

Figure 2:
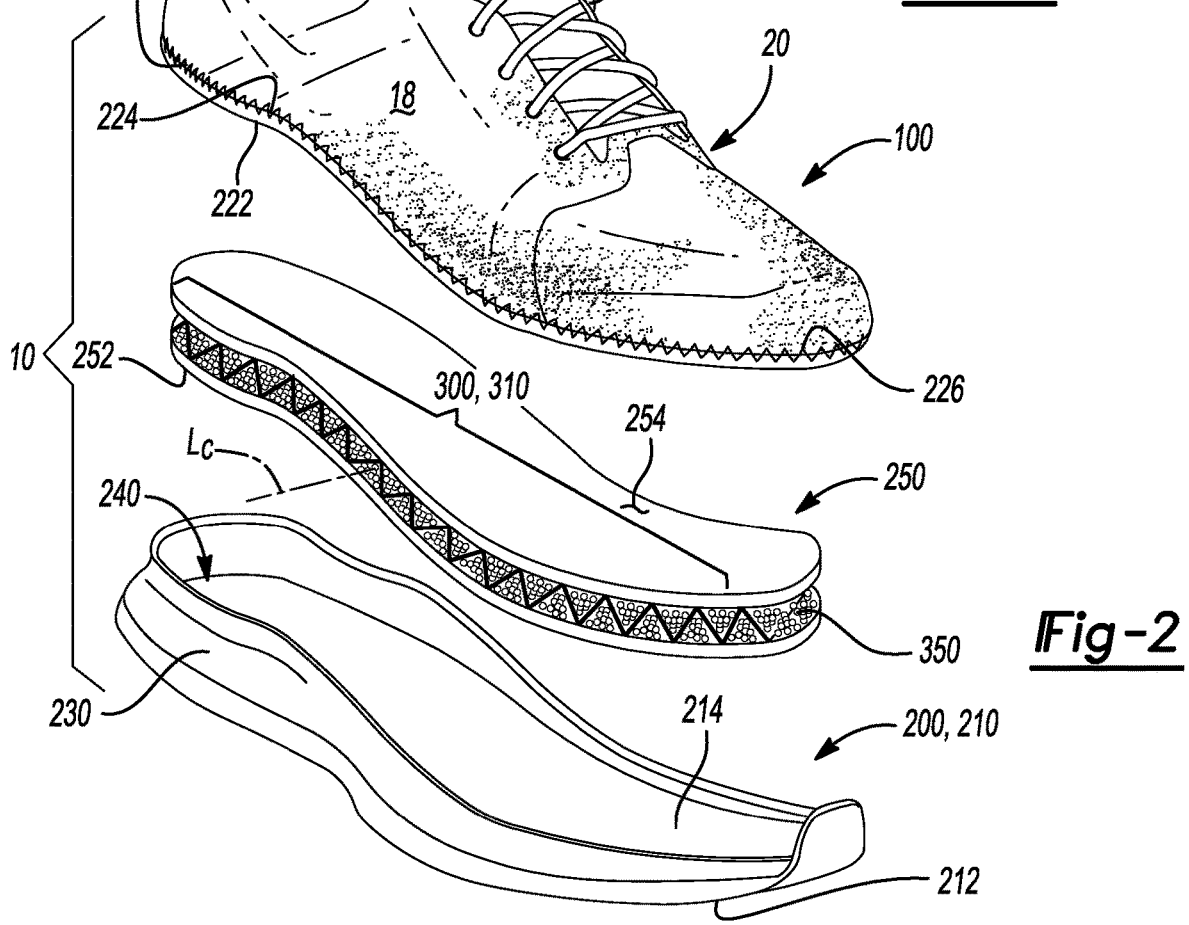
FIG. 2 is an exploded view of the article of footwear of FIG. 1 showing a midsole having a series of walls that define a series of channels each configured to receive a quantity of particulate matter.

Referring to FIGS. 1-3, in some implementations, an article of footwear 10 includes an upper 100 and a sole structure 200 attached to the upper 100. The article of footwear 10 may be divided into one or more portions. The portions may include a forefoot portion 12, a mid-foot portion 14, and a heel portion 16. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 that receives and secures a foot for support on the sole structure 200. An ankle opening 104 in the heel portion 16 may provide access to the interior void 102. For example, the ankle opening 104 may receive a foot to secure the foot within the void 102 and facilitate entry and removal of the foot from and to the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

In some implementations, the sole structure 200 includes an outsole 210, a midsole 250, and a footbed 220 arranged in a layered configuration. For example, the outsole 210 engages with a ground surface during use of the article of footwear 10, the footbed 220 is disposed between the upper 100 and the outsole 210, and the midsole 250 is disposed between the footbed 220 and the outsole 210. In some examples, the sole structure 200 may also incorporate additional layers such as an insole or sockliner, which may reside within the interior void 102 of the upper 100 to receive a plantar surface of the foot to enhance the comfort of the footwear 10. A sidewall 230 may separate the outsole 210 and the footbed 220 to define a cavity 240 therebetween, allowing the midsole 250 to reside within the cavity 240 bounded by the perimeter of the sidewall 230 and between the outsole 210 and the footbed 220. Thus, the layered configuration of the outsole 210, the midsole 250, and the footbed 220 may define a longitudinal axis L for the sole structure 200 that extends through the forefoot portion 12, the mid-foot portion 14, and the heel portion 16.

The outsole 210 includes a ground-engaging surface 212 and an opposite inner surface 214. The outsole 210 may attach to the upper 100. In some examples, the sidewall 230 extends from the perimeter of the outsole 210 and attaches to the footbed 220 or the upper 100. The example of FIG. 1 shows the outsole 210 attaching to the upper 100 proximate to a tip of the forefoot portion 12. The outsole 210 is generally configured to provide abrasion-resistance and traction with the ground surface. The outsole 210 may be formed from one or more materials that impart durability and wear-resistance, as well as enhance traction with the ground surface. For example, rubber may form at least a portion of the outsole 210.

The footbed 220 may include a bottom surface 222 and a top surface 224 disposed on an opposite side of the footbed 220 than the bottom surface 222. The top surface 224 may oppose the upper 100 and the bottom surface 222 may oppose the inner surface 214 of the outsole 210. Stitching 226 or adhesives may secure the footbed 220 to the upper 100. The top surface 224 may be contoured to conform to a profile of the bottom surface (e.g., plantar) of the foot. In some examples, an insole or sockliner may be disposed on the top surface 224 under the foot within at least a portion of the interior void 102 of the upper 100. The bottom surface 222 may oppose the inner surface 214 of the outsole 210 to define the cavity 240 that receives the midsole 250 therebetween. In some examples, the sidewall 230 may define a perimeter of the cavity 240 as well as a depth of the cavity 240 based on a length of separation between the bottom surface 222 of the footbed 220 and the inner surface 214 of the outsole 210. One or more polymer foam materials may form the sidewall 230 to provide resilient compressibility under an applied load to attenuate ground-reaction forces.

The midsole 250 may reside within the cavity 240 and may include a bottom surface 252 and a top surface 254. The top surface 254 may include a plate opposing the bottom surface 222 of the footbed 220 and the bottom surface 252 may include a plate opposing the inner surface 214 of the outsole 210. The top surface 254 may be contoured to conform to the profile of the bottom plantar surface of a foot. Particulate matter 350 may reside within the midsole 250 to provide cushioning for the foot during use of the footwear 10. In some implementations, the midsole 250 includes a series of walls 300 that define a series of channels 310 extending along an entire length of the midsole 250 through the forefoot portion 12, the mid-foot portion 14, and the heel portion 16. The series of walls 300 may extend between the bottom surface 252 and the top surface 254 to isolate each of the channels 310 from one another in a direction extending substantially parallel to the longitudinal axis L. The walls 300 may fasten to the bottom surface 252 and the top surface 254. In some examples, the walls 300 are secured to the bottom surface 252 and the top surface 254 via stitching and/or adhesives at discrete locations along a length of each wall 300 or, alternatively, are stitched and/or secured via an adhesive along an entire length of each wall 300.

In some examples, each of the channels 310 extends substantially perpendicular to the longitudinal axis L of the sole structure 200 between the lateral and medial sides 18, 20, respectively. As shown in FIG. 3, the channels 310 may each include the same cross-sectional shape but may have different sizes depending on the location of the channel 310 along a length of the sole structure 200. For example, channels 310 disposed proximate to the forefoot portion 12 may be smaller than channels 310 disposed proximate to the heel portion 16. While not shown, some of the channels 310 may vary in size within each of the portions 12, 14, 16. For example, the mid-foot portion 14 may include channels 310 having the size of the channels 310 currently shown in the forefoot portion 12 and, further, may include channels 310 that are larger than those currently shown in the mid-foot portion 14 to accommodate the smaller channels 310.

In some configurations, each channel 310 receives a quantity of the particulate matter 350 therein, thereby allowing the series of channels 310 to communicate with one another to restrict, prevent, or otherwise control migration of the particulate matter 350 residing within the midsole 250 during use of the footwear 10. The series of walls 300 that define the series of channels 310 cooperate with the particulate matter 350 residing therein to enhance functionality and enhance cushioning characteristics that a conventional midsole formed from a slab of polymer foam provides. For example, one or more polymer foam materials, such as ethyl-vinyl-acetate or polyurethane, may form the series of walls 300 to provide resilient compressibility under an applied load to attenuate ground-reaction forces. The particulate matter 350 may include foam beads having a substantially spherical shape to provide soft-type cushioning upon compressing under the applied load. In some examples, the particulate matter 350 includes foam beads that have approximately the same size and shape. In other examples, the particulate matter 350 includes foam beads having at least one of a different size and shape.

The footbed 220 may be formed from a flexible material that allows the footbed 220 to conform to the particulate matter 350 disposed within the channels 310, thereby allowing the particulate matter 350 residing in the cavity 240 to interact with the profile of the bottom surface of the foot during gradient loading of the sole structure 200. Accordingly, the footbed 220 acts as a flexible strobe that permits the particulate matter 350 to generally conform to the shape of the foot during loading of the particulate matter 350.

FIG. 2 provides an exploded view of the article of footwear 10 showing the series of walls 300 of the midsole 250 that define the series of channels 310 each receiving a corresponding quantity of the particulate matter 350 (e.g., foam beads). Each channel 310 may define a longitudinal axis $L_C$ that extends in a direction substantially perpendicular to the longitudinal axis L of the midsole 250 between the lateral and medial sides 18, 20, respectively. The example configuration shows each of the channels 310 having a substantially triangular cross-section defined by a pair of adjacent walls 300 and one of the bottom surface 252 or the top surface 254. For instance, each pair of adjacent channels 310 includes a corresponding first channel 310 defined between a corresponding pair of adjacent walls 300 and one of the bottom surface 252 or the top surface 254 and a corresponding second channel 310 defined between a corresponding pair of adjacent walls 300 and the other one of the bottom surface 252 or the top surface 254. A portion of the length of each channel 310 extending along the longitudinal axis L may overlap a portion of the length of adjoining channels 310, as shown in FIG. 3.

Referring to FIG. 3, a cross-sectional view taken along line 3-3 of FIG. 1 shows the series of walls 300 of the midsole 250 that define the series of channels 310 each receiving a corresponding quantity of the particulate matter 350 (e.g., foam beads). FIG. 3 shows the channels 310 having a triangular cross-section including a corresponding base 312, 314 and a corresponding distal end 322, 324. The arrangement of the channels 310 along the length of the midsole 250 alternates and repeats between walls 300 defining channels 310 with cross-sectional areas that decrease as the walls 300 extend from the bottom surface 252 toward the distal end 324 at the top surface 254, and walls 300 defining channels 310 with cross-sectional areas that decrease as the walls 300 extend from the top surface 254 toward the distal end 322 at the bottom surface 252.

The walls 300 may be secured to the top surface 254 of the midsole 250 at the distal end 324 of each channel 310. For example, the distal end 324 of each channel 310 may be stitched to the top surface 254 in a direction substantially parallel to the channel longitudinal axis $L_C$ between the lateral side 18 and the medial side 20 of the footwear 10. The stitching may extend all the way across the top surface 254 or may be located at discrete locations between the lateral side 18 and the medial side 20. Similarly, the walls 300 may be secured to the bottom surface 252 of the midsole 250 at the other distal end 322 of each channel 310. Here, the distal end 322 of each channel 310 may be stitched to the bottom surface 252 in a direction substantially parallel to the channel longitudinal axis $L_C$ between the lateral side 18 and the medial side 20 of the footwear 10. As with the top surface 254, the stitching may extend all the way across the bottom surface 252 or may be located at discrete locations between the lateral side 18 and the medial side 20.

While the example of FIG. 3 shows the walls 300 defining channels 310 all having a uniform shape (e.g., a triangular cross-section), other configurations may include at least one of the channels 310 defining a different shape than the other channels 310. For example, each portion 12, 14, 16 may include channels 310 having a different cross-sectional shape than the channels 310 of the other portions 12, 14, 16 or, alternatively, one of the portions 12, 14, 16 may include channels 310 having a different cross-sectional shape than the channels 310 of the other portions 12, 14, 16. Finally, at least one of the portions 12, 14, 16 may include channels 310 having a different shape within the particular portion 12, 14, 16. For example, the mid-foot portion 14 may include channels 310 having a substantially triangular cross-sectional shape mixed with channels 310 having a substantially circular cross-sectional shape.

FIGS. 2 and 3 show the channels 310 defining voids for receiving and enclosing the particulate matter 350. In some examples, the walls 300 isolate each of the channels 310 from one another to restrict the particulate matter 350 from moving between the channels 310 in a direction substantially parallel to the longitudinal axis L of the midsole 250. In these examples, the quantities of particulate matter 350 remain contained in the corresponding channels 310 without shifting or migrating to other areas of the midsole 250 when the sole structure 200 compresses repeatedly. Optionally, the walls 300 allow the particulate matter 350 to move along the longitudinal axis $L_C$ of each channel 310 in the direction substantially perpendicular to the longitudinal axis L of the midsole 250 and between the lateral and medial sides 18, 20, respectively. In addition to controlling movement and migration of the particulate matter 350, the tapering and decreasing cross-sectional area of the channels 310 also controls compressibility of the walls 300 to cause how responsive the cushioning is at the corresponding forefoot, mid-foot, and heel portions 12, 14, 16, respectively. Thus, the bottom surface 222 of the footbed 220 may translate toward the outsole 210 during gradient loading of the sole structure 200, thereby causing the walls 300 and the particulate matter 350 to compress and provide cushioning from soft to responsive.

The responsiveness of the midsole 250 may be adjusted by controlling both the material and thickness of the walls 300. For example, the walls 300 may be formed from a foam material, as described above, or, alternatively, may be formed form a woven material such as fabric. Forming the walls 350 from a fabric material reduces the responsiveness of the midsole 250 and causes the midsole 250 to rely primarily on the particulate matter 350 for cushioning. Conversely, forming the walls 350 from a relatively thick foam material allows the walls 300 to provide the midsole 250 with a degree of rigidity, thereby increasing the responsiveness of the midsole 250 and relying less on the particulate matter 350 for cushioning.

Referring to FIGS. 4-6, in some implementations, an article of footwear 10a includes an upper 100 and a sole structure 200a attached to the upper 100. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified.

The sole structure 200a may include an outsole 210a, a midsole 250a, and a footbed 220a arranged in the layered configuration. The sidewall 230 may separate the outsole 210a and the footbed 220a to define a cavity 240a therebetween, allowing the midsole 250a to reside within the cavity 240a between the outsole 210a and the footbed 220. The outsole 210a includes an inner surface 214a disposed on an opposite side of the outsole 210a than the ground-engaging surface 212. The footbed 220a includes a bottom surface 222a disposed on an opposite side of the footbed 220a than a top surface 224a. The midsole 250a may include a bottom surface 252a supported by the inner surface 214a of the outsole 210a when the midsole 250a is disposed within the cavity 240a. The sole structure 200b may further include an insole 228 disposed on the top surface 224a of the footbed 220a within at least a portion of the interior void 102 of the upper 100. The bottom surface 222a opposing the inner surface 214a defines the cavity 240a and the sidewall 230 may separate the bottom surface 222a and the inner surface 214a to define a depth of the cavity 240a.

In some implementations, the midsole 250a includes a series of walls 300a that define a series of channels 310a that extend along an entire length of the midsole 250a. FIG. 5 provides an exploded view of the article of footwear 10a showing the series of walls 300a extending in a direction from the bottom surface 252a toward an opposing top surface 254a of the midsole 250a to define the series of channels 310a therebetween. In some examples, the series of walls 300a may be arranged in a pattern extending between the lateral and medial sides 18,20, respectively, and along the entire length of the midsole 250a to define multiple polygonal-shaped channels 310a. The series of walls 300a and channels 310a may cooperate to provide cushioning for the foot as well as to control movement of the particulate matter 350 residing within each of the channels 310a during use of the footwear 10a. The footbed 220a may be formed from the flexible material forming the footbed 220 of FIGS. 1-3 to provide the footbed 220a with sufficient flexibility, thereby allowing the particulate matter 350 disposed within the channels 310a to interact with the profile of the bottom surface of the foot during gradient loading of the sole structure 200a.

The walls 300a may be formed from the one or more polymer foam materials that form the series of walls 300 of FIGS. 1-3 to provide resilient compressibility for attenuating ground-reaction forces during gradient loading of the sole structure 200a. In some configurations, each channel 310a has a hexagonal cross-section. In other configurations, the channels 310a may include any circular- or polygonal-shaped cross-section such as triangular, rectangular, or pentagonal. The channels 310a may be isolated from one another, thereby confining the quantities of particulate matter 350 within their corresponding channels 310a. The quantity of particulate matter 350 residing within each channel 310a may be substantially constant or may be different in at least one of the channels 310a. In some examples, the bottom surface 252a is omitted and the walls 300a extend from the inner surface 214a of the outsole 210a to define the series of channels 310a.

FIG. 6 is a cross-sectional view taken along line 6-6 of FIG. 4 that shows the series of walls 300a extending in the direction from the bottom surface 252a of the midsole 250a to the top surface 254a of the midsole 250a to define the series of channels 310a. In some configurations, the midsole 250a includes the top surface 254a separated from the bottom surface 252a by the series of walls 300 and enclosing the particulate matter 350 residing within each of the channels 310a. The top surface 252a enclosing each channel 310a may be convex. In the example configurations, the quantity of particulate matter 350 substantially fills each of the channels 310a. The quantity of particulate matter 350 residing in each channel 310a may be permitted to move along a longitudinal axis $L_C$ of each channel 310 in a direction substantially perpendicular to the longitudinal axis L of the midsole 250a and also substantially perpendicular to the top and bottom surfaces 254a, 252a, respectively. Conversely, the walls 300a may restrict the quantities of particulate matter 350 residing within the channels 310a from moving between the channels 310a in a direction substantially parallel to the longitudinal axis L of the midsole 250a. In some examples, the size and volume of one or more of the series of channels 310a is different to provide different levels of cushioning from soft to responsive. Thus, the series of walls 300a defining the series of channels 310a may cooperate with the quantities of particulate matter 350 residing therein to provide a combination of soft—and responsive-type cushioning in each of the forefoot, mid-foot, and heel portions 12, 14, 16, respectively, during gradient loading of the sole structure 200a.

Figure 7:
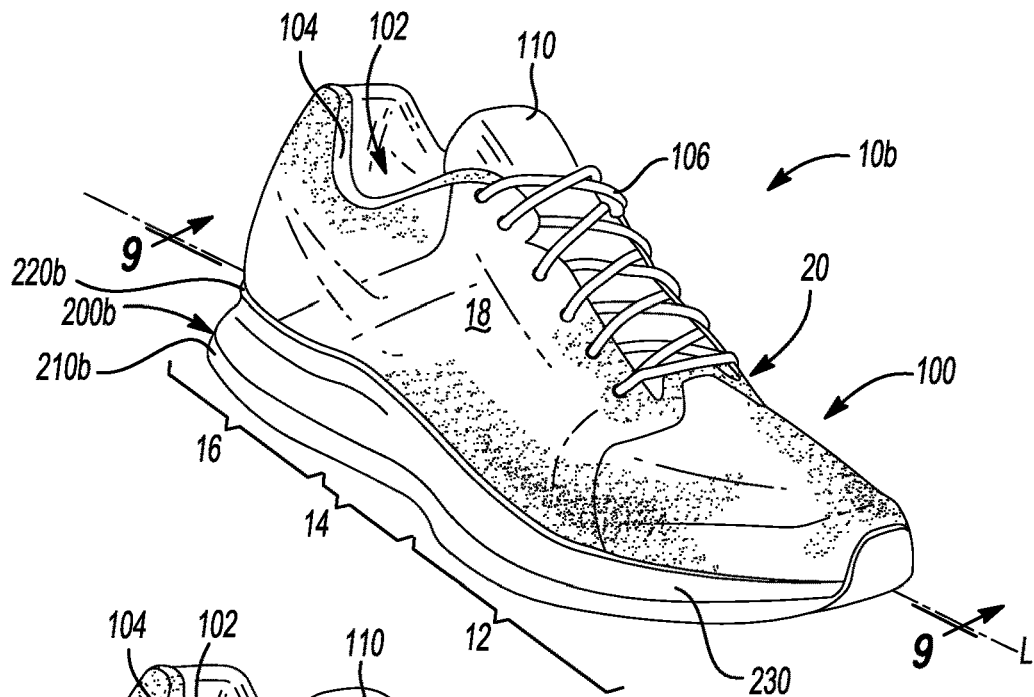
FIG. 7 is a top perspective view of an article of footwear in accordance with principles of the present disclosure.
Figure 8:
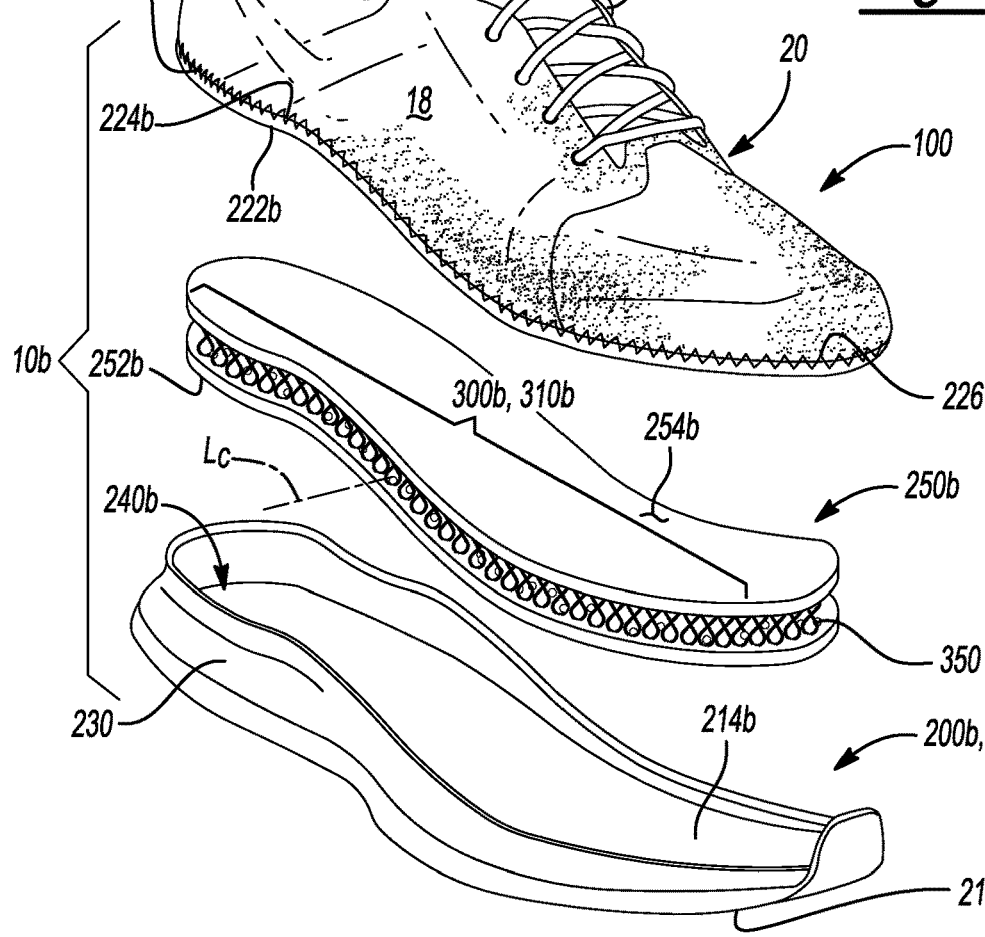
FIG. 8 is an exploded view of the article of footwear of FIG. 7 showing a midsole having a series of walls that define a series of channels and a quantity of particulate matter residing within the series of channels and between bottom and top surfaces of the midsole.

Referring to FIGS. 7-9, in some implementations, an article of footwear 10b includes an upper 100 and a sole structure 200b attached to the upper 100. In view of the substantial similarity in structure and function of the components associated with the article of footwear 10 with respect to the article of footwear 10b, like reference numerals are used hereinafter and in the drawings to identify like components while like reference numerals containing letter extensions are used to identify those components that have been modified.

The sole structure 200b may include an outsole 210b, a midsole 250b, and a footbed 220b arranged in the layered configuration. The sidewall 230 may separate the outsole 210b and the footbed 220b to define a cavity 240b therebetween, allowing the midsole 250b to reside within the cavity 240b between the outsole 210b and the footbed 220b. The outsole 210a includes an inner surface 214b disposed on an opposite side of the outsole 210b than the ground-engaging surface 212. The footbed 220b includes a bottom surface 222b disposed on an opposite side of the footbed 220b than a top surface 224b. The midsole 250b may include a bottom surface 252b or plate supported by the inner surface 214b of the outsole 210b when the midsole 250b is disposed within the cavity 240b. The midsole 250b may also include a top surface 254b or plate that opposes the bottom surface 252b. The top surface 254b of the midsole 250b may also oppose and attach to the bottom surface 222*b* of the footbed 220*b*. The sole structure 200*b* may further include an insole 228 disposed on the top surface 224*b* of the footbed 220*b* within at least a portion of the interior void 102 of the upper 100. The bottom surface 222*b* opposing the inner surface 214*b* defines the cavity 240*b* and the sidewall 230 may separate the bottom surface 222*b* and the inner surface 214*b* to define a depth of the cavity 240*b*.

In some implementations, the midsole 250*b* includes a series of walls 300*b* that define a series of channels 310*b* that extend along an entire length of the midsole 250*b* and between the lateral and medial sides 18, 20, respectively. A quantity of particulate matter 350 may be received within the series of channels 310*b* and between the bottom and top surfaces 252*b*, 254*b*, respectively, of the midsole 250*b*. FIG. 8 provides an exploded view of the article of footwear 10*b* showing the series of walls 300*b* extending between the bottom surface 252*b* and the top surface 254*b* of the footbed 220*b* to define the series of channels 310*b*. In some examples, the series of walls 300*b* include first ends attached to the bottom surface 252*b* and second ends attached to the top surface 254*b* of the midsole 250*b*. In other examples, each wall 300*b* includes closed ends to form a loop with a first portion (e.g., vertices) of the loop attached to the bottom surface 252*b* and a second opposed portion (e.g., vertices) of the loop attached to the top surface 254*b*. In some configurations, the top and bottom surfaces 254*b*, 252*b*, respectively, are omitted and the fibers extend between the inner surface 214*b* of the outsole 210*b* and the bottom surface 222*b* of the footbed 220*b*. The footbed 220*b* may be formed from the flexible material forming the footbed 220 of FIGS. 1-3 to provide the footbed 220*b* with sufficient flexibility, thereby allowing the particulate matter 350 disposed within the channels 310*b* to interact with the profile of the bottom surface of the foot during gradient loading of the sole structure 200*b*.

Each wall 300*b* may include a fabric formed from fibers under tension. For instance, a distance separating the first end/portion attached to the bottom surface 252*a* from the second end/portion attached to the top surface 254*b* causes the fibers forming each wall 300*b* to be under tension. While under tension, the fibers may define voids through each of the walls 300*b*. In some examples, the series of walls 300*b* may be arranged in a pattern extending between the lateral and medial sides 18, 20, respectively, and along the entire length of the midsole 250*b* to define the series of channels 310*b*. The series of walls 300*b* and the channels 310*b* may cooperate with the particulate matter 350 residing therein to provide cushioning for the foot as well as to control movement of the particulate matter 350 during use of the footwear 10*b*. Each wall 300*b* may form one or more of the series of channels 310*b*. In some configurations, each channel 310*b* has a circular or elliptical cross-section. In other configurations, each channel 310*b* has a substantially rectangular cross-section.

FIG. 9 shows a schematic cross-sectional view taken along line 9-9 of FIG. 7 showing the series of walls 300*b* extending between the bottom surface 252*b* and the top surface 254*b* of the midsole 250*b* to define the series of channels 310*b*. The quantity of particulate matter 350 residing within the midsole 250*b* may substantially fill the volume of space between the bottom and top surfaces 252*b*, 254*b*, respectively. As mentioned above, the fibers under tension that form the walls 300*b* may define voids through the walls 300*b*. In some examples, the quantity of particulate matter 350 moves between adjacent ones of the series of channels 310*b* in a direction substantially parallel to the longitudinal axis L through the voids between adjacent ones of the fibers. Conversely, in other examples, the voids may not be large enough to permit the passing of the particulate matter 350, thereby enabling the fibers forming the walls 300*b* to restrict the particulate matter 350 from freely moving between adjacent channels 310*b* in the direction substantially parallel to the longitudinal axis L. Additionally, each channel 310*b* may define a longitudinal axis $L_C$ substantially perpendicular to the longitudinal axis L of the midsole 250*b*, and the quantity of particulate matter 350 may be permitted to move along the longitudinal axis $L_C$ of each of the series of channels 310*b* between the lateral and medial sides 18, 20, respectively.

Referring to FIGS. 10 and 11, in some implementations, an article of footwear 10*c* includes an upper 100 and a sole structure 200*c* attached to the upper 100. In view of the substantial similarity in structure and function of the components associated with the article of footwear 10 with respect to the article of footwear 10*c*, like reference numerals are used hereinafter and in the drawings to identify like components while like reference numerals containing letter extensions are used to identify those components that have been modified.

The sole structure 200*c* may include an outsole 210*c*, a midsole 250*c*, and a footbed 220*c* arranged in the layered configuration. The sidewall 230 may separate the outsole 210*c* and the footbed 220*c* to define a cavity 240*c* therebetween, allowing the midsole 250*c* to reside within the cavity 240*c* between the outsole 210*c* and the footbed 220*c*. The outsole 210*c* includes an inner surface 214*c* disposed on an opposite side of the outsole 210*c* than the ground-engaging surface 212. The footbed 220*c* includes a bottom surface 222*c* disposed on an opposite side of the footbed 220*c* than a top surface 224*c*. The midsole 250*c* may include a bottom surface 252*c* supported by the inner surface 214*c* of the outsole 210*c* when the midsole 250*c* is disposed within the cavity 240*c*. The midsole 250*c* may also include a top surface 254*c* that opposes the bottom surface 252*c*. The top surface 254*c* of the midsole 250*c* may also oppose and attach to the bottom surface 222*c* of the footbed 220*c*. The sole structure 200*c* may further include an insole 228 disposed on the top surface 224*c* of the footbed 220*c* within at least a portion of the interior void 102 of the upper 100. The bottom surface 222*c* opposing the inner surface 214*c* defines the cavity 240*c* and the sidewall 230 may separate the bottom surface 222*c* and the inner surface 214*c* to define a depth of the cavity 240*c*.

In some implementations, the midsole 250*c* includes a first series of walls 300*c* that define a first series of channels 310*c* and a second series of walls 302 that define a second series of channels 320 extending along an entire length of the midsole 250*c* and between the lateral and medial sides 18, 20, respectively. The first series of walls 300*c* and the first series of channels 310*c* are substantially identical to the series of walls 300*b* and channels 310*b* described above with reference to FIGS. 7-9, and will not be described in detail.

FIG. 11 shows a cross-sectional view taken along line 11-11 of FIG. 10 showing the first series of walls 300*c* and the second series of walls 302 extending between the bottom surface 252*c* and the top surface 254*c* of the midsole 250*c* to define the first and second series of channels 310*c*, 320, respectively. In some configurations, each of the second series walls 302 extend between the lateral and medial sides 18, 20, respectively, of the midsole 250*c* and are spaced apart from one another along the entire length of the midsole 250*c*. Adjacent walls 302 form pairs that define the second series of channels 320 extending between the lateral and medial sides 18, 20, respectively, and also extending along the entire length of the midsole 250c through the forefoot, mid-foot, and heel portions 12, 14, 16. The second series walls 302 may be formed from woven fibers such as fabric that restrict any passing of the particulate matter 350. Alternatively, the second series of walls 302 may be formed from a foam material that likewise restricts any passing of the particulate matter 350 between adjacent channels 320 in a direction substantially parallel to the longitudinal axis L. FIG. 11 shows each one of the second series of channels 320 enclosing three of the first series of walls 300c. However, the spacing between each of the second series of walls 302 may be increased to enclose more walls 300c or decreased to enclose fewer walls 300c. The second series of channels 320 may each define a substantially rectangular cross-section. The footbed 220c may be formed from the flexible material forming the footbed 220 of FIGS. 1-3 to provide the footbed 220c with sufficient flexibility, thereby allowing the particulate matter 350 disposed within the channels 310c, and between the second series of walls 302, to interact with the profile of the bottom surface of the foot during gradient loading of the sole structure 200c.

With continued reference to FIG. 11, the midsole 250c is shown as including a third wall 390 that divides the cavity 240c into a lower cavity portion 392 and an upper cavity portion 394. The third wall 390 may extend along the entire length of the midsole 250 through the forefoot, mid-foot, and heel portions 12, 14, 16, respectively, and between the lateral and medial sides 18, 20, respectively. In some examples, the third wall 390 extends along a portion of the length of the midsole 250c and terminates at one of the second series of walls 302. The lower cavity portion 392 is defined by the bottom surface 252c of the midsole 250c and the third wall 390 while the upper cavity portion 394 is defined by the third wall 390 and the top surface 254c of the midsole 250c. Particulate matter 350 may be disposed within both the lower and upper cavity portions 292, 294, respectively, in equal or different amounts.

Figure 12:
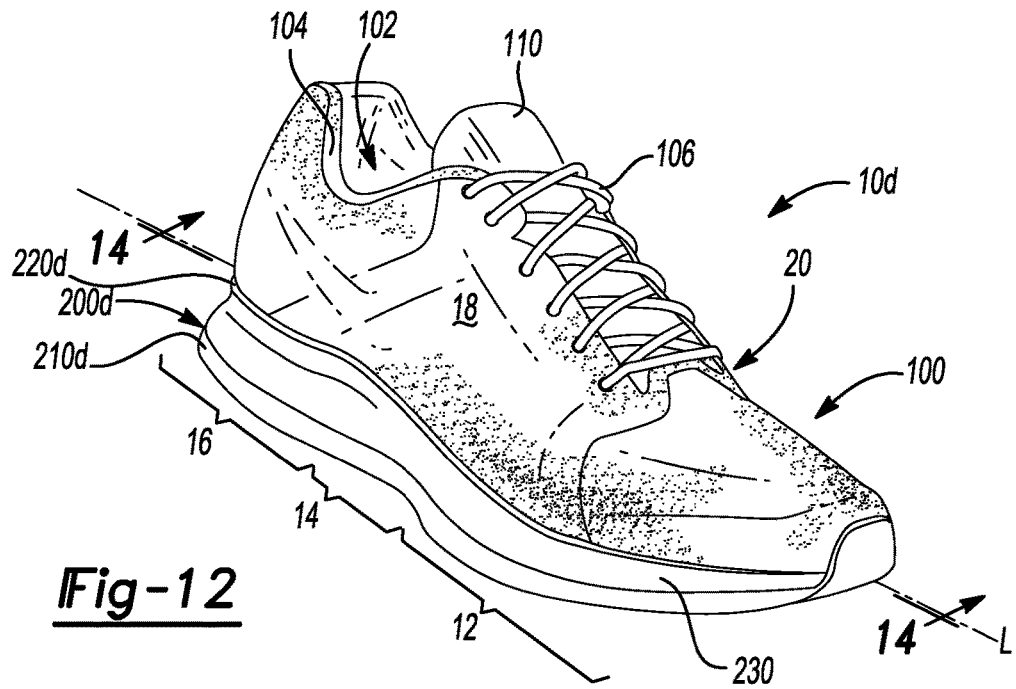
FIG. 12 is a top perspective view of an article of footwear in accordance with principles of the present disclosure.
Figure 13:
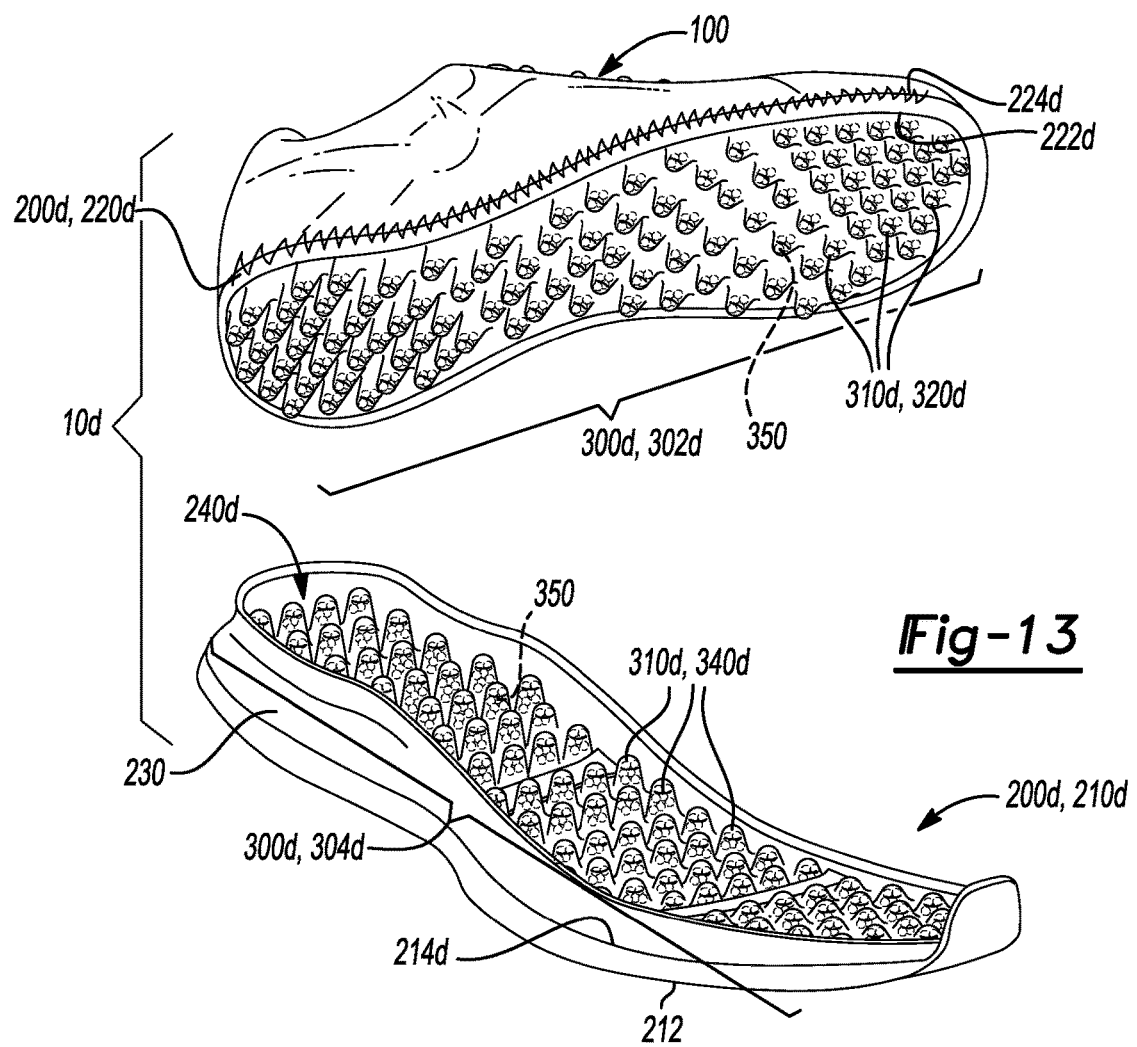
FIG. 13 is an exploded view of the article of footwear of FIG. 12 showing a midsole including a series of walls extending from a bottom surface of a footbed and an inner surface of an outsole to define a series of channels.
Figure 14:
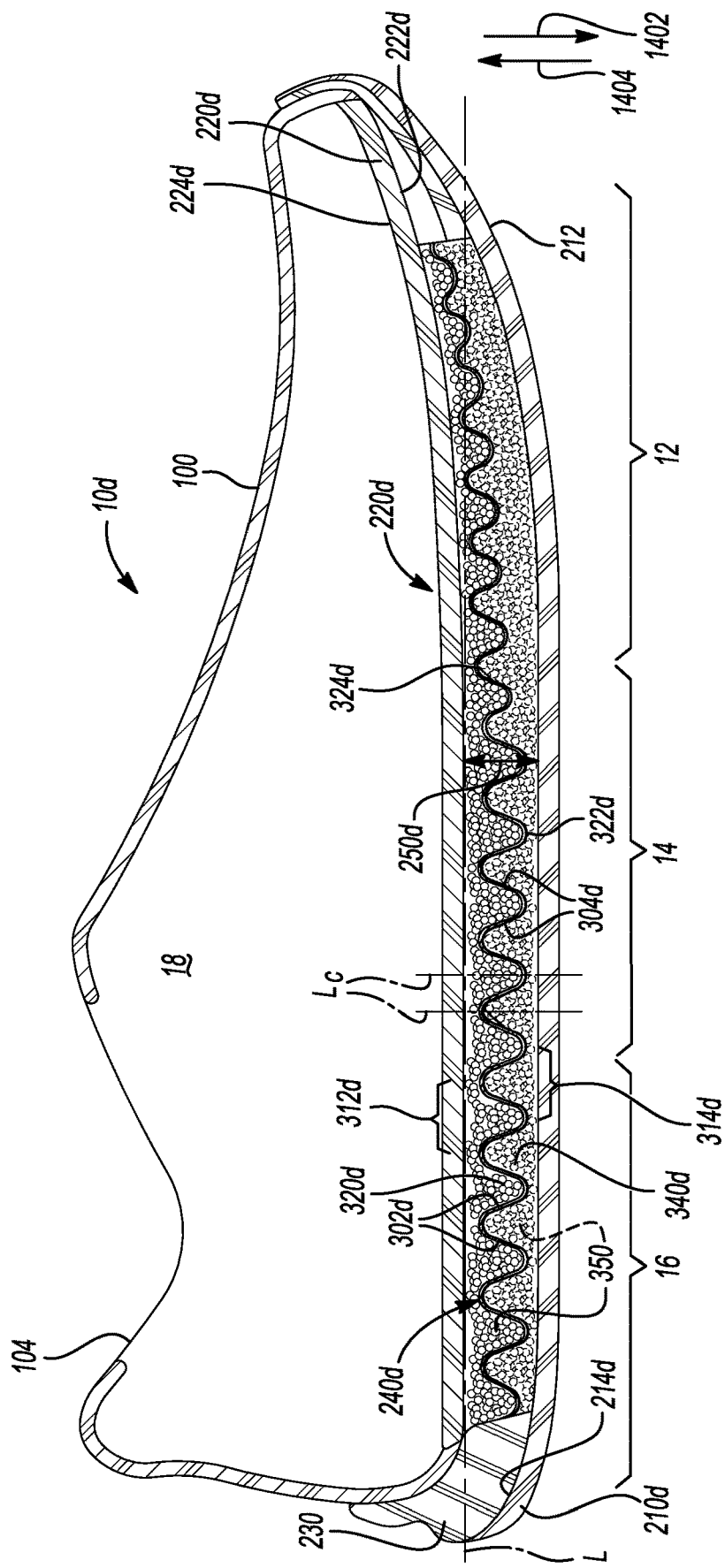
FIG. 14 is a cross-sectional view taken along line 14-14 of FIG. 12 showing particulate matter residing within each one of a series of channels of a midsole that extend from a bottom surface of a footbed and an inner surface of an outsole.

Referring to FIGS. 12-14, in some implementations, an article of footwear 10d includes an upper 100 and a sole structure 200d attached to the upper 100. In view of the substantial similarity in structure and function of the components associated with the article of footwear 10 with respect to the article of footwear 10d, like reference numerals are used hereinafter and in the drawings to identify like components while like reference numerals containing letter extensions are used to identify those components that have been modified.

The sole structure 200d may include an outsole 210d, a midsole 250d (FIG. 14), and a footbed 220d arranged in the layered configuration. The sidewall 230 may separate the outsole 210d and the footbed 220d to define a cavity 240d therebetween, allowing the midsole 250d to reside within the cavity 240d between the outsole 210d and the footbed 220d. The outsole 210d includes an inner surface 214d disposed on an opposite side of the outsole 210d than the ground-engaging surface 212. The footbed 220d includes a bottom surface 222d disposed on an opposite side of the footbed 220d than a top surface 224d.

In some configurations, a series of walls 300d project into the cavity 240d from the bottom surface 222d of the footbed 220d and the inner surface 214d of the outsole 210d to define the midsole 250d (FIG. 14). The series of walls 300d may define a series of channels 310d extending substantially perpendicular to the longitudinal axis L of the sole structure 200d along an entire length of the midsole 250d between the forefoot, mid-foot, and heel portions 12, 14, 16, respectively.

A quantity of particulate matter 350 may be received within the series of channels 310d and, in some examples, the quantity of particulate matter 350 substantially fills the channels 310d (e.g. voids). In some examples, the series of walls 300d extend into the cavity 240d to provide cushioning for the foot as well as to prevent migration of the quantities of particulate matter 350 residing within the corresponding channels 310d during use of the footwear 10d. The walls 300d (e.g., projections) and the channels 310d residing in the cavity 240d, together with the quantities of particulate matter 350 (e.g., foam beads) residing in the channels 310d, may cooperate to enhance functionality and enhance cushioning characteristics that a conventional midsole provides. For example, one or more polymer foam materials, such as ethyl-vinyl-acetate or polyurethane, may form the walls 300d to provide resilient compressibility for attenuating ground-reaction forces under gradient loading of the sole structure 200d. The particulate matter 350 may include foam beads to provide soft-type cushioning when under compression. The footbed 220d may be formed from the flexible material forming the footbed 220 of FIGS. 1-3 to provide the footbed 220d with sufficient flexibility, thereby allowing the particulate matter 350 disposed within the channels 310d to interact with the profile of the bottom surface of the foot during gradient loading of the sole structure 200d.

In some implementations, the series of walls 300d defining the series of channels 310d include an upper series of walls 302d defining an upper series of channels 320d and a lower series of walls 304d defining a lower series of channels 340d. FIG. 13 provides an exploded view of the article of footwear 10d of FIG. 12 showing the upper series of walls 302d defining the upper series of channels 320d extending from the bottom surface 222d of the footbed 220d in a direction toward the inner surface 214d of the outsole 210d, and the lower series of walls 304d defining the lower series of channels 340d extending from the inner surface 214d of the outsole 210d in an opposite direction toward the bottom surface 222d of the footbed 220d. In this implementation, the quantity of particulate matter 350 (e.g., foam beads) resides within each of the upper and lower channels 320d, 340d and each of the channels 320d, 340d are equally spaced from one another between the lateral and medial sides 18, 20, respectively, of the midsole 250d and also along the entire length of the midsole 250d. In some examples, the upper and lower walls 302d, 304d are arranged in repeating rows along respective ones of the bottom surface 222d and the inner surface 214d between the lateral and medial sides 18, 20, respectively, of the midsole 250d and also along the entire length of the midsole 250d. In other examples, the upper and lower walls 302d, 304d are arranged in alternating repeating rows.

Referring to FIG. 14, a cross-sectional view taken along line 14-14 of FIG. 12 shows the upper series of walls 302d and channels 320d extending in the direction from the bottom surface 222d of the footbed 220d toward the inner surface 214d of the outsole 210d and the lower series of walls 304d and channels 340d extending in the direction from the inner surface 214d of the outsole 210d toward the bottom surface 222d of the footbed 220d. Each channel 320d, 340d contains a quantity of particulate matter 350 restricted from moving outside the corresponding channel 320d, 340d by the respective walls 302d, 304d. In the example of FIG. 14, arrow 1404 denotes the direction from the outsole 210d toward the footbed 220d and arrow 1402 denotes the opposite direction from the footbed 220d toward the outsole 210d. As shown, the walls 302d, 304d nest with one another such that peaks of the walls 302d are received within valleys of the walls 304d and peaks of the walls 304d are received within valleys of the walls 302d.

The directions denoted by the arrows 1402, 1404 are substantially perpendicular to the longitudinal axis of the sole structure 200d (e.g., the midsole 250d, the outsole 210d, and the footbed 220d). Each of the channels 310d (e.g., upper channels 320d and lower channels 340d) may define a longitudinal axis $L_C$ that extends substantially perpendicular to the longitudinal axis L of the midsole 250d and substantially parallel to the directional arrows 1402, 1404. In some examples, the quantity of particulate matter 350 residing within each of the channels 310d is permitted to move along the channel longitudinal axis $L_C$. However, the particulate matter 350 residing within each of the channels 310d is restricted by the walls 300d from moving between the channels 310d in a direction substantially parallel to the longitudinal axis L of the midsole 250d.

Referring to FIGS. 15 and 16, in some implementations, an article of footwear 10e includes an upper 100 and a sole structure 200e attached to the upper 100. In view of the substantial similarity in structure and function of the components associated with the article of footwear 10 with respect to the article of footwear 10e, like reference numerals are used hereinafter and in the drawings to identify like components while like reference numerals containing letter extensions are used to identify those components that have been modified.

The sole structure 200e may include an outsole 210e, a midsole 250e, and a footbed 220e arranged in the layered configuration. The sidewall 230 may separate the outsole 210e and the footbed 220e to define a cavity 240e therebetween, allowing the midsole 250e to reside within the cavity 240e between the outsole 210e and the footbed 220e. The outsole 210e includes an inner surface 214e disposed on an opposite side of the outsole 210e than the ground-engaging surface 212. The footbed 220e includes a bottom surface 222e disposed on an opposite side of the footbed 220e than a top surface 224e.

In some configurations, a series of walls 300e project into the cavity 240e from the bottom surface 222e of the footbed 220e and the inner surface 214d of the outsole 210d to define the midsole 250e. The series of walls 300e may define a series of channels 310e extending substantially perpendicular to the longitudinal axis L of the midsole 250e along an entire length of the midsole 250e between the forefoot, mid-foot, and heel portions 12, 14, 16. A quantity of the particulate matter 350 may be received within a portion (e.g., receiving portion) of the series of channels 310e, while the remaining portion (e.g., non-receiving portion) of the series of channels 310e does not receive any particulate matter.

The quantity of particulate matter 350 substantially fills the receiving portion of channels 310e (e.g., voids). In some examples, the series of walls 300e extend into the cavity 240e to provide cushioning for the foot as well as to prevent migration of the quantities of particulate matter 350 residing within the receiving portion of channels 310e during use of the footwear 10e. The walls 300e (e.g., projections) and the channels 310e residing in the cavity 240e, together with the quantities of particulate matter 350 (e.g., foam beads) residing in the receiving portion of channels 310e, may cooperate to enhance functionality and enhance cushioning characteristics that a conventional midsole provides. For example, one or more polymer foam materials, such as ethyl-vinyl-acetate or polyurethane, may form the walls 300e to provide resilient compressibility under an applied load to for attenuating ground-reaction forces during gradient loading of the sole structure 200e. The particulate matter 350 may include foam beads to provide soft-type cushioning when under compression. The footbed 220e may be formed from the flexible material forming the footbed 220 of FIGS. 1-3 to provide the footbed 220e with sufficient flexibility, thereby allowing the particulate matter 350 disposed within the channels 310e to interact with the profile of the bottom surface of the foot during gradient loading of the sole structure 200e via the walls 300e.

In some implementations, the series of walls 300e defining the series of channels 310e include an upper series of walls 302e defining an upper series of channels 320e and a lower series of walls 304e defining a lower series of channels 340e that nest with one another in a similar fashion as described above with respect to the article of footwear 10d. FIG. 16 provides a cross-sectional view taken along line 16-16 of FIG. 15 showing the upper series of walls 302e and channels 320e extending in the direction of arrow 1402 from the bottom surface 222e of the footbed 220e toward the inner surface 214e of the outsole 210e. This view also shows the lower series of walls 304e and channels 340e extending in the direction of arrow 1404 from the inner surface 214e of the outsole 210e toward the bottom surface 222e of the footbed 220e.

The lower series of channels 340e may be indicative of the receiving portion of channels 310e each receiving a quantity of particulate matter 350. The lower series of walls 304e and channels 340e in the example of FIG. 16 are substantially identical to the lower series of walls 304d and channels 340d described above in the examples of FIGS. 12-14. Accordingly, the quantity of particulate matter 350 residing within each of the lower series of channels 340e may be permitted to move along the channel longitudinal axis $L_C$, while at the same time, the particulate matter 350 is restricted by the lower series of walls 304e from moving between the channels 340e in a direction substantially parallel to the longitudinal axis L of the midsole 250e.

The upper series of channels 320e may be indicative of the non-receiving portion of channels 310e that do not receive a quantity of the particulate matter 350. In contrast to the upper series of channels 320d described above in the examples of FIGS. 12-14, the upper series of channels 320e of FIGS. 15 and 16 include voids that are free of particulate matter 350. As shown, the upper channels 320e are substantially filled with foam material and, as such, cooperate with one another to form a substantially unitary foam body that nests with the lower series of channels 340e.

Referring to FIGS. 17 and 18, in some implementations, an article of footwear 10f includes an upper 100 and a sole structure 200f attached to the upper 100. In view of the substantial similarity in structure and function of the components associated with the article of footwear 10 with respect to the article of footwear 10f, like reference numerals are used hereinafter and in the drawings to identify like components while like reference numerals containing letter extensions are used to identify those components that have been modified.

The sole structure 200f may include an outsole 210f, a midsole 250f, and a footbed 220f arranged in the layered configuration. The sidewall 230 may separate the outsole 210f and the footbed 220f to define a cavity 240f therebetween, allowing the midsole 250f to reside within the cavity 240f between the outsole 210f and the footbed 220f. The outsole 210f includes an inner surface 214f disposed on an opposite side of the outsole 210f than the ground-engaging surface 212. The footbed 220f includes a bottom surface 222f disposed on an opposite side of the footbed 220f than the top surface 224f.

In some configurations, a series of walls 300f project into the cavity 240f from the bottom surface 222f of the footbed 220f and the inner surface 214f of the outsole 210f to define the midsole 250f. The series of walls 300f may define a series of channels 310f extending substantially perpendicular to the longitudinal axis L of the midsole 250f along an entire length of the midsole 250f between the forefoot, mid-foot, and heel portions 12, 14, 16. A quantity of the particulate matter 350 may be received within a portion (e.g., receiving portion) of the series of channels 310f, while the remaining portion (e.g., non-receiving portion) of the series of channels 310f does not receive any particulate matter 350. The quantity of particulate matter 350 substantially fills the receiving portion of channels 310e (e.g., voids). In some examples, the series of walls 300f extending into the cavity 240f provide cushioning for the foot as well as to prevent migration of the quantities of particulate matter 350 residing within the receiving portion of the channels 310f during use of the footwear 10f. The footbed 220f may be formed from the flexible material forming the footbed 220 of FIGS. 1-3 to provide the footbed 220f with sufficient flexibility, thereby allowing the particulate matter 350 disposed within the channels 310f to interact with the profile of the bottom surface of the foot during gradient loading of the sole structure 200f.

The walls 300f (e.g., projections) and the channels 310f residing in the cavity 240f, together with the quantities of particulate matter 350 (e.g., foam beads) residing in the receiving portion of channels 310f, may cooperate to enhance functionality and enhance cushioning characteristics that a conventional midsole provides. For example, one or more polymer foam materials, such as ethyl-vinyl-acetate or polyurethane, may form the walls 300f to provide resilient compressibility under for attenuating ground-reaction forces during gradient loading of the sole structure 200f. The particulate matter 350 may include foam beads to provide soft-type cushioning when under compression.

In some implementations, the series of walls 300f defining the series of channels 310f include an upper series of walls 302f defining an upper series of channels 320f and a lower series of walls 304f defining a lower series of channels 340f that nest with one another in a similar fashion as described above with respect to the article of footwear 10d. FIG. 18 provides a cross-sectional view taken along line 18-18 of FIG. 17 showing the upper series of walls 302f and channels 320f extending in the direction of arrow 1402 from the bottom surface 222f of the footbed 220f toward the inner surface 214f of the outsole 210f and the lower series of walls 304f and channels 340f extending in the direction of arrow 1404 from the inner surface 214f of the outsole 210f toward the bottom surface 222f of the footbed 220f. In contrast to the upper series of channels 320e of FIGS. 15 and 16, the example footwear 10f of FIG. 18 shows the upper series of channels 320f being indicative of the receiving portion of channels 310f each receiving a quantity of particulate matter 350. Thus, the upper series of walls 302f and channels 320f in the example of FIG. 18 are substantially identical to the upper series of walls 302d and channels 320d described above in the examples of FIGS. 12-14. Accordingly, the quantity of particulate matter 350 residing within each of the upper series of channels 320f may be permitted to move along the channel longitudinal axis $L_C$, while at the same time, the particulate matter 350 is restricted by the upper series of walls 302f from moving between the channels 320f in a direction substantially parallel to the longitudinal axis L of the midsole 250f. Moreover, and in contrast to the lower series of channels 340d of FIGS. 12-14 and the lower series of channels 340e of FIGS. 15 and 16, the lower series of channels 340f of FIG. 18 are indicative of the non-receiving portion of channels 310e and do not receive a quantity of the particulate matter 350. Rather, the lower channels 340f are substantially filled with foam material and, as such, cooperate with one another to form a substantially unitary foam body that nests with the upper series of channels 320f.

Referring to the example configurations of FIGS. 12-18, in some implementations, when the sole structure 200d-f is assembled, the upper series of walls 302d-f defining the upper series of channels 320d-f and the lower series of walls 304d-f defining the lower series of channels 340d-f are arranged upon respective ones of the bottom surface 222d-f and the inner surface 214d-f so that the upper and lower series of channels 320d-f, 340d-f, respectively, overlap one another in a direction substantially parallel to the longitudinal axis L of the sole structure 200d-f. In some implementations, at least one of the series of channels 310d-f overlaps a pair of the series of channels 310d-f. For example, at least one of the upper series of channels 320d-f extending into the cavity 240d-f from the bottom surface 222d-f may overlap a corresponding pair of the lower series of channels 340d-f extending into the cavity 240d-f from the inner surface 214d-f. Likewise, at least one of the lower series of channels 340d-f extending into the cavity 240d-f from the inner surface 214d-f may overlap a corresponding pair of the upper series of channels 320d-f extending into the cavity 240d-f from the bottom surface 222d-f. The example cross-sectional views of FIGS. 14, 16, and 18 show each of the upper series of channels 320d-f extending into the cavity 240d-f and being disposed between corresponding pairs of the lower series of channels 340d-f. Similarly, each of the lower series of channels 340d-f are shown as extending into the cavity 240d-f and as being disposed between corresponding pairs of the upper series of channels 320d-f. Accordingly, the upper series of walls 302d-f and the lower series of walls 304d-f may be arranged such that the upper series of channels 320d-f and the lower series of channels 340d-f interlock or nest to define the midsole 250d-f when the sole structure 200d-f is assembled.

With continued reference to FIGS. 14, 16, and 18, each of the upper series of channels 320d-f includes a corresponding base 312d-f and a corresponding distal end 322d-f, and each of the lower series of channels 340d-f includes a corresponding base 314d-f and a corresponding rounded, distal end 324d-f. Each channel of the upper series of channels 320d-f includes a cross-sectional area that decreases as the channels 320d-f extend from the base 312d-f toward the distal end 322d-f (e.g., the cross-sectional area of the channels 320d-f in the direction of arrow 1402). Additionally or alternatively, each channel of the lower series of channels 340d-f includes a cross-sectional area that decreases as the channels 340d-f extend from the base 314d-f toward the distal end 324d-f (e.g., the cross-sectional area of the channels 340d-f in the direction of arrow 1404). In some examples, the upper and lower series of channels 320d-f, 340d-f include a constantly tapered outer surface extending between the bases 312d-f, 322d-f and the distal ends 322d-f, 324d-f to define peaks and valleys between adjacent channels 320d-f, 340d-f. In the example configurations, the tapered outer surface of each of the upper series of walls 302d-f defining the upper series of channels 320d-f terminates at the inner surface 214d-f of the outsole 210d-f and is disposed between a valley defined by two adjacent lower series channels 340d-f. Likewise, the tapered outer surface of each of the lower series of walls 304d-f defining the lower series of channels 340d-f terminates at the bottom surface 222d-f of the footbed 220d-f and is disposed between a valley defined by two adjacent upper series channels 320d-f.

In some implementations, a distance between the inner surface 214d-f of the outsole 210d-f and the distal ends 324d-f defines a height of the lower series of channels 340d-f. Likewise, a distance between the bottom surface 222d-f of the footbed 220d-f and the distal ends 322d-f may define a height of the upper series of channels 320d-f. Alternatively, the height of the lower series of channels 340d-f may be obtained based on a distance between the distal ends 324d-f and the corresponding bases 314d-f and the height of the upper series of channels 320d-f may be obtained based on a distance between the distal ends 322d-f and the corresponding bases 312d-f. In some configurations, the height of at least one of the upper and lower series of channels 320d-f, 340d-f may be different. For example, the examples of FIGS. 14, 16, and 18 show the upper and lower series of channels 320d-f, 340d-f located proximate to the heel portion 16 of the midsole 250d-f having greater heights than the heights of the upper and lower series of channels 320d-f, 340d-f located proximate to the forefoot portion 12. The height (and tapering) of the channels 320d-f, 340d-f effectuates the ability to contain or store the particulate matter 350. For example, the heel portion 16 permits a greater quantity of particulate matter 350 than in the forefoot portion 12 due to the upper and lower series of channels 320d-f, 340d-f located proximate to the heel portion 16 having greater heights compared to the upper and lower series of channels 320d-f, 340d-f located proximate to the forefoot portion 12.

The example configurations of FIGS. 14, 16, and 18 show a quantity of particulate matter 350 residing within each of the upper and lower series of channels 320d, 340f (FIG. 14), the lower series of channels 340e (FIG. 16), and the upper series of channels 320f (FIG. 18). The geometry (e.g., height, tapering, cross-sectional area) and the arrangement of the channels 320d, 320f, 340d, 340e extending into the cavity 240d-f may permit some movement of the particulate matter 350 along the longitudinal axis $L_C$ of the channels 320d, 320f, 340d, 340e, while the walls 302d, 302f, 304d, 304e may restrict migration or movement of the particulate matter 350 between the channels 320d, 320f, 340d, 340e in the direction substantially parallel to the longitudinal axis of the midsole 250d-f.

In addition to controlling migration of the particulate matter 350, the geometry (e.g., height, tapering, cross-sectional area) and the arrangement of the upper and lower series of walls 302d-f, 304d-f also controls compressibility of the walls 302d-f, 304d-f to cause how responsive the cushioning is at the corresponding forefoot, mid-foot, and heel portions 12, 14, 16, respectively, during gradient loading of the sole structure 200d-f.

Referring to FIGS. 19-22, in some implementations, an article of footwear 10g includes an upper 100 and a sole structure 200g attached to the upper 100. In view of the substantial similarity in structure and function of the components associated with the article of footwear 10 with respect to the article of footwear 10g, like reference numerals are used hereinafter and in the drawings to identify like components while like reference numerals containing letter extensions are used to identify those components that have been modified.

The sole structure 200g may include an outsole 210g, a midsole 250g, and a footbed 220g arranged in the layered configuration. The sidewall 230 may separate the outsole 210g and the footbed 220g to define a cavity 240g therebetween, allowing the midsole 250g to reside within the cavity 240g between the outsole 210g and the footbed 220g. The outsole 210g includes an inner surface 214g disposed on an opposite side of the outsole 210g than the ground-engaging surface 212. The footbed 220g includes a bottom surface 222g disposed on an opposite side of the footbed 220g than a top surface 224g.

In some configurations, a series of walls 300g project into the cavity 240g from the bottom surface 222d of the footbed 220d to define one or more localized channels 310g extending substantially perpendicular to the longitudinal axis L of the midsole 250g along one or more localized portions between the forefoot, mid-foot, and heel portions 12, 14, 16, and the lateral and medial sides 18, 20 of the midsole 250g. Each localized channel 310g extending into the cavity 240g defines a void that may receive a quantity of particulate matter 350 and, in some examples, the quantity of particulate matter 350 substantially fills the void of each localized channel 310g. Accordingly, the series of walls 300g may be flexible and may define localized channels 310g indicative of bag-like or pocket structures that receive and store a quantity of particulate matter 350.

A conventional slab of polymer foam 1900 may be sized and shaped to occupy all empty space within the cavity 240g not occupied by the one or more localized channels 310g that contain particulate matter 350 when the sole structure 200g is assembled. Accordingly, the slab of polymer foam 1900 and the one or more localized channels 310g residing within the cavity 240g between the footbed 220g and the outsole 210g define the midsole 250g. In some examples, the one or more localized channels 310g extending into the cavity 240d and containing the particulate matter 350 provide cushioning for the foot as well as restrict migration of the quantities of particulate matter 350 residing within each of the localized channels 310g during use of the footwear 10g. The quantity of particulate matter 350 (e.g., foam beads) residing in each localized channel 310g, together with the slab of polymer foam 1900, may cooperate to enhance functionality and enhance cushioning characteristics that a conventional midsole provides. For example, the slab of polymer foam 1900 may provide resilient compressibility for attenuating ground-reaction forces during gradient loading of the sole structure 200g. The particulate matter 350, on the other hand, may include foam beads to provide soft-type cushioning at one or more localized regions of the midsole 250g when under compression. The footbed 220g may be formed from the flexible material forming the footbed 220 of FIGS. 1-3 to provide the footbed 220g with sufficient flexibility, thereby allowing the particulate matter 350 disposed within the localized channels 310g to interact with the profile of the bottom surface of the foot during gradient loading of the sole structure 200g.

Figures 19, 20:
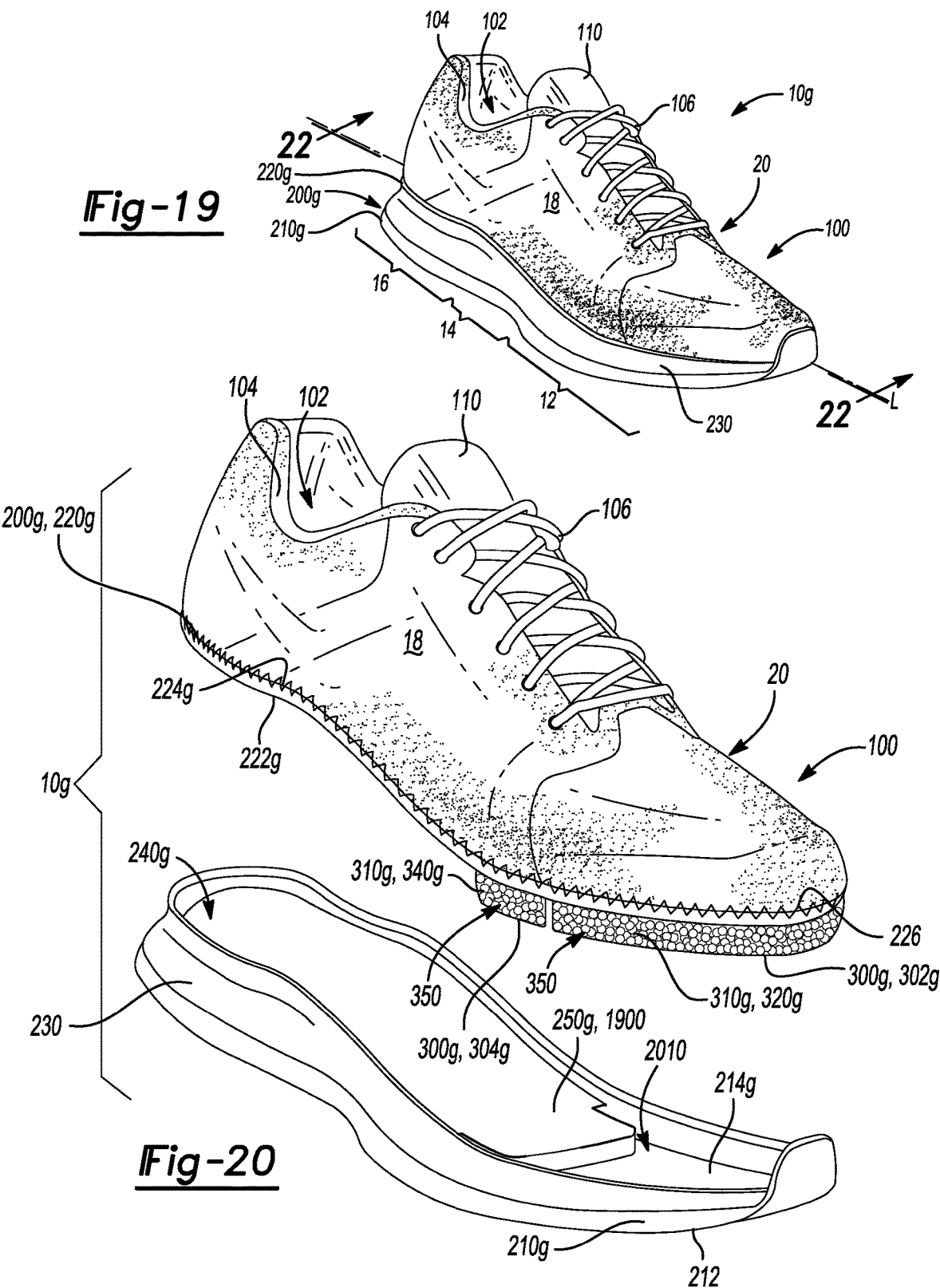
FIG. 19 is a top perspective view of an article of footwear in accordance with principles of the present disclosure.
FIG. 20 is an exploded view of the article of footwear of FIG. 19 showing a midsole including a series of walls defining one or more localized channels each receiving a quantity of particulate matter.
Figure 21:
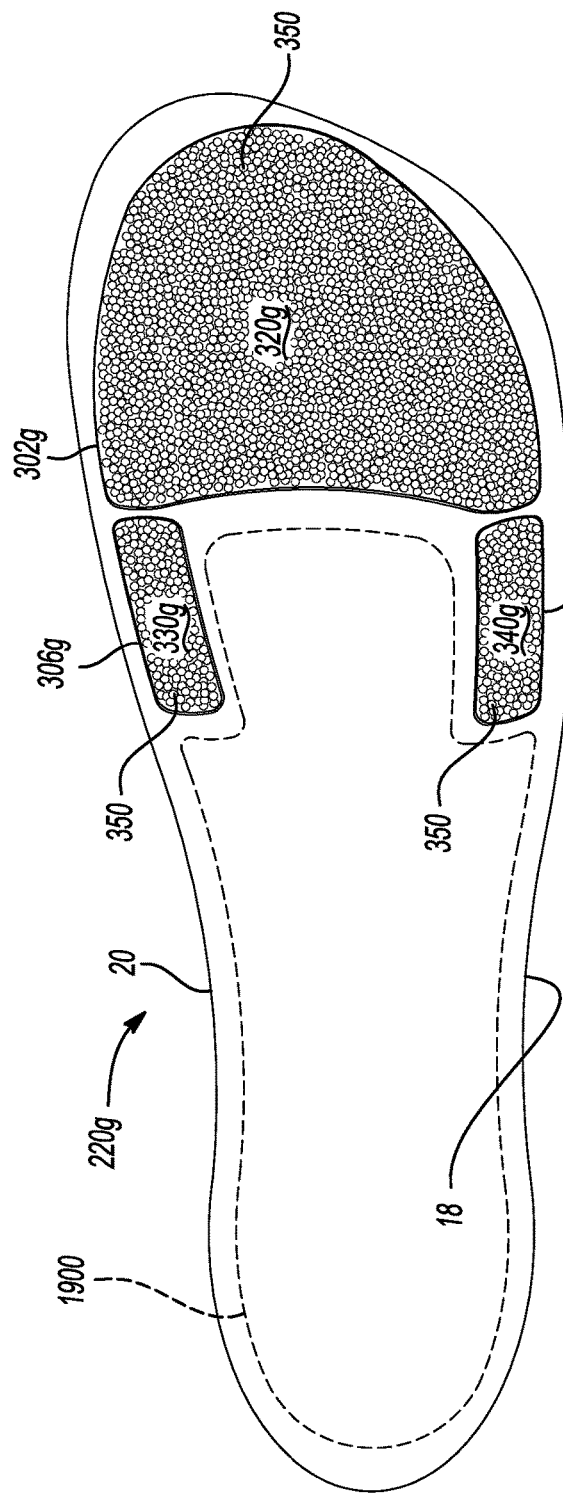
FIG. 21 is a perspective bottom view of a footbed of FIG. 19 showing a midsole including a series of walls defining one or more localized channels each receiving a quantity of particulate matter.

In some implementations, the series of walls 300g defining the series of localized channels 310g includes one or more of a first series of walls 302g defining a toe channel 320g, a second series of walls 304g defining a lateral-forefoot channel 340g, and a third series of walls 306g defining a medial-forefoot channel 330g. FIG. 20 provides an exploded view of the article of footwear 10g of FIG. 19 showing the first series of walls 302g defining the toe channel 320g and the second series of walls 304g defining the lateral-forefoot channel 340g. FIG. 21 provides a perspective bottom view of the footbed 220g of FIG. 20 showing the article of footwear 10g also including the third series of walls 306g defining the medial-forefoot channel 320g, in addition to the toe channel 320g and the lateral-forefoot channel 340g. FIG. 21 also shows hidden lines defining a region for receiving the slab of polymer foam 1900.

The localized channels 320g, 330g, 340g extend from the bottom surface 222g of the footbed 220g and each receives a quantity of particulate matter 350. The walls 302g, 304g, 306g defining the corresponding localized channels 320g, 340g, 330g may restrict the quantities of particulate matter 350 from moving between the localized channels. In some implementations, the outsole 210g includes one or more depressions 2010 sized, shaped, and arranged to receive at least a portion of the one or more toe, lateral-forefoot, and medial-forefoot channels 320g, 340g, 330g extending into the cavity 240g from the footbed 220g when the sole structure 200g is assembled.

Figure 22:
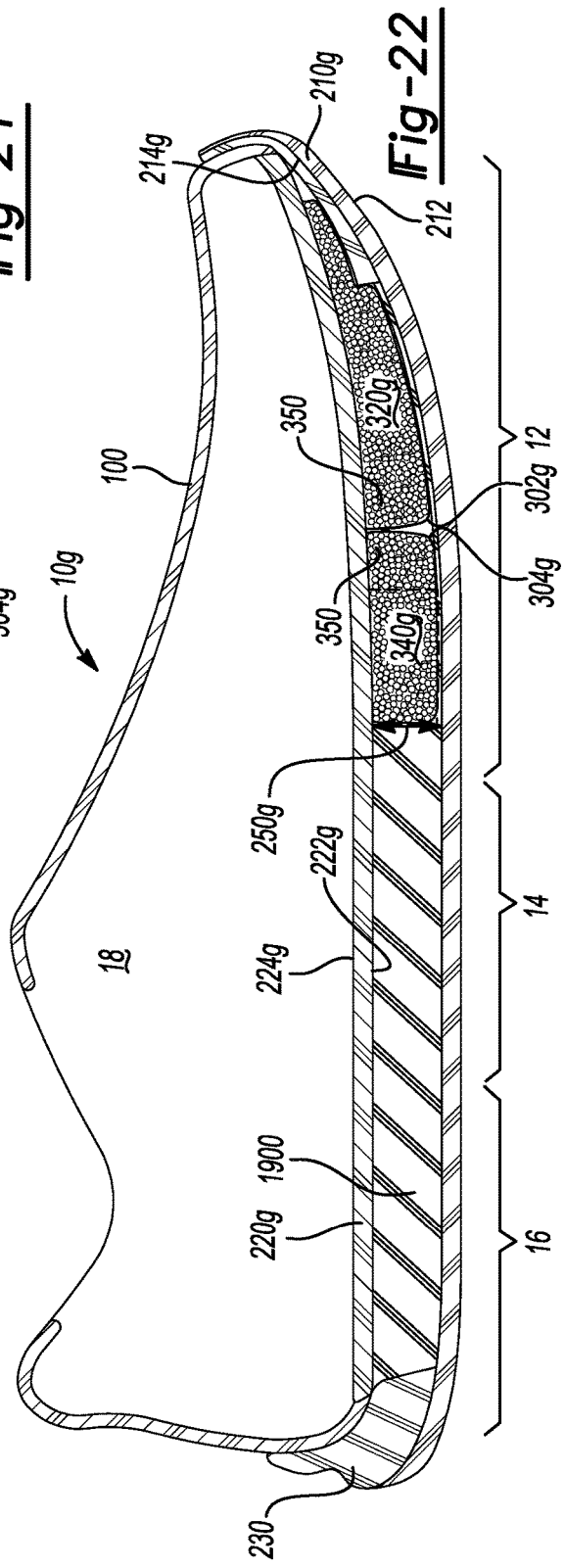
FIG. 22 is a cross-sectional view taken along line 22-22 of FIG. 19 showing a midsole including a series of walls defining one or more localized channels each receiving a quantity of particulate matter.

Referring to FIG. 22, a cross-sectional view taken along line 22-22 of FIG. 19 shows localized toe and lateral-forefoot channels 320g, 340g, respectively, extending into the cavity 240g along with the slab of polymer foam 1900 to define the midsole 250g. The slab of polymer foam 1900 and the one or more particulate matter-containing localized channels 320g, 340g, 330g cooperate to provide a combination of responsive-type and soft-type cushioning during gradient loading of the sole structure 200g. For example, the slab of polymer foam 1900 provides responsive-type cushioning and the particulate matter 350 residing in the localized channels 320g, 330g, 340g provides soft-type cushioning. The examples show the toe channel 320g occupying a region of the forefoot portion 12 corresponding to toes of the foot. The lateral-forefoot channel 340g may occupy a region of the forefoot portion 12 located proximate to the lateral side 18 so that the level of soft-type cushioning may be increased when loads are imparted proximate to the lateral side 18 of the forefoot portion 12. The medial-forefoot channel 330g may occupy a region of the forefoot portion 12 located proximate to the medial side 20 so that the level of soft-type cushioning may be increased when loads are imparted proximate to the medial side 20 of the forefoot portion 12. The example configurations may include any combination of the localized channels 320g, 330g, 340g to achieve desired cushioning characteristics. Other configurations may include one or more other localized channels 310g located at other areas of the cavity such as the heel portion 16.

Referring to FIGS. 23 and 24, in some implementations, an article of footwear 10h includes an upper 100 and a sole structure 200h attached to the upper 100. In view of the substantial similarity in structure and function of the components associated with the article of footwear 10 with respect to the article of footwear 10h, like reference numerals are used hereinafter and in the drawings to identify like components while like reference numerals containing letter extensions are used to identify those components that have been modified.

The sole structure 200h may include an outsole 210h, a footbed 220h, and the midsole 250 of FIGS. 1-3 arranged in the layered configuration. The sidewall 230 may separate the outsole 210h and the footbed 220h to define a cavity 240h therebetween, allowing the midsole 250 to reside within the cavity 240h between the outsole 210h and the footbed 220h. The outsole 210h includes an inner surface 214h disposed on an opposite side of the outsole 210h than the ground-engaging surface 212. The footbed 220h includes a bottom surface 222h disposed on an opposite side of the footbed 220g than a top surface 224h. The sole structure 200h may also include an insole 228h disposed on the top surface 224h of the footbed 220h within at least a portion of the interior void 102 of the upper 100.

The insole 228h may include a bottom surface 232h and an opposing top surface 234h. The bottom surface 232h may be disposed upon the top surface 224h of the footbed 220h. Accordingly, the outsole 210h, the midsole 250, the footbed 220h, and the insole 228h may be arranged in the layered configuration extending between the forefoot, mid-foot, and heel portions 12, 14, 16 of the sole structure 200h and also extending between the lateral and medial sides 18, 20. Particulate matter 350 may reside within the insole 228h to provide cushioning for the foot during use of the footwear 10h. In some implementations, the insole 228h includes a series of walls 400 that define a series of channels 410 extending along an entire length of the insole 228h through the forefoot portion 12, the mid-foot portion 14, and the heel portion 16. Each channel 410 of the insole 228h may receive a quantity of the particulate matter 350. Additionally, the midsole 250 includes the series of walls 300 defining the series of channels 310 each receiving a quantity of the particulate matter 350.

Referring to FIG. 24, a cross-sectional view taken along line 24-24 of FIG. 23 shows the series of walls 400 defining the series of channels 410 of the insole 228h and the series of walls 300 defining the series of channels 310 of the midsole 250 each receiving a corresponding quantity of the particulate matter 350 (e.g., foam beads). The series of walls 400 may extend between the bottom surface 232h and the top surface 234h to isolate each of the channels 410 from one another. Similar to the midsole channels 310, each of the insole channels 410 may extend substantially perpendicular to the longitudinal axis L of the sole structure 200h between the lateral and medial sides 18, 20. In some configurations, each channel 410 receives a quantity of the particulate matter 350 therein, thereby allowing the series of channels 410 to communicate with one another to restrict, prevent, or otherwise control migration of the particulate matter 350 residing within the insole 228h during use of the footwear 10h.

The series of walls 400 that define the series of channels 410 cooperate with the particulate matter 350 residing therein to enhance functionality and enhance cushioning characteristics that a conventional insole provides. For example, one or more polymer foam materials, such as ethyl-vinyl-acetate or polyurethane, may form the series of walls 400 to provide resilient compressibility under an applied load to attenuate ground-reaction forces. The particulate matter 350 may include the foam beads having the substantially spherical shape to provide soft-type cushioning upon compression during gradient loading of the sole structure 200h. In some examples, the particulate matter 350 includes foam beads that have approximately the same size and shape. In other examples, the particulate matter 350 includes foam beads having at least one of a different size and shape.

In the example configuration, each insole channel 410 is substantially similar to the midsole channels 310, as described in detail in the examples above with reference to FIGS. 1-3. For example, each channel 410 may define the longitudinal axis $L_C$ extending substantially perpendicular to the longitudinal axis L of the sole structure 200h, and each channel 410 may have a substantially triangular cross-section defined by a pair of adjacent walls 400 and one of the bottom surface 232h or the top surface 234h. Each channel 410 extending from the bottom surface 232h of the insole 228h may be disposed between a corresponding pair of adjacent channels 410 extending from the top surface 234h of the insole 228h. Likewise, each channel 410 extending from the top surface 234h of the insole 228h may be disposed between a corresponding pair of adjacent channels 410 extending from the bottom surface 232h of the insole 228h. The insole 238h and the midsole 250 each containing particulate matter 350 may cooperate to provide responsive-type and soft-type cushioning during gradient loading of the sole structure 200h. The footbed 220h and the insole 228h may be formed from the flexible material forming the midsole 220 of FIGS. 1-3 to provide the footbed 220h and the insole 228h with sufficient flexibility, thereby allowing the particulate matter 350 disposed within the channels 310, 410 to interact with the profile of the bottom surface of the foot during gradient loading of the sole structure 200h.

Referring to FIGS. 25 and 26, in some implementations, an article of footwear 10i includes an upper 100 and a sole structure 200i attached to the upper 100. In view of the substantial similarity in structure and function of the components associated with the article of footwear 10 with respect to the article of footwear 10i, like reference numerals are used hereinafter and in the drawings to identify like components while like reference numerals containing letter extensions are used to identify those components that have been modified.

The sole structure 200i may include an outsole 210i, a footbed 220i, and the midsole 250a of FIGS. 4-6 arranged in the layered configuration. The sidewall 230 may separate the outsole 210i and the footbed 220i to define a cavity 240i therebetween, allowing the midsole 250a to reside within the cavity 240i between the outsole 210i and the footbed 220i. The outsole 210i includes an inner surface 214i disposed on an opposite side of the outsole 210i than the ground-engaging surface 212. The footbed 220i includes a bottom surface 222i disposed on an opposite side of the footbed 220i than a top surface 224i. The sole structure 200i may also include an insole 228i disposed on the top surface 224i of the footbed 220i under the foot within at least a portion of the interior void 102 of the upper 100.

The insole 228i may include a bottom surface 232i and an opposing top surface 234i. The bottom surface 232i may be disposed upon the top surface 224i of the footbed 220i. Accordingly, the outsole 210i, the midsole 250a, the footbed 220i, and the insole 228i may be arranged in the layered configuration extending between the forefoot, mid-foot, and heel portions 12, 14, 16 of the sole structure 200i and also extending between the lateral and medial sides 18, 20. Particulate matter 350 may reside within the insole 228i to provide soft-type cushioning for the foot during use of the footwear 10i. In some implementations, the insole 228i includes a series of walls 400i that define a series of channels 410i extending along an entire length of the insole 228i through the forefoot portion 12, the mid-foot portion 14, and the heel portion 16. Each channel 410i of the insole 228i may receive a quantity of the particulate matter 350. Additionally, the midsole 250a includes the series of walls 300a defining the series of channels 310a each receiving a quantity of the particulate matter 350, as described above in the examples of FIGS. 4-6.

Referring to FIG. 26, a cross-sectional view taken along line 26-26 of FIG. 25 shows the series of walls 400i defining the series of channels 410i within the insole 228i and the series of walls 300a defining the series of channels 310a of the midsole 250a each receiving a corresponding quantity of the particulate matter 350 (e.g., foam beads). The series of walls 400i may extend between the bottom surface 232i and the top surface 234i to isolate each of the channels 410i from one another. Similar to the midsole walls 300a, each of the insole walls 400i may extend substantially perpendicular to the longitudinal axis L of the sole structure 200i between the lateral and medial sides 18, 20 to define multiple polygonal-shaped channels 410i along the entire length of the insole 228i. In some configurations, each channel 410i receives a quantity of the particulate matter 350 therein, thereby allowing the series of channels 410i to communicate with one another to restrict, prevent, or otherwise control migration of the particulate matter 350 residing within the insole 228i during use of the footwear 10i.

The channels 410i may be isolated from one another, thereby confining the quantities of particulate matter 350 within their corresponding channels 410i. The quantity of particulate matter 350 residing within each channel 410i may be substantially constant or may be different in at least one of the channels 410i. The series of walls 400i that define the series of channels 410i cooperate with the particulate matter 350 residing therein to enhance functionality and enhance cushioning characteristics that a conventional insole provides. For example, one or more polymer foam materials, such as ethyl-vinyl-acetate or polyurethane, may form the series of walls 400i to provide resilient compressibility for attenuating ground-reaction forces during gradient loading of the sole structure 200i. The particulate matter 350 may include the foam beads having the substantially spherical shape to provide soft-type cushioning upon compressing during the gradient loading.

In the example configuration, each insole channel 410i is substantially similar to the midsole channels 310a, as described in detail in the examples above with reference to FIGS. 4-6. For example, each channel 410i may define the longitudinal axis $L_C$ extending substantially perpendicular to the longitudinal axis L of the sole structure 200i, and each channel 410i may have a substantially hexagonal cross-section defined by a pair of adjacent walls 400i between the bottom surface 232i and the top surface 234i. In other configurations, each channel 410i may include any circular- or polygonal-shaped cross-section such as triangular, rectangular, or pentagonal. In some examples, the top surface 234i may enclose the particulate matter 350 residing within each of the channels 410i and the particulate matter 350 substantially fills each of the channels 410i. In some implementations, the top surface 234i is convex at each channel 410i enclosed. The quantity of particulate matter 350 residing in each channel 410i may be permitted to move along the channel longitudinal axis $L_C$. Conversely, the walls 400i may restrict the quantities of particulate matter 350 residing within the channels 410i from moving between the channels 410i in a direction substantially parallel to the longitudinal axis L of the midsole 250a. The insole 238i and the midsole 250i each containing particulate matter 350 within their corresponding channels 410i, 310a may cooperate to provide responsive-type and soft-type cushioning during gradient loading of the sole structure 200i. The footbed 220i and the insole 228i may be formed from the flexible material forming the footbed 220 of FIGS. 1-3 to provide the footbed 220i and the insole 228i with sufficient flexibility, thereby allowing the particulate matter 350 disposed within the channels 310a, 410i to interact with the profile of the bottom surface of the foot during gradient loading of the sole structure 200i.

Referring to FIGS. 27 and 28, in some implementations, an article of footwear 10j includes an upper 100 and a sole structure 200j attached to the upper 100. In view of the substantial similarity in structure and function of the components associated with the article of footwear 10 with respect to the article of footwear 10j, like reference numerals are used hereinafter and in the drawings to identify like components while like reference numerals containing letter extensions are used to identify those components that have been modified.

The sole structure 200j may include an outsole 210j, a footbed 220j, and the midsole 250b of FIGS. 7-9 arranged in the layered configuration. The sidewall 230 may separate the outsole 210j and the footbed 220j to define a cavity 240j therebetween, allowing the midsole 250b to reside within the cavity 240j between the outsole 210j and the footbed 220j. The outsole 210j includes an inner surface 214j disposed on an opposite side of the outsole 210j than the ground-engaging surface 212. The footbed 220j includes a bottom surface 222j disposed on an opposite side of the footbed 220j than a top surface 224j. The sole structure 200j may also include an insole 228j disposed on the top surface 224j of the footbed 220j under the foot within at least a portion of the interior void 102 of the upper 100.

The insole 228j may include a bottom surface 232j and an opposing top surface 234j. The bottom surface 232j may be disposed upon the top surface 224j of the footbed 220j. Accordingly, the outsole 210j, the midsole 250b, the footbed 220j, and the insole 228j may be arranged in the layered configuration extending between the forefoot, mid-foot, and heel portions 12, 14, 16 of the sole structure 200j and also extending between the lateral and medial sides 18, 20. Particulate matter 350 may reside within the insole 228j to provide soft-type cushioning for the foot during use of the footwear 10j. In some implementations, the insole 228j includes a series of walls 400j that define a series of channels 410j extending along an entire length of the insole 228i through the forefoot portion 12, the mid-foot portion 14, and the heel portion 16. A quantity of the particulate matter 350 may be received within the series of channels 410j and between the bottom and top surfaces 232j, 234j, respectively, of the insole 228j. Additionally, a quantity of particulate matter 350 may be received within the series of channels 310b and between the bottom and top surfaces 252b, 254b, respectively, of the midsole 250b, as described above in the examples of FIGS. 7-9.

Referring to FIG. 28, a cross-sectional view taken along line 28-28 of FIG. 27 shows the series of walls 400j defining the series of channels 410j of the insole 228j and the series of walls 300b defining the series of channels 310b of the midsole 250b. The series of walls 400j may extend between the bottom surface 232j and the top surface 234j of the insole 228j to define each of the channels 410j. Similar to the midsole walls 300b, each wall 400j may include a fabric formed from fibers under tension that define voids through each of the walls 400j. For example, each wall 400j may include a first end or portion attached to the bottom surface 232j and a second end or portion attached to the top surface 234j. A distance separating the bottom and top surfaces 232j, 234j causes the fibers forming each wall 400j to be under tension. FIG. 28 shows each wall 400j forming two of the series of channels 410j each having a circular or elliptical cross-section. In other configurations, each channel 410j may have a rectangular cross-section.

In the example configuration, each insole channel 410j is substantially similar to the midsole channels 310b, as described in detail in the examples above with reference to FIGS. 7-9. For instance, the quantity of particulate matter 350 residing within the insole 228j may substantially fill the volume of space between the bottom and top surfaces 232j, 234j, respectively, and the quantity of particulate matter 350 may move between adjacent ones of the series of channels 410j in a direction substantially parallel to the longitudinal axis L through the voids between adjacent ones of the fibers. Conversely, in some examples, the voids may not be large enough to permit the passing of the particulate matter 350, thereby allowing the fibers forming the walls 400j to restrict the particulate matter 350 from freely moving between adjacent channels 410j. Additionally, each channel 410j may define a longitudinal axis $L_C$ extending substantially perpendicular to the longitudinal axis L of the insole 228j, and the quantity of particulate matter 350 may be permitted to move along the longitudinal axis $L_C$ of each of the series of channels 410j between the lateral and medial sides 18, 20. The series of walls 300b and the channels 310b may cooperate with the particulate matter 350 residing between the bottom and top surfaces 252b, 254b, respectively, of the midsole 250b and the series of walls 400j and the channels 410j may cooperate with the particulate matter 350 residing between the bottom and top surfaces 232j, 234j, respectively, of the insole 228j to provide cushioning for the foot as well as to control movement of the particulate matter 350 during use of the footwear 10b. The footbed 220j and the insole 228j (e.g., top surface 228j and bottom surface 232j) may be formed from the flexible material forming the footbed 220 of FIGS. 1-3 to provide the footbed 220j and the insole 228j with sufficient flexibility, thereby allowing the particulate matter 350 disposed within the channels 310b, 410j to interact with the profile of the bottom surface of the foot during gradient loading of the sole structure 200j.

Referring to FIGS. 29 and 30, in some implementations, an article of footwear 10k includes an upper 100 and a sole structure 200k attached to the upper 100. In view of the substantial similarity in structure and function of the components associated with the article of footwear 10 with respect to the article of footwear 10k, like reference numerals are used hereinafter and in the drawings to identify like components while like reference numerals containing letter extensions are used to identify those components that have been modified.

The sole structure 200k may include the outsole 210k, a footbed 220k, and the midsole 250d of FIGS. 12-14 arranged in the layered configuration. The sidewall 230 may separate the outsole 210k and the footbed 220k to define a cavity 240k therebetween, allowing the midsole 250d to reside within the cavity 240k between the outsole 210k and the footbed 220k. The outsole 210k includes an inner surface 214k disposed on an opposite side of the outsole 210k than the ground-engaging surface 212. The footbed 220k includes a bottom surface 222k disposed on an opposite side of the footbed 220k than a top surface 224k. The sole structure 200k may also include an insole 228k disposed on the top surface 224k of the footbed 220k within at least a portion of the interior void 102 of the upper 100.

The insole 228k may include a bottom surface 232k and an opposing top surface 234k. The bottom surface 232k may be disposed upon the top surface 224k of the footbed 220k. Accordingly, the outsole 210k, the midsole 250d, the footbed 220k, and the insole 228k may be arranged in the layered configuration extending between the forefoot, mid-foot, and heel portions 12, 14, 16 of the sole structure 200k and also extending between the lateral and medial sides 18, 20. Particulate matter 350 may reside within the insole 228k to provide soft-type cushioning for the foot during use of the footwear 10k. In some implementations, the insole 228k includes a series of walls 400k that define a series of channels 410j extending along an entire length of the insole 228k through the forefoot portion 12, the mid-foot portion 14, and the heel portion 16. A quantity of the particulate matter 350 may be received within the series of channels 410k and between the bottom and top surfaces 232k, 234k, respectively, of the insole 228k. Additionally, the midsole 250d may include the upper series of walls 302d defining the upper series of channels 320d and the lower series of walls 304d defining the lower series of channels 340d, as described above in the examples of FIGS. 12-14. For example, a quantity of particulate matter 350 may be received within each of the upper series of channels 320d and the lower series of channels 340d. However, in other configurations, the quantity of particulate matter may be disposed in one of the upper series of channels 320d (e.g., upper series of channels 320f of FIG. 18) or the lower series of channels 340d (e.g., lower series of channels 340e of FIG. 16).

Referring to FIG. 30, a schematic cross-sectional view taken along line 30-30 of FIG. 29 shows the series of walls 400k defining the series of channels 410k of the insole 228k and the series of walls 300d (e.g. upper and lower series of walls 302d, 304d, respectively) defining the series of channels 310d (e.g., upper and lower series of channels 320d, 340d, respectively) of the midsole 250d. Similar to the second series of walls 302 defining the second series of channels 320 of the midsole 250c of FIG. 11, the series of walls 400k may extend between the bottom surface 232k and the top surface 234k of the insole 228k to define each of the series of channels 410j. For example, each of the series of walls 400k may extend between the lateral and medial sides 18, 20, respectively, of the insole 228k and may be spaced apart from one another along the entire length of the insole 228k. Adjacent walls 400k may form pairs that define corresponding ones of the series of channels 410k extending between the lateral and medial sides 18, 20 and also extending along the entire length of the insole 228k through the forefoot, mid-foot, and heel portions 12, 14, 16. In some examples, fibers restricting any passing of the particulate matter 350 form each of the walls 400k. The footbed 220k and the insole 228k (e.g., top surface 228k and bottom surface 232k) may be formed from the flexible material forming the footbed 220 of FIGS. 1-3 to provide the footbed 220k and the insole 228k with sufficient flexibility, thereby allowing the particulate matter 350 disposed within the channels 310d, 410k to interact with the profile of the bottom surface of the foot during gradient loading of the sole structure 200k.

In the example configuration, each of the series of channels 410k define a longitudinal axis $L_C$ disposed substantially perpendicular to the longitudinal axis L of the insole 228k, and the quantity of particulate matter 350 may be permitted to move along the longitudinal axis $L_C$ of each of the series of channels 410k. In some examples, the series of walls 400k restrict the quantity of particulate matter 350 from moving between adjacent ones of the series of channels 410k in the direction substantially parallel to the longitudinal axis L. Thus, each of the series of channels 400k may contain a corresponding quantity of the particulate matter 350 that is restricted from moving to adjoining channels 410k in the direction substantially parallel to the longitudinal axis L.

Referring to FIGS. 31 and 32, in some implementations, an article of footwear 101 includes an upper 100 and a sole structure 200l attached to the upper 100. In view of the substantial similarity in structure and function of the components associated with the article of footwear 10 with respect to the article of footwear 101, like reference numerals are used hereinafter and in the drawings to identify like components while like reference numerals containing letter extensions are used to identify those components that have been modified.

The sole structure 200l may include an outsole 210l, a footbed 220l, and a midsole 250l arranged in the layered configuration. The sidewall 230 may separate the outsole 210l and the footbed 220l to define a cavity 240l therebetween, allowing the midsole 250l to reside within the cavity 240l between the outsole 210l and the footbed 220l. The outsole 210l includes an inner surface 214l disposed on an opposite side of the outsole 210l than the ground-engaging surface 212. The footbed 220l includes a bottom surface 222l disposed on an opposite side of the footbed 220l than a top surface 224l. The sole structure 200l may also include an insole 228l disposed on the top surface 224l of the footbed 220l under the foot within at least a portion of the interior void 102 of the upper 100.

In some implementations, the midsole 250l includes a conventional slab of polymer foam disposed within—and substantially filling the cavity 240l. Accordingly, the midsole 250l may provide responsive cushioning to attenuate ground-reaction forces. The insole 228l may include a bottom surface 232l and an opposing top surface 234l. The bottom surface 232l may be disposed upon the top surface 224l of the footbed 220l. Accordingly, the outsole 210l, the midsole 250l, the footbed 220l, and the insole 228l may be arranged in the layered configuration extending between the forefoot, mid-foot, and heel portions 12, 14, 16 of the sole structure 200l and also extending between the lateral and medial sides 18, 20.

In some configurations, a series of walls 400l project from the bottom surface 232l and the top surface 234l of the insole 228l to define a series of channels 410l extending substantially perpendicular to the longitudinal axis L of the insole 228l between the forefoot, mid-foot, and heel portions 12, 14, 16. A quantity of particulate matter 350 may be received within the series of channels 410l, and in some examples, the quantity of particulate matter 350 substantially fills the channels 410l (e.g. voids). In some examples, the series of walls 400l extending between the bottom surface 232l and the top surface 234l provide cushioning for the foot as well as to prevent migration of the quantities of particulate matter 350 residing within the corresponding channels 410l during use of the footwear 101. The walls 400l (e.g., projections) and the channels 410l, together with the quantities of particulate matter 350 (e.g., foam beads) residing in the channels 410l, may cooperate to enhance functionality and enhance cushioning characteristics that a conventional insole provides. For example, one or more polymer foam materials, such as ethyl-vinyl-acetate or polyurethane, may form the walls 400l to provide resilient compressibility for attenuating ground-reaction forces during gradient loading of the sole structure 200l. The particulate matter 350 may include foam beads to provide soft-type cushioning when under compression. The insole 228l (e.g., top surface 228l and bottom surface 232l) may be formed from the flexible material forming the footbed 220 of FIGS. 1-3 to provide the insole 228l with sufficient flexibility, thereby allowing the particulate matter 350 disposed within the channels 410l to interact with the profile of the bottom surface of the foot during gradient loading of the sole structure 200l.

In some implementations, the series of walls 400l defining the series of channels 410l include an upper series of walls 402 defining an upper series of channels 420 and a lower series of walls 404 defining a lower series of channels 440. FIG. 32 provides a schematic cross-sectional view taken along line 32-32 of FIG. 31 showing the lower series of walls 404 defining the lower series of channels 440 extending from the bottom surface 232*l* in a direction toward the top surface 234*l* of the insole 228*l*, the upper series of walls 402 defining the upper series of channels 420 extending from the top surface 234*l* in an opposite direction toward the bottom surface 232*l* of the insole 228*l*, and the midsole 250*l* residing between the footbed 220*l* and the outsole 210*l*. In this implementation, each of the upper and lower walls 402, 404 and each of the channels 420, 440 are equally spaced from one another between the lateral and medial sides 18, 20 of the insole 228*l* and also along the entire length of the insole 228*l*. In some examples, the upper and lower walls 402, 404 are arranged in repeating rows along respective ones of the top surface 234*l* and the bottom surface 232*l* between the lateral and medial sides 18, 20 of the insole 228*l* and also along the entire length of the insole 228*l*. In other examples, the upper and lower walls 402, 404 are arranged in alternating repeating rows.

In the example configuration, each channel 420, 440 contains a quantity of particulate matter 350 restricted from moving outside the corresponding channel 420, 440 by the respective walls 402, 404. Moreover, each of the channels 410*l* (e.g., upper channels 420 and lower channels 440) may define a longitudinal axis $L_C$ that extends substantially perpendicular to the longitudinal axis L of the insole 228*l*. In some examples, the quantity of particulate matter 350 residing within each of the channels 310*d* is permitted to move along the channel longitudinal axis $L_C$. However, the particulate matter 350 residing within each of the channels 410*l* is restricted by the walls 400*l* from moving between the channels 410*l* in a direction substantially parallel to the longitudinal axis L of the insole 228*l*. In some examples, a quantity of particulate matter 350 only resides in the upper series of channels 420 or the lower series of channels 440.

Referring to FIGS. 33 and 34, in some implementations, an article of footwear 10*m* includes an upper 100 and a sole structure 200*m* attached to the upper 100. In view of the substantial similarity in structure and function of the components associated with the article of footwear 10 with respect to the article of footwear 10*m*, like reference numerals are used hereinafter and in the drawings to identify like components while like reference numerals containing letter extensions are used to identify those components that have been modified.

The sole structure 200*m* may include the outsole 210*l*, the footbed 220*l*, and the midsole 250*l* of FIGS. 31 and 32 arranged in the layered configuration. The sidewall 230 may separate the outsole 210*l* and the footbed 220*l* to define the cavity 240*l* therebetween, allowing the midsole 250*l* to reside within the cavity 240*l* between the outsole 210*l* and the footbed 220*l*. The sole structure 200*m* may also include the insole 228*i* of FIGS. 25 and 26 disposed on the top surface 224*l* of the footbed 220*l* within at least a portion of the interior void 102 of the upper 100. The insole 228*i* includes the series of walls 400*i* that define the series of channels 410*i* each receiving a quantity of the particulate matter 350, as described above in the examples of FIGS. 25 and 26. Accordingly, the outsole 210*l*, the footbed 220*l*, the midsole 250*l*, and the insole 228*i* may be arranged in the layered configuration to define the sole structure 200*m*.

Referring to FIG. 34, a schematic cross-sectional view taken along line 34-34 of FIG. 33 shows the series of walls 400*i* defining the series of channels 410*i* within the insole 228*i* receiving a corresponding quantity of the particulate matter 350 (e.g., foam beads) and the midsole 250*l* residing between the footbed 220*l* and the outsole 210*l*. The insole 228*i* containing the particulate matter 350 within each of the channels 410*i* may cooperate with the midsole 250*l* including the slab of polymer foam to provide cushioning from soft to responsive during gradient loading of the sole structure 200*m*.

Referring to FIGS. 35 and 36, in some implementations, an article of footwear 10*n* includes an upper 100 and a sole structure 200*n* attached to the upper 100. In view of the substantial similarity in structure and function of the components associated with the article of footwear 10 with respect to the article of footwear 10*n*, like reference numerals are used hereinafter and in the drawings to identify like components while like reference numerals containing letter extensions are used to identify those components that have been modified.

The sole structure 200*n* may include the outsole 210*l*, the footbed 220*l*, and the midsole 250*l* of FIGS. 31 and 32 arranged in the layered configuration. The sidewall 230 may separate the outsole 210*l* and the footbed 220*l* to define the cavity 240*l* therebetween, allowing the midsole 250*l* to reside within the cavity 240*l* between the outsole 210*l* and the footbed 220*l*. The sole structure 200*n* may also include the insole 228*j* of FIGS. 27 and 28 disposed on the top surface 224*l* of the footbed 220*l* within at least a portion of the interior void 102 of the upper 100. The insole 228*j* includes the series of walls 400*j* that define the series of channels 410*j* when under tension. A quantity of the particulate matter 350 may be received within the series of channels 410*j* and between the bottom and top surfaces 232*j*, 234*j*, respectively, of the insole 228*j*, as described above in the examples of FIGS. 27 and 28.

Referring to FIG. 36, a schematic cross-sectional view taken along line 36-36 of FIG. 35 shows the series of walls 400*j* defining the series of channels 410*j* within the insole 228*j* and the midsole 250*l* residing between the footbed 220*l* and the outsole 210*l*. The example configuration shows the quantity of the particulate matter 350 residing within the series of channels 410*j* and between the bottom and top surfaces 232*j*, 234*j*, respectively, of the insole 228*j*. Accordingly, the insole 228*i* containing the particulate matter 350 may cooperate with the midsole 250*l* including the slab of polymer foam to provide cushioning from soft to responsive during gradient loading of the sole structure 200*n*.

Referring to FIGS. 37 and 38, in some implementations, an article of footwear 10*p* includes an upper 100 and a sole structure 200*p* attached to the upper 100. In view of the substantial similarity in structure and function of the components associated with the article of footwear 10 with respect to the article of footwear 10*p*, like reference numerals are used hereinafter and in the drawings to identify like components while like reference numerals containing letter extensions are used to identify those components that have been modified.

The sole structure 200*p* may include the outsole 210*l*, the footbed 220*l*, and the midsole 250*l* of FIGS. 31 and 32 arranged in the layered configuration. The sidewall 230 may separate the outsole 210*l* and the footbed 220*l* to define the cavity 240*l* therebetween, allowing the midsole 250*l* to reside within the cavity 240*l* between the outsole 210*l* and the footbed 220*l*. The sole structure 200*p* may also include the insole 228*k* of FIGS. 29 and 30 disposed on the top surface 224*l* of the footbed 220*l* within at least a portion of the interior void 102 of the upper 100. The insole 228*k* includes the series of walls 400*k* that define the series of channels 410*k* each receiving a quantity of the particulate matter 350, as described above in the examples of FIGS. 29 and 30. Accordingly, the outsole 210*l*, the footbed 220*l*, the midsole 250*l*, and the insole 228*i* may be arranged in the layered configuration to define the sole structure 200*p*.

Referring to FIG. 38, a cross-sectional view taken along line 38-38 of FIG. 37 shows the series of walls 400*k* defining the series of channels 410*k* within the insole 228*k* each receiving a corresponding quantity of the particulate matter 350 (e.g., foam beads) and the midsole 250*l* residing between the footbed 220*l* and the outsole 210*l*. The insole 228*k* containing the particulate matter 350 within each of the channels 410*k* may cooperate with the midsole 250*l* including the slab of polymer foam to provide cushioning from soft to responsive during gradient loading of the sole structure 200*p*.

FIGS. 23-38 provide multiple example sole structure configurations where different combinations of insoles and midsole components are used to impart desired cushioning characteristics during loading of the sole structures. This disclosure is not limited to the example sole structure configurations of FIGS. 23-38, whereby different combinations of the insole and midsole components discussed herein may be used to form various other sole structure configurations not explicitly shown in the example illustrations of this disclosure.

Figure 39:
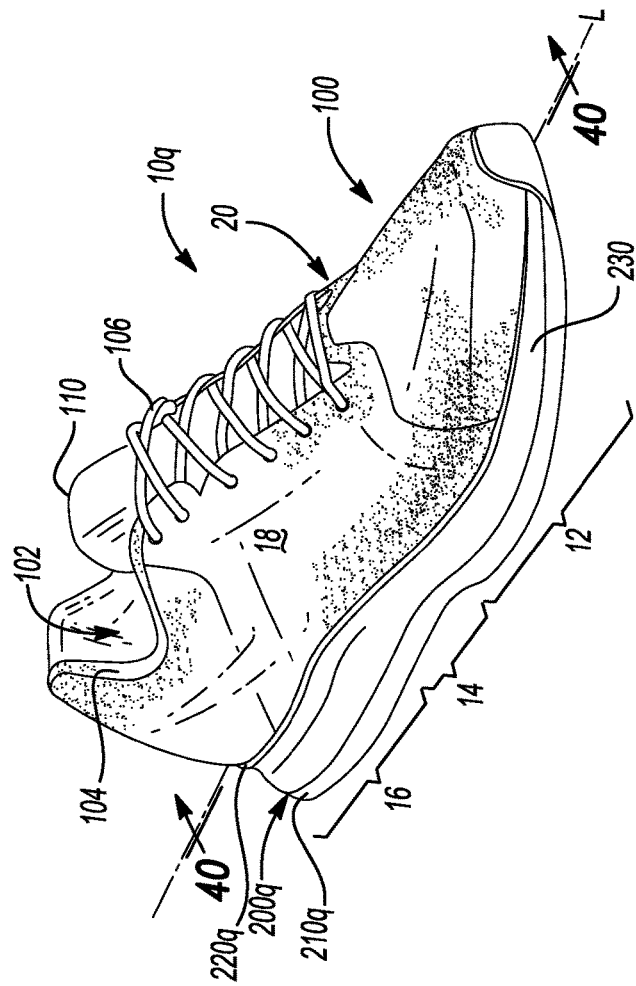
FIG. 39 is a top perspective view of an article of footwear in accordance with the present disclosure.
Figure 40:
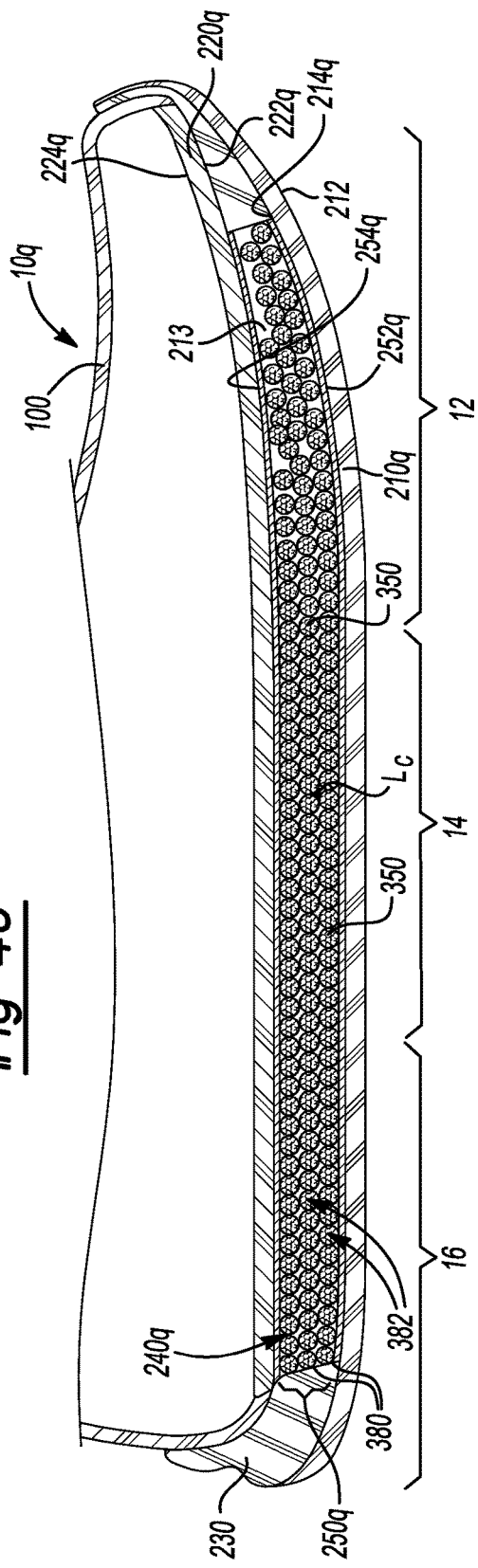
FIG. 40 is a cross-sectional view taken along line 40-40 of FIG. 39 showing a midsole having a series of tubes that define a series of channels each receiving a quantity of particulate matter.

Referring to FIGS. 39 and 40, an article of footwear 10*q* is provided and includes an upper 100 and a sole structure 200*q* attached to the upper 100. In view of the substantial similarity in structure and function of the components associated with the article of footwear 10 with respect to the article of footwear 10*q*, like reference numerals are used hereinafter and in the drawings to identify like components while like reference numerals containing letter extensions are used to identify those components that have been modified.

The sole structure 200*q* may include an outsole 210*q*, a midsole 250*q*, and a footbed 220*q* arranged in the layered configuration. The sidewall 230 may separate the outsole 210*q* and the footbed 220*q* to define a cavity 240*q* therebetween, thereby allowing the midsole 250*q* to reside within the cavity 240*q* between the outsole 210*q* and the footbed 220*q*. The outsole 210*q* includes an inner surface 214*q* disposed on an opposite side of the outsole 210*q* than the ground-engaging surface 212. The footbed 220*q* includes a bottom surface 222*q* disposed on an opposite side of the footbed 220*q* than a top surface 224*q*.

The midsole 250*q* may reside within the cavity 240*q* and may include a bottom surface 252*q* and a top surface 254*q*. The top surface 254*q* may be formed on a substrate that opposes the bottom surface 222*q* of the footbed 220*q* and the bottom surface 252*q* may formed on a substrate that opposes the inner surface 214*q* of the outsole 210. The top surface 254*q* may be contoured to conform to the profile of the bottom plantar surface of a foot and may be formed from a flexible material such as, for example, fabric. Particulate matter 350 may reside within the midsole 250*q* to provide cushioning for the foot during use of the footwear 10*q*. In some implementations, the midsole 250*q* includes a series of walls or tubes 380 that define a series of channels 382 extending between the medial and lateral sides 18, 20 and along an entire length of the midsole 250*q* through the forefoot portion 12, the mid-foot portion 14, and the heel portion 16. The series of tubes 380 may extend between the bottom surface 252*q* and the top surface 254*q* to isolate each of the channels 382 from one another in a direction extending substantially parallel to the longitudinal axis L. In some examples, the tubes 380 are stacked on top of one another and may or may not be attached to one another. Further, while tubes 380 are described and shown as extending between the substrates defining the bottom surface 252*q* and the top surface 254*q*, the tubes 380 could alternatively define the depth of the midsole 250*q* such that the tubes 380 extend between and are in contact with the bottom surface 222*q* of the footbed 220*q* and the inner surface 214*q* of the outsole 210*q*.

FIG. 40 provides a cross-sectional view taken along line 40-40 of FIG. 39 showing the series of walls or tubes 380 of the midsole 250*q* that define the series of channels 382 each receiving a corresponding quantity of the particulate matter 350 (e.g., foam beads). Each channel 382 may define a longitudinal axis $L_C$ that extends in a direction substantially perpendicular to the longitudinal axis L of the midsole 250*q* between the lateral and medial sides 18, 20, respectively. The example configuration shows each of the channels 382 as having a substantially circular cross-section defined by interior walls of a corresponding tube 380. The tubes 380 are arranged in a stacked configuration and may be stitched or fastened together. In some examples, the tubes 380 are freely movable relative to one another, thereby permitting the tubes 380 to shift in response to ground-reaction forces. Each tube 380 may define a channel 382 having the same or a different cross-sectional area to impart desired cushioning characteristics to different regions of the sole structure 200*q*. FIG. 40 shows voids 213 located within the midsole 250*q* proximate to the forefoot portion 12 that are not occupied by tubes 380. These voids 213 may permit the tubes 380 to slightly shift during gradient loading of the sole structure to provide fluidic cushioning as the ground-engaging surface 212 rolls for engagement from the heel portion 16 to the forefoot portion 12. In other examples, the midsole 250*q* does not contain any voids 213 and is entirely filled by the tubes 380 (with the exception of voids defined by interstitial spaces between adjacent tubes 380).

Figure 41:
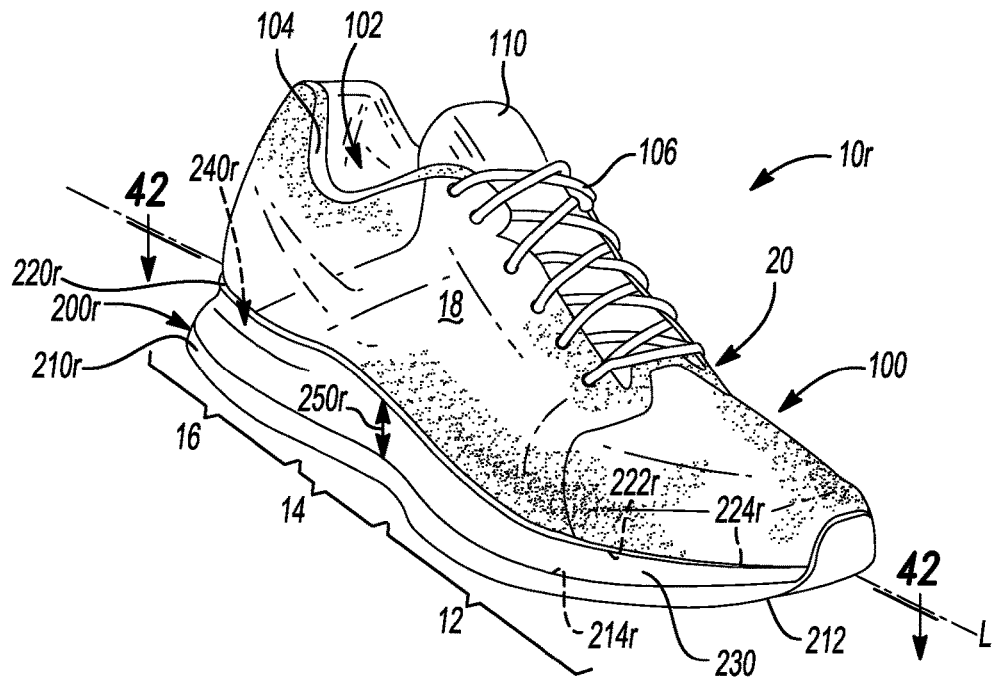
FIG. 41 is a top perspective view of an article of footwear in accordance with the present disclosure.
Figure 42:
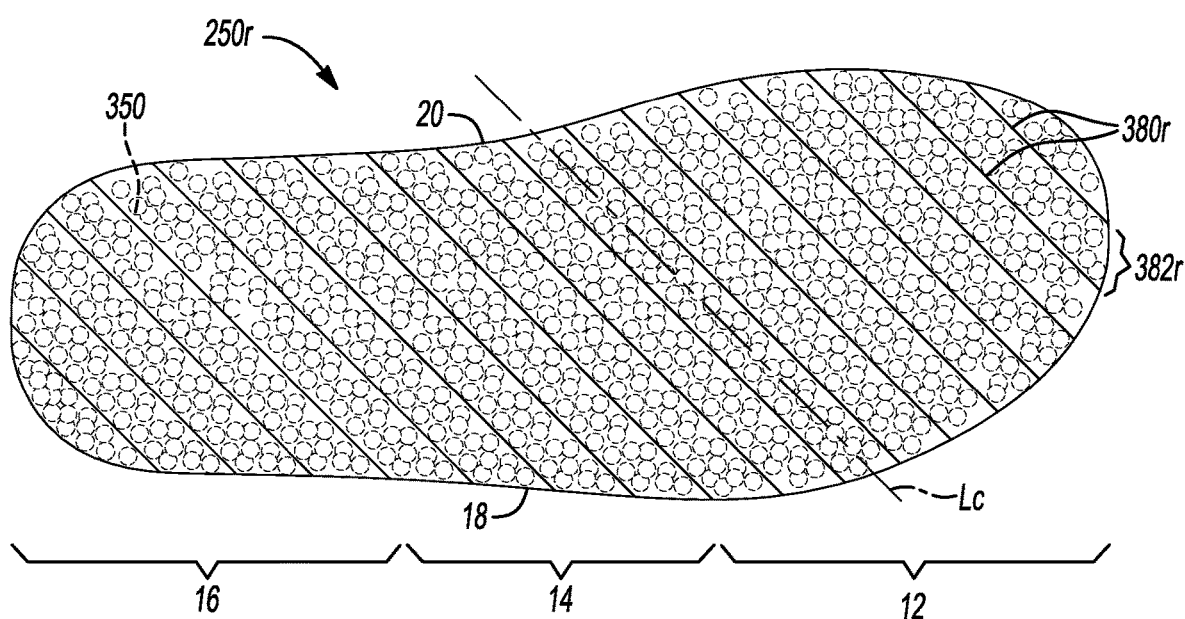
FIG. 42 is a cross-sectional top view taken along line 42-42 of FIG. 41 showing a midsole having a series of tubes that define a series of channels each receiving a quantity of particulate matter.

Referring to FIGS. 41 and 42, an article of footwear 10*r* is provided and includes an upper 100 and a sole structure 200*r* attached to the upper 100. In view of the substantial similarity in structure and function of the components associated with the article of footwear 10 with respect to the article of footwear 10*r*, like reference numerals are used hereinafter and in the drawings to identify like components while like reference numerals containing letter extensions are used to identify those components that have been modified.

The sole structure 200*r* may include an outsole 210*r*, a midsole 250*r*, and a footbed 220*q* arranged in the layered configuration. The sidewall 230 may separate the outsole 210*r* and the footbed 220*r* to define a cavity 240*r* therebetween, thereby allowing the midsole 250*r* to reside within the cavity 240*r* between the outsole 210*r* and the footbed 220*r*. The outsole 210*r* includes an inner surface 214*r* disposed on an opposite side of the outsole 210*r* than the ground-engaging surface 212. The footbed 220*r* includes a bottom surface 222*r* disposed on an opposite side of the footbed 220*r* than a top surface 224*r*.

The midsole 250*r* may reside within the cavity 240*r* and may include a bottom surface and a top surface associated with respective substrates, as described above with respect to the bottom and top surfaces 252*q*, 254*q* of FIGS. 39 and 40. Particulate matter 350 may reside within the midsole 250*r* to provide cushioning for the foot during use of the footwear 10*r*. In some implementations, the midsole 250*r* includes a series of walls or tubes 380*r* that define a series of channels 382*r* extending along an entire length of the midsole 250*r* through the forefoot portion 12, the mid-foot portion 14, and the heel portion 16. The series of tubes 380*r* may extend between the bottom and top surfaces of the midsole 250r to isolate each of the channels 382r from one another in a direction extending transverse to the longitudinal axis L. In other words, each tube 380r is oriented to extend between the lateral and medial sides 18, 20, respectively, at an angle with respect to the longitudinal axis L. Conversely, the tubes 380 of FIGS. 39 and 40 extend in a direction substantially perpendicular to the longitudinal axis. In short, the midsole 250r is identical to the midsole 250q with the exception of the orientation of the tubes 380r.

FIG. 42 provides a cross-sectional top view taken along line 42-42 of FIG. 41 showing the series of walls or tubes 380r of the midsole 250r that define the series of channels 382r each receiving a corresponding quantity of the particulate matter 350 (e.g., foam beads). Each channel 382r may define a longitudinal axis $L_C$ that extends in the direction transverse the longitudinal axis L of the midsole 250r between the lateral and medial sides 18, 20, respectively. In the example configuration, each of the channels 382r may have a substantially circular cross-section defined by interior walls of a corresponding tube 380r in a similar fashion as shown above with respect to the tubes 380. The tubes 380r may be arranged in a stacked configuration and may be stitched or fastened together. In some examples, the tubes 380r are freely movable relative to one another, thereby permitting tubes 380r to shift in response to ground reaction forces. Each tube 380r may define a channel 382r having the same or a different cross-sectional area to impart desired cushioning characteristics to different regions of the sole structure 200r.

Figure 43:
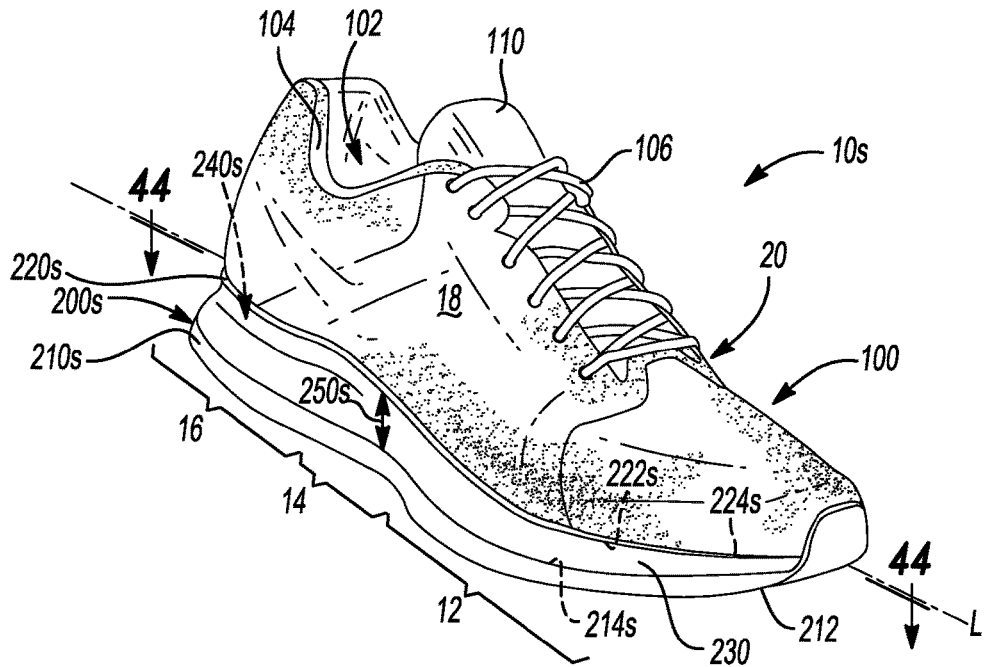
FIG. 43 is a top perspective view of an article of footwear in accordance with the present disclosure.
Figure 44:
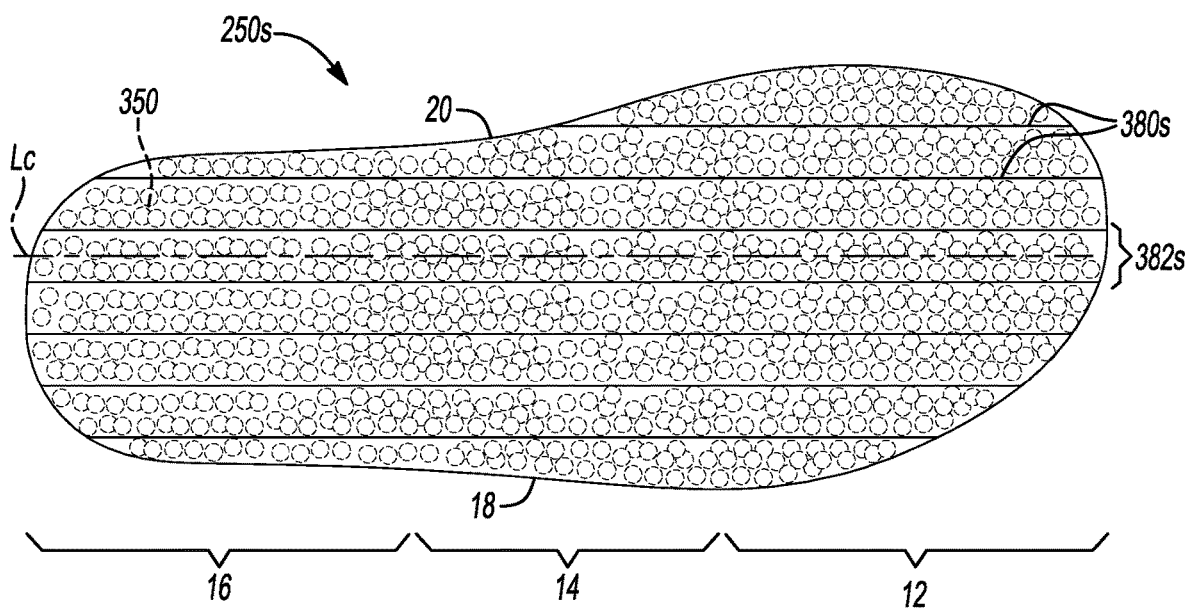
FIG. 44 is a cross-sectional top view taken along line 44-44 of FIG. 43 showing a midsole having a series of tubes that define a series of channels each receiving a quantity of particulate matter.

Referring to FIGS. 43 and 44, an article of footwear 10s is provided and includes an upper 100 and a sole structure 200s attached to the upper 100. In view of the substantial similarity in structure and function of the components associated with the article of footwear 10 with respect to the article of footwear 10s, like reference numerals are used hereinafter and in the drawings to identify like components while like reference numerals containing letter extensions are used to identify those components that have been modified.

The sole structure 200s may include an outsole 210s, a midsole 250s, and a footbed 220s arranged in the layered configuration. The sidewall 230 may separate the outsole 210s and the footbed 220s to define a cavity 240s therebetween, thereby allowing the midsole 250s to reside within the cavity 240s between the outsole 210s and the footbed 220s. The outsole 210s includes an inner surface 214s disposed on an opposite side of the outsole 210s than the ground-engaging surface 212. The footbed 220s includes a bottom surface 222s disposed on an opposite side of the footbed 220s than a top surface 224s.

The midsole 250s may reside within the cavity 240s and may include a bottom surface and a top surface respectively associated with a substrate, as described above with respect to the bottom and top surfaces 252q, 254q of FIGS. 39 and 40. Particulate matter 350 may reside within the midsole 250s to provide cushioning for the foot during use of the footwear 10s. In some implementations, the midsole 250s includes a series of walls or tubes 380s that define a series of channels 382s extending along an entire length of the midsole 250s through the forefoot portion 12, the mid-foot portion 14, and the heel portion 16. The series of tubes 380s may extend between the bottom and top surfaces of the midsole 250s to isolate each of the channels 382s from one another in a direction extending substantially perpendicular to the longitudinal axis L. In other words, each tube 380s extends substantially parallel to the longitudinal axis L and prevents the particulate matter 350 residing therein from shifting between the lateral and medial sides 18, 20, respectively. Conversely, the tubes 380 of FIGS. 39 and 40 extend in a direction substantially perpendicular to the longitudinal axis L, thereby permitting the particulate matter 350 residing within each tube to shift between the lateral and medial sides 18, 20, respectively. In short, the midsole 250s is identical to the midsole 250q with the exception of the orientation of the tubes 380r. Namely, the tubes 380s are oriented ninety degrees (90°) relative to the tubes 380.

FIG. 44 provides a cross-sectional top view taken along line 44-44 of FIG. 43 showing the series of walls or tubes 380s of the midsole 250s that define the series of channels 382s each receiving a corresponding quantity of the particulate matter 350 (e.g., foam beads). Each channel 382s may define a longitudinal axis $L_C$ that extends in a direction substantially parallel to the longitudinal axis L of the midsole 250r and along the lateral and medial sides 18, 20, respectively. Accordingly, particulate matter 350 residing within each tube 380s is free to move along the longitudinal axis $L_C$ of the corresponding channel 382s in the direction substantially parallel to the longitudinal axis L of the midsole 250s. In the example configuration, each of the channels 382s may have a substantially circular cross-section defined by interior walls of a corresponding tube 380s, as shown above with respect to the tubes 380. The tubes 380s may be arranged in a stacked configuration and may be stitched or fastened together. In some examples, the tubes 380s are freely movable relative to one another, thereby permitting tubes 380s to shift in response to ground-reaction forces. Each tube 380s may define a channel 382s having the same or a different cross-sectional area to impart desired cushioning characteristics to different regions of the sole structure 200s.

Referring to FIGS. 40, 42, and 44, the channels 382, 382r, 382s define voids that receive and enclose the particulate matter 350. In some examples, the tubes 380, 380r, 380s isolate each corresponding channel 382, 382r, 382s from one another to restrict the particulate matter 350 from moving between adjacent channels 382, 382r, 382s. For example, each tube 380 of FIG. 40 restricts particulate matter 350 from moving between adjacent channels 382 in a direction substantially parallel to the longitudinal axis L of the midsole 250q. In contrast, each tube 380s of FIG. 44 restricts particulate matter 350 from moving between adjacent channels 382s in a direction substantially perpendicular to the longitudinal axis L of the midsole 250q. In these examples, the quantities of particulate matter 350 remain contained in the corresponding channels 382, 382s without shifting or migrating to other areas of the midsole 250q, 250s when the sole structure 200q, 200s compresses repeatedly. The configuration shown in FIG. 42 allows the particulate matter 350 to move along the longitudinal axis $L_C$ defined by each tube 380r and, as such, allows for movement of the particulate matter 350 at an angle relative to the longitudinal axis L. In sum, the tubes 380, 380r, 380s allow the particulate matter 350 to move along the longitudinal axis $L_C$ defined by each channel 382, 382r, 382s, which may be in a direction substantially perpendicular to the longitudinal axis L of the midsole 250q (FIG. 40), in a direction transverse to the longitudinal axis L of the midsole 250r (FIG. 42), or in a direction substantially parallel to the longitudinal axis L of the midsole 250s (FIG. 44).

In addition to controlling movement and migration of the particulate matter 350, permitting the tubes 380, 380r, 380s to shift in unison (when fastened together) or move freely relative to one another can dictate how responsive the cushioning is at the corresponding forefoot, mid-foot, and heel portions 12, 14, 16, respectively. Thus, the footbed 220$q$, 220$r$, 220$s$ may translate toward the outsole 210$q$, 210$r$, 210$s$ during gradient loading of the sole structure 200$q$, 200$r$, 200$s$, thereby causing the tubes 380, 380$r$, 380$s$ and the particulate matter 350 to compress and provide cushioning from soft to responsive. The footbed 220$q$, 220$r$, 220$s$ may be formed from the flexible material forming the footbed 220 of FIGS. 1-3 to provide the footbed 220$q$, 220$r$, 220$s$ with sufficient flexibility, thereby allowing the particulate matter 350 disposed within the channels 382, 382$r$, 382$s$ to interact with the profile of the bottom surface of the foot during gradient loading of the sole structure 200$q$, 200$r$, 200$s$.

The responsiveness of the midsole 250$q$, 250$r$, 250$s$ may be adjusted by controlling both the material and thickness of the tubes 380, 380$r$, 380$s$. For example, the tubes 380, 380$r$, 380$s$ may be formed from a foam material, as described above with respect to the walls 300 of FIGS. 1-4, or, alternatively, may be formed form a woven material such as fabric. Forming the tubes 380, 380$r$, 380$s$ from a fabric material reduces the responsiveness of the midsole 250$q$, 250$r$, 250$s$ and causes the midsole 250$q$, 250$r$, 250$s$ to rely primarily on the particulate matter 350 for cushioning. Conversely, forming the tubes 380, 380$r$, 380$s$ from a relatively thick foam material allows the tubes 380, 380$r$, 380$s$ to provide the midsole 250$q$, 250$r$, 250$s$ with a degree of rigidity, thereby increasing the responsiveness of the midsole 250$q$, 250$r$, 250$s$ and relying less on the particulate matter 350 for cushioning.

In some configurations, the midsole 250$q$, 250$r$, 250$s$ may include a combination of at least two of the tubes 380, 380$r$, 380$s$. For example, the tubes 380 extending in the direction substantially perpendicular to the longitudinal axis L of the midsole 250$q$ (FIG. 40) could be arranged as a bottom layer while the tubes 380$s$ are arranged as a top layer that is disposed on the tubes 380.

The following Clauses provide an exemplary configuration for the sole structure for an article of footwear described above.

Clause 1: An article of footwear comprising an upper, an outsole attached to the upper and including a ground-engaging surface, and a midsole disposed between the upper and the outsole and including a series of walls that define a series of channels extending substantially perpendicular to a longitudinal axis of the midsole and along an entire length of the midsole. The series of channels being isolated from one another and each receiving a quantity of particulate matter therein.

Clause 2: The article of footwear of Clause 1, wherein the particulate matter is permitted to move along a longitudinal axis of each channel in a direction substantially perpendicular to the longitudinal axis of the midsole.

Clause 3: The article of footwear of any of the preceding Clauses, wherein the particulate matter is restricted from moving between channels in a direction substantially parallel to the longitudinal axis of the midsole by the walls.

Clause 4: The article of footwear of any of the preceding Clauses, wherein the channels include a substantially circular cross-section.

Clause 5: The article of footwear of any of the preceding Clauses, wherein the channels include a substantially triangular cross-section.

Clause 6: The article of footwear of any of the preceding Clauses, wherein the channels overlap one another.

Clause 7: The article of footwear of any of the preceding Clauses, wherein the particulate matter includes foam beads.

Clause 8: The article of footwear of Clause 7, wherein the foam beads include a substantially spherical shape.

Clause 9: The article of footwear of Clause 7, wherein the foam beads include approximately the same size and shape.

Clause 10: The article of footwear of Clause 7, wherein the foam beads include at least one of a different size and shape.

Clause 11: An article of footwear comprising an upper, an outsole attached to the upper and including a ground-engaging surface, and a midsole disposed between the upper and the outsole and including a series of walls that define a series of channels extending substantially perpendicular to a longitudinal axis of the midsole. The series of channels overlapping one another in a direction substantially parallel to the longitudinal axis and each receiving a quantity of particulate matter therein.

Clause 12: The article of footwear of Clause 11, wherein the particulate matter is permitted to move along a longitudinal axis of each channel in a direction substantially perpendicular to the longitudinal axis of the midsole.

Clause 13: The article of footwear of any of the preceding Clauses, wherein the particulate matter is restricted from moving between channels in a direction substantially parallel to the longitudinal axis of the midsole by the walls.

Clause 14: The article of footwear of any of the preceding Clauses, wherein the channels include a substantially triangular cross-section.

Clause 15: The article of footwear of any of the preceding Clauses, wherein at least one of the series of channels overlaps a pair of the series of channels.

Clause 16: The article of footwear of Clause 15, wherein the at least one of the series of channels is disposed between the pair of the series of channels.

Clause 17: The article of footwear of any of the preceding Clauses, wherein the particulate matter includes foam beads.

Clause 18: The article of footwear of Clause 17, wherein the foam beads include a substantially spherical shape.

Clause 19: The article of footwear of Clause 17, wherein the foam beads include approximately the same size and shape.

Clause 20: The article of footwear of Clause 17, wherein the foam beads include at least one of a different size and shape.

Clause 21: An article of footwear comprising an upper and an outsole attached to the upper and including a ground-engaging surface and an inner surface disposed on an opposite side of the outsole than the ground-engaging surface. The footbed is disposed between the upper and the outsole and including a top surface opposing the upper and a bottom surface opposing the inner surface of the outsole. The midsole is disposed between the upper and the outsole and including fibers that extend between the inner surface of the outsole and the bottom surface of the footbed. The fibers cooperating to define a first series of channels that extend along and substantially perpendicular to the longitudinal axis. The quantity of particulate matter received within the first series of channels.

Clause 22: The article of footwear of Clause 21, wherein the quantity of particulate matter is operable to move between adjacent ones of the first series of channels in a direction substantially parallel to the longitudinal axis through voids located between adjacent ones of the fibers.

Clause 23: The article of footwear of Clause 21, wherein the particulate matter is permitted to move along a longitudinal axis of each of the first series of channels in a direction substantially perpendicular to the longitudinal axis of the midsole.

Clause 24: The article of footwear of any of the preceding Clauses, wherein the particulate matter is restricted from freely moving between adjacent channels in a direction substantially parallel to the longitudinal axis of the midsole by the fibers.

Clause 25: The article of footwear of any of the preceding Clauses, wherein the channels include a substantially rectangular cross-section.

Clause 26: The article of footwear of any of the preceding Clauses, wherein the channels include a substantially triangular cross-section.

Clause 27: The article of footwear of any of the preceding Clauses, wherein the channels overlap one another.

Clause 28: The article of footwear of any of the preceding Clauses, wherein the particulate matter includes foam beads.

Clause 29: The article of footwear of Clause 28, wherein the foam beads include a substantially spherical shape.

Clause 30: The article of footwear of Clause 28, wherein the foam beads include approximately the same size and shape.

Clause 31: The article of footwear of Clause 28, wherein the foam beads include at least one of a different size and shape.

Clause 32: The article of footwear of Clause 21, further comprising a wall disposed in one of the first series of channels and extending substantially perpendicular to the longitudinal axis of the midsole, the wall preventing the particulate matter from passing therethrough.

Clause 33: A method of making an article of footwear. The method comprising providing a cavity between a footbed and an outsole and providing the cavity with a first series of walls that define a first series of channels within the cavity. The first series of channels extending substantially perpendicular to a longitudinal axis of the outsole and overlapping one another in a direction substantially parallel to the longitudinal axis. The method also comprising providing the first series of channels with a quantity of particulate matter.

Clause 34: The method of Clause 33, wherein defining the first series of channels includes providing the first series of channels with a substantially circular cross-section.

Clause 35: The method of Clause 33, wherein defining the first series of channels includes providing the first series of channels with a substantially triangular cross-section.

Clause 36: The method of any of the preceding Clauses, wherein defining the first series of channels includes overlapping the first series of channels in a direction substantially parallel to the longitudinal axis.

Clause 37: The method of any of the preceding Clauses, wherein providing the first series of channels with a quantity of particulate matter includes providing a quantity of foam beads.

Clause 38: The method of Clause 37, wherein providing the first series of channels with the quantity of foam beads includes providing the first series of channels with a quantity of foam beads having a substantially spherical shape.

Clause 39: The method of Clause 37, wherein providing the first series of channels with the quantity of foam beads includes providing the first series of channels with a quantity of foam beads that include at least one of a different size and shape.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An article of footwear comprising:
   an upper;
   an outsole attached to the upper and including a ground-engaging surface; and
   a midsole disposed between the upper and the outsole and including a first series of walls defining an upper series of channels and a second series of walls defining a lower series of channels, the upper series of channels including a series of foam projections that extend in a first direction away from one of the upper and the outsole toward the other of the upper and the outsole and the lower series of channels containing a quantity of particulate matter and extending in an opposite, second direction toward the other of the upper and the outsole, walls of the second series of walls defining the lower series of channels nesting with the series of foam projections of the upper series of channels.

2. The article of footwear of claim 1, wherein the particulate matter is permitted to move along a longitudinal axis extending substantially perpendicular to a longitudinal axis of the midsole.

3. The article of footwear of claim 2, wherein the particulate matter is restricted from moving between the upper series of channels and the lower series of channels in a direction substantially parallel to the longitudinal axis of the midsole by the series of walls.

4. The article of footwear of claim 1, wherein foam projections of the series of foam projections taper in the first direction to a distal end.

5. The article of footwear of claim 4, wherein walls of the series of walls taper in the second direction to a distal end.

6. The article of footwear of claim 1, wherein the particulate matter includes foam beads.

7. The article of footwear of claim 6, wherein the foam beads include a substantially spherical shape.

8. The article of footwear of claim 6, wherein the foam beads include approximately the same size and shape.

9. The article of footwear of claim 6, wherein the foam beads include at least one of a different size and shape.

10. The article of footwear of claim 1, wherein at least one foam projection of the series of foam projections includes a different height than the other foam projections of the series of foam projections.

11. An article of footwear comprising:
    an upper;
    an outsole attached to the upper and including a ground-engaging surface; and a midsole disposed between the upper and the outsole and including a first series of walls defining an upper series of channels and a second series of walls defining a lower series of channels, the upper series of channels including a series of foam projections that extend in a first direction away from one of the upper and the outsole toward the other of the upper and the outsole and the lower series of channels containing a quantity of particulate matter and extending in an opposite, second direction toward the other of the upper and the outsole, walls of the second series of walls defining the lower series of channels in contact with the series of foam projections of the upper series of channels and cooperating with the series of foam projections to define a height of the midsole.

12. The article of footwear of claim 11, wherein the particulate matter is permitted to move along a longitudinal axis extending substantially perpendicular to a longitudinal axis of the midsole.

13. The article of footwear of claim 12, wherein the particulate matter is restricted from moving between the upper series of channels and the lower series of channels in a direction substantially parallel to the longitudinal axis of the midsole by the series of walls.

14. The article of footwear of claim 11, wherein foam projections of the series of foam projections taper in the first direction to a distal end.

15. The article of footwear of claim 14, wherein walls of the series of walls taper in the second direction to a distal end.

16. The article of footwear of claim 11, wherein the particulate matter includes foam beads.

17. The article of footwear of claim 16, wherein the foam beads include a substantially spherical shape.

18. The article of footwear of claim 16, wherein the foam beads include approximately the same size and shape.

19. The article of footwear of claim 16, wherein the foam beads include at least one of a different size and shape.

20. The article of footwear of claim 11, wherein at least one foam projection of the series of foam projections includes a different height than the other foam projections of the series of foam projections.

* * * * *